(12) United States Patent
Shimano et al.

(10) Patent No.: US 11,078,364 B2
(45) Date of Patent: Aug. 3, 2021

(54) CURABLE COMPOSITION AND USE OF SAME

(71) Applicant: OSAKA GAS CHEMICALS CO., LTD., Osaka (JP)

(72) Inventors: Hirokazu Shimano, Osaka (JP); Kenichi Fukuda, Osaka (JP)

(73) Assignee: OSAKA GAS CHEMICALS CO., LTD., Osaka (JP)

( * ) Notice: Subject to any disclaimer, the term of this patent is extended or adjusted under 35 U.S.C. 154(b) by 54 days.

(21) Appl. No.: 16/634,243

(22) PCT Filed: Aug. 21, 2018

(86) PCT No.: PCT/JP2018/030817
§ 371 (c)(1),
(2) Date: Jan. 27, 2020

(87) PCT Pub. No.: WO2019/039468
PCT Pub. Date: Feb. 28, 2019

(65) Prior Publication Data
US 2021/0087394 A1 Mar. 25, 2021

(30) Foreign Application Priority Data

Aug. 22, 2017 (JP) .............................. JP2017-159320
Mar. 28, 2018 (JP) .............................. JP2018-062950

(51) Int. Cl.
| C08L 83/04 | (2006.01) |
| C04B 41/49 | (2006.01) |
| C08G 77/08 | (2006.01) |
| C08G 77/18 | (2006.01) |
| C08K 5/05 | (2006.01) |
| C04B 111/00 | (2006.01) |

(52) U.S. Cl.
CPC .......... *C08L 83/04* (2013.01); *C04B 41/4961* (2013.01); *C08G 77/08* (2013.01); *C08G 77/18* (2013.01); *C08K 5/05* (2013.01); *C04B 2111/00482* (2013.01); *C08L 2205/03* (2013.01); *C08L 2312/00* (2013.01)

(58) Field of Classification Search
CPC ......... C08G 77/18; C08G 77/08; C08L 83/04; B32B 27/283
See application file for complete search history.

(56) References Cited

U.S. PATENT DOCUMENTS

| 4,271,215 | A | 6/1981 | Coon | |
| 4,636,324 | A | 1/1987 | Murase et al. | |
| 6,451,437 | B1* | 9/2002 | Amidaiji .................. | C08K 3/36 |
| | | | | 428/447 |
| 2006/0281889 | A1 | 12/2006 | Kobayashi et al. | |
| 2009/0293768 | A1 | 12/2009 | Atsuchi et al. | |
| 2016/0304745 | A1 | 10/2016 | Iida et al. | |
| 2017/0349783 | A1 | 12/2017 | Kirino | |

FOREIGN PATENT DOCUMENTS

| JP | 11-217439 | 8/1999 |
| JP | 2002-356651 | 12/2002 |
| JP | 2006-36984 | 2/2006 |
| JP | 2008-75021 | 4/2008 |
| JP | 2014-65814 | 4/2014 |
| JP | 2016-117829 | 6/2016 |
| JP | 2016-204644 | 12/2016 |
| JP | 2017-82207 | 5/2017 |
| SU | 739080 | 6/1976 |
| WO | 2010/098448 | 9/2010 |
| WO | 2015/098582 | 7/2015 |

OTHER PUBLICATIONS

Translation of Written Opinion of the International Searching Authority dated Feb. 25, 2020 in International (PCT) Application No. PCT/JP2018/030817.
International Search Report (ISR) dated Sep. 25, 2018 in International (PCT) Application No. PCT/JP2018/030817.
Akira Nakajima, "Essentials in Chemistry 12 Wettability on Solid Surface—from Superhydrophilic to Superhydrophobic", The Chemical Society of Japan, Dec. 10, 2014, together with English translation p. 96, lines 11-25, and cited in the specification.

* cited by examiner

*Primary Examiner* — Kuo Liang Peng
(74) *Attorney, Agent, or Firm* — Wenderoth, Lind & Ponack, L.L.P.

(57) ABSTRACT

A curable composition comprises (A) a first siloxane oligomer being free from a siloxane unit represented by the following formula (I) and containing an alkoxy-group-containing siloxane unit, (B) a second siloxane oligomer containing a siloxane unit represented by the formula (I) and an alkoxy-group-containing siloxane unit, (C) a silicone oil having a kinetic viscosity at 25° C. of not less than 100 mm$^2$/s, (D) at least one curing catalyst selected from the group consisting of a metal alkoxide, a metal chelate compound, and a metal carboxylate, and (E) a solvent containing an organic solvent having a vapor pressure at 20° C. of not less than 1 kPa.

15 Claims, 2 Drawing Sheets

[Fig. 1]
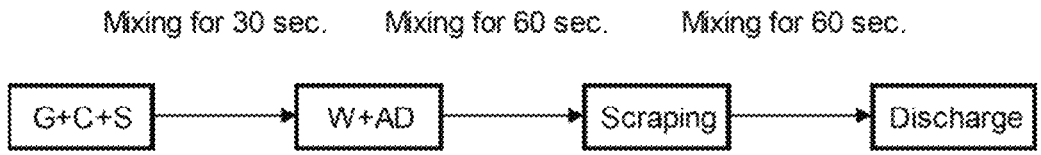
[Fig. 2]
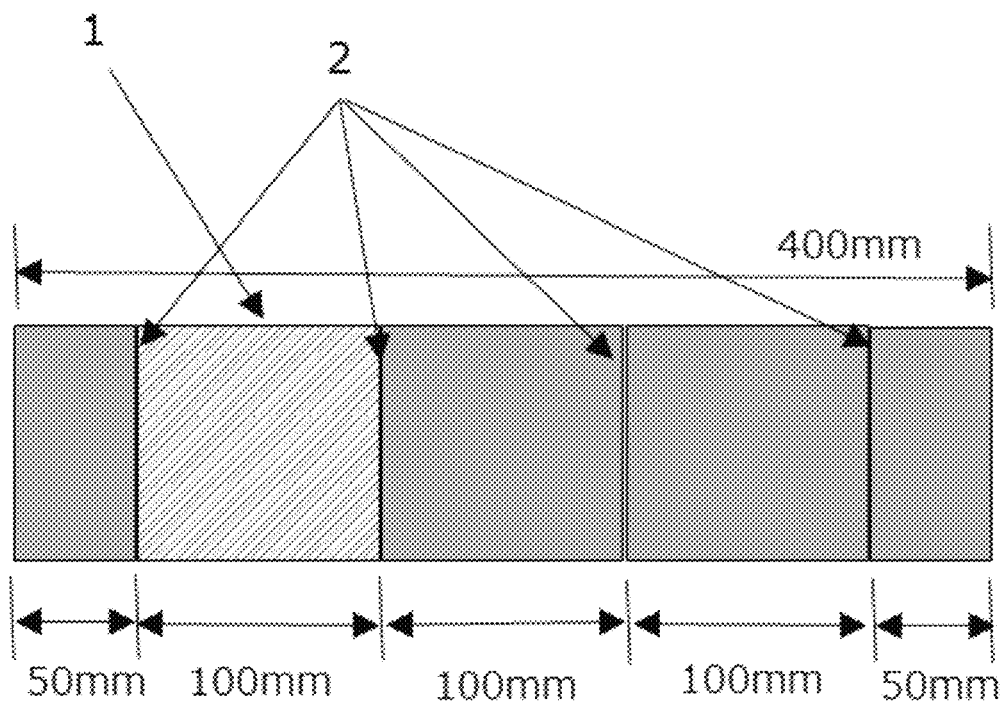
[Fig. 3]
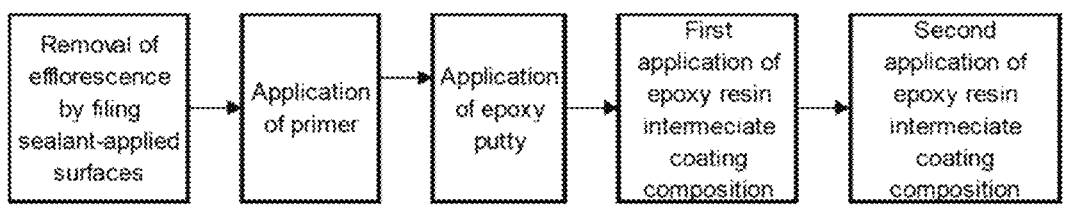

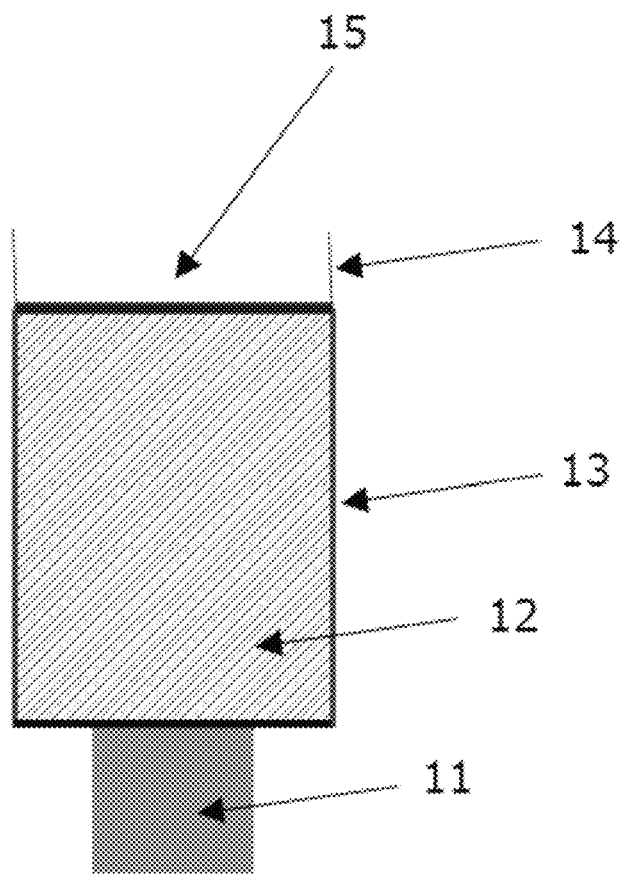
[Fig. 4]

CURABLE COMPOSITION AND USE OF SAME

TECHNICAL FIELD

The present invention relates to a curable composition that imparts non-tackiness and water repellency to various substrates to serve as a protective layer or antifouling layer and that is curable at room temperature, and use of the same.

BACKGROUND ART

There have been known methods of imparting non-tackiness (excellent releasability to tacky (or sticky) materials) by forming coating layers containing silicone resins on surfaces of various objects (substrates such as shaped products). Such a coating layer is required to have an excellent appearance (beautiful appearance). Moreover, the coating layer is often worn by repeated rubbing, and the coating layer is also required to have an excellent non-tackiness before and after wear.

For example, Japanese Patent Application Laid-Open Publication No. 2017-82207 (JP 2017-82207 A, Patent Document 1) discloses a coating composition to be applied to an object that requires non-tackiness, and the coating composition includes a first oligomer, a second oligomer, and a silicone oil and is substantially free from a solvent; the first oligomer contains a dialkylsiloxane unit and an alkoxy-group-containing siloxane unit, the second oligomer is free from a dialkylsiloxane unit and contains an alkoxy-group-containing siloxane unit. This coating composition is applied to an object and is then heat-treated to form a cured coating layer.

However, depending on the uses, it may be difficult to heat-treat the coating composition after applying the coating composition to the object. Thus, unfortunately, in a case where the coating composition described in Patent Document 1 is not heat-treated, the coating composition is insufficiently cured, failing to form a coating layer.

There have been also known methods of imparting non-tackiness and water repellency to surfaces of various products (such as rollers, metal molds, resin molds, plates, chutes, hoppers, cutters, and cookers) by coating silicone resins on the surfaces to form layers. Moreover, there is a known method of forming a coating layer of a silicone resin on a surface of kitchenware such as range hoods or that of sanitary ware such as lavatories, bathes, and washstands in order to prevent adhesion of dirt such as oil. Further, there is a known method of forming coatings of silicone resins on surfaces of buildings and structures or transport equipment in order to prevent water penetration (water permeation) and to prevent adhesion of snow, ice, algae, marine life, or others; the buildings and structures include buildings, storage tanks, bridges, telegraph poles, traffic lights, cables, antennas, and signs, and the transport equipment include automobiles, vehicles, ships and vessels, and aircraft.

For example, as one of the countermeasures against the snow and ice accretion phenomenon, various polyorganosiloxane resins have been applied to surfaces of objects in order to reduce the ice adhesion strength. Soviet Patent No. 739080 (Patent Document 2) discloses a silicone-series anti-icing coating composition consisting of two layers. Moreover, Japanese Patent Application Laid-Open Publication (Translation of PCT Application) No. S56-501455 (JP S56-501455 A, Patent Document 3) discloses an anti-icing coating composition that contains a specific silicone resin having a carboxyl-functional group and a tetraalkoxytitanium compound as a contact catalyst. Further, Japanese Examined Patent Publication No. H4-4035 (JP H4-4035 B, Patent Document 4) discloses an anti-icing method of using a combination of an alkali metal compound having a hydrogen bond dissociation action and an organopolysiloxane resin. These documents describe techniques related to improve in snow and ice accretion prevention by reducing the ice adhesion strength.

"KOTATHYOMEN NO NURESEI-CHOSHINSUISEI KARA CHOHASSUISEI MADE (Wettability on Solid Surface—from Superhydrophilic to Superhydrophobic) published by Kyoritsu Shuppan Co., Ltd." (Nonpatent Document 1) states, on page 96, "A surface on which snow does not adhere easily is not necessarily a surface on which snow slides easily." Further, this document also describes, "Snow accretion and snow sliding are not necessarily ruled by the same factors, and vary greatly depending on surface characteristics (water repellency, hydrophilicity) and snow properties (whether wet snow or dry snow)."

That is, the snow and ice accretion prevention (a property of preventing or reducing snow and/or ice adhesion on a solid surface) and the snow and ice sliding (a property of easily sliding or falling snow and/or ice adhering on a solid surface from a surface of a cured layer) are significantly different characteristics. Patent Documents 2 to 4 only disclose the snow and ice accretion prevention and fail to disclose the snow and ice sliding. Further, in the method described in Patent Document 1 or other documents, the silicone resin layers coated on various surfaces for the purpose of antifouling are usually need to be heat-treated for forming sufficiently cured layers, thus reducing the productivity. Depending on the uses, it may be difficult to form cured layers. Furthermore, the silicone resin layers have a problem that the functions are reduced due to long-term use or wear because of sliding and others.

CITATION LIST

Patent Literature

Patent Document 1: JP 2017-82207 A
Patent Document 2: Soviet Patent No. 739080
Patent Document 3: JP S56-501455 A
Patent Document 4: JP H4-4035 B NONPATENT LITERATURE
Nonpatent Document 1: KAGAKU NO YOTEN SERIES 12, KOTAIHYOMEN NO NURESEI-CHOSHINSUISEI KARA CHOHASSUISEI MADE (Essentials in Chemistry 12, Wettability on Solid Surface—from Superhydrophilic to Superhydrophobic) (publishing office: Kyoritsu Shuppan Co., Ltd., published on Dec. 10, 2014)

SUMMARY OF INVENTION

Technical Problem

It is therefore an object of the present invention to provide a curable composition (a coating composition, an antifouling or protective composition) curable at room temperature (or ordinary temperature) and capable of forming a cured product that can maintain an antifouling or protective function over a long period of time, and use thereof.

Another object of the present invention is to provide a curable composition curable at room temperature and capable of forming a cured product that has an excellent appearance and can maintain non-tackiness (or non-stickiness) and water repellency even when slid, worn, or degraded, and use thereof.

It is still another object of the present invention to provide a curable composition capable of forming a cured layer that has a high adhesion to a substrate as an antifouling or protective object and can maintain an antifouling or protective function even when worn or degraded, and use thereof.

It is a still further object of the present invention to provide a curable composition capable of forming a cured product that can maintain a function of preventing adhesion of snow and/or ice (in particular, a function of accelerating sliding of snow and ice) over a long period of time, and use thereof.

It is another object of the present invention to provide a curable composition capable of forming a cured product that can maintain a function of preventing adhesion of stains (such as oil and water scale) over a long period of time, and use thereof.

A still another object of the present invention is to provide a curable composition capable of forming a cured product that can maintain a function of preventing water penetration (water permeation) over a long period of time, and use thereof.

Solution to Problem

The inventors of the present invention made intensive studies to achieve the above objects and finally found a curable composition that is prepared by combining (A) a first siloxane oligomer being free from a dialkylsiloxane unit and containing an alkoxy-group-containing siloxane unit, (B) a second siloxane oligomer containing a dialkylsiloxane unit and an alkoxy-group-containing siloxane unit, (C) a silicone oil having a kinetic viscosity at 25° C. of not less than 100 mm²/s, (D) at least one curing catalyst selected from the group consisting of a metal alkoxide, a metal chelate compound, and a metal carboxylate, and (E) a solvent containing an organic solvent having a vapor pressure at 20° C. of not less than 1 kPa at specific proportions and that has a pencil hardness of not less than 2H as a cured layer; and found that the curable composition is curable at room temperature, and a cured product of the curable composition can maintain a non-tacky (or non-sticky), antifouling, or protective function over a long period of time. The present invention was accomplished based on the above findings.

That is, an aspect of the present invention provides a curable composition comprising (A) a first siloxane oligomer being free from a siloxane unit represented by the following formula (I) and containing an alkoxy-group-containing siloxane unit, (B) a second siloxane oligomer containing a siloxane unit represented by the above formula (I) and an alkoxy-group-containing siloxane unit, (C) a silicone oil having a kinetic viscosity at 25° C. of not less than 100 mm²/s, (D) at least one curing catalyst selected from the group consisting of a metal alkoxide, a metal chelate compound, and a metal carboxylate, and (E) a solvent containing an organic solvent having a vapor pressure at 20° C. of not less than 1 kPa; the total proportion of the first siloxane oligomer (A) and the second siloxane oligomer (B) in the composition is 20 to 50% by mass, the mass ratio of the second siloxane oligomer (B) relative to the first siloxane oligomer (A) is 0.15 to 10, and the mass ratio of the solvent (E) is 40 to 300 parts by mass relative to 100 parts by mass of the total of the first siloxane oligomer (A), the second siloxane oligomer (B), and the silicone oil (C); and when the composition is applied and is allowed to stand at 23° C. for 24 hours to give a cured layer, the composition has a pencil hardness measured in accordance with JIS K560-5-4(1999) of not less than 2H as the cured layer:

[Chem. 1]

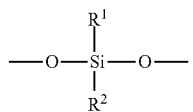
(I)

wherein $R^1$ and $R^2$ are the same or different and each represent an alkyl group.

The organic solvent may be a $C_{1-4}$ alkanol. The ratio of the curing catalyst (D) may be 1 to 55 parts by mass relative to 100 parts by mass of the total of the first siloxane oligomer (A), the second siloxane oligomer (B), and the silicone oil (C). The curable composition may be a room-temperature-curable (or cold-setting) composition. The curable composition may be a coating composition, for example, may be a composition for preventing adhesion of snow and/or ice to a substrate, a composition for preventing adhesion of oil and/or water scale to a substrate, or a composition for preventing water penetration (water permeation) to a substrate.

Another aspect of the present invention provides a process for producing a cured product, the process comprising: applying the curable composition to a surface of a substrate and curing (or hardening) the composition to form a cured product. The cured product may be in the form of a cured layer.

Another aspect of the present invention provides a method for imparting non-tackiness (non-stickiness or non-adhesiveness) and water repellency to a substrate, the method comprising: coating a surface of the substrate with the curable composition and curing the composition to form a cured product.

Another aspect of the present invention provides a method for preventing adhesion of snow and/or ice to a substrate, the method comprising: applying the curable composition to a surface of the substrate and curing the composition to form a cured layer. The method may be a method for accelerating sliding of snow and ice.

Another aspect of the present invention provides a method for preventing adhesion of oil and/or water scale to a substrate, the method comprising: applying the curable composition to a surface of the substrate and curing the composition to form a cured layer.

Another aspect of the present invention provides a method for preventing water penetration to a substrate, the method comprising: applying the curable composition to a surface of the substrate and curing the composition to form a cured product. In this method, the substrate may be a shaped concrete product.

Another aspect of the present invention provides a cured product of the curable composition. The cured product may be in the form of a cured layer.

Another aspect of the present invention provides a composite comprising a substrate and a cured layer coated on a surface of the substrate, the cured layer being formed of a cured product of the curable composition.

As used in the description and claims, the siloxane unit means a constitutional unit corresponding to one siloxane bond in a polysiloxane (a siloxane oligomer) and means each siloxane unit or terminal siloxane group constituting a polysiloxane skeleton.

Advantageous Effects of Invention

According to the present invention, the first siloxane oligomer (A) being free from the dialkylsiloxane unit (I) and containing the alkoxy-group-containing siloxane unit, the second siloxane oligomer (B) containing the dialkylsiloxane unit (I) and the alkoxy-group-containing siloxane unit, the silicone oil (C), the curing catalyst (D) that is at least one selected from the group consisting of a metal alkoxide, a metal chelate compound, and a metal carboxylate, the solvent (E) are combined at specific proportions to prepare a curable composition of which cured layer has a pencil hardness of not less than 2H. Thus, the curable composition is curable at room temperature and is capable of forming a cured product that can maintain an antifouling or protective function over a long period of time. More specifically, the curable composition is curable at room temperature and is thus utilizable for uses that do not require any heat treatment.

Moreover, the curable composition is curable at room temperature and is capable of forming a cured product (in particular, a cured layer) that has an excellent appearance and can maintain non-tackiness and water repellency even when slid, worn, or degraded. More specifically, since the curable composition has a total proportion of the first siloxane oligomer (A) and the second siloxane oligomer (B) of 20 to 50% by mass in the composition, the curable composition has an excellent coatability and is capable of forming a cured product (in particular, a cured layer) having an excellent appearance. Moreover, the curable composition is capable of forming a cured product that has an excellent non-tackiness before and after sliding due to the silicone oil having a specific kinetic viscosity and that has an excellent non-tackiness and water repellency after wear or degradation due to the second siloxane oligomer (B) having a mass ratio of 0.15 to 10 relative to the first siloxane oligomer (A).

Further, the curable composition can be applied to a surface of a substrate to form a cured layer that has a high adhesion to the substrate as an antifouling or protective object and that can maintain an antifouling and/or protective function even when worn or degraded.

For example, the curable composition is capable of forming a cured layer that can maintain a function of preventing adhesion of snow and/or ice (in particular, a function of accelerating sliding of snow and ice) over a long period of time. Among these functions, the present invention is excellent in both of a function of preventing snow and ice accretion (snow and ice accretion prevention) and a function of accelerating sliding of snow and ice (snow and ice sliding) and is particularly excellent in the function of accelerating sliding of snow and ice.

The curable composition is capable of forming a cured layer that can maintain a function of preventing adhesion of stains such as oil or water scale over a long period of time.

The curable composition is capable of forming a cured product that can maintain a function of preventing water penetration over a long period of time. Thus, the composition is useful as a protective material for a water-permeable substrate such as a shaped concrete product.

BRIEF DESCRIPTION OF DRAWINGS

FIG. 1 is a flow diagram showing a procedure for concrete kneading and mixing in Examples.

FIG. 2 is a schematic view showing a manner of concrete cutting in Examples.

FIG. 3 is a flow diagram showing a procedure for coating with a sealant in Examples.

FIG. 4 is a schematic view showing a state where a protective material for a concrete in Examples is applied to a test face of a concrete substrate.

DESCRIPTION OF EMBODIMENTS

[Curable Composition]

The curable composition of the present invention is a curable composition that is a room-temperature-(or ordinary-temperature-) curable type and forms a cured product (e.g., a cured layer such as an antifouling and/or protective layer) by room-temperature curing. Since the composition of the present invention is moisture-cured at room temperature, it is unnecessary to heat-treat the composition for curing. For example, the composition can also be used (disposed) in a fire-prohibited place. The composition of the present invention contains (A) a first siloxane oligomer, (B) a second siloxane oligomer, (C) a silicone oil, (D) a curing catalyst, and (E) a solvent. As used in the description and claims, the room temperature means temperature without heating (specifically, heating to 50° C. or higher) for forming a cured product from a curable composition. For example, the room temperature is not lower than 0° C. and lower than 50° C., preferably 10 to 40° C., and more preferably 15 to 35° C.

(A) First Siloxane Oligomer (First Oligomer)

The first siloxane oligomer (A) firmly adheres to a substrate (a substrate being an antifouling or protective object such as a shaped product) by forming a siloxane matrix together with the second siloxane oligomer in a cured product, is capable of forming a cured product (in particular, a cured layer) having excellent mechanical properties, and allows a function (e.g., an antifouling or protective function) of the cured product to be maintained over a long period of time. In particular, the cured product is applied to the surface of the substrate for protecting the substrate in various uses and thus serves as a cured layer (or coat). For example, for a use in which the cured layer is repeatedly slid, the cured layer may gradually lose the silicone oil along with sliding or may wear due to sliding to be thinner. Moreover, for a use in which the cured layer is used in the open air, the silicone oil may be decomposed at or near the surface of the cured layer due to exposure to light, heat, snow, or others. In such a case, according to the present invention, a hydrophobic interaction between the dialkyl group in the second siloxane oligomer and the silicone oil allows prevention of early bleeding out of the silicone oil, and allows a maintained durability of the cured layer due to the silicone oil remaining inside the cured layer even after loss of the silicone oil from the surface due to sliding or even after wear or degradation of the surface itself. In other words, the first siloxane oligomer (A) functions as a non-tacky (non-sticky or non-adhesive) auxiliary that helps non-tackiness (non-stickiness, non-adhesion, or non-adhesiveness) and water repellency due to the silicone oil to effectively prevent the non-tackiness and water repellency from lowering even after wear or degradation due to repeated sliding or long-range use.

The first siloxane oligomer (A) is an oligomer being free from a siloxane unit represented by the above formula (I) and containing an alkoxy-group-containing siloxane unit.

In the above formula (I), the alkyl groups $R^1$ and $R^2$ may include, for example, a $C_{1-6}$alkyl group such as methyl group, ethyl group, n-propyl group, isopropyl group, n-butyl group, s-butyl group, isobutyl group, t-butyl group, n-pentyl group, or n-hexyl group. These alkyl groups may be used alone or in combination.

The alkoxy-group-containing siloxane unit has an alkoxy group directly bonded to a silicon atom. Examples of the alkoxy group may include a $C_{1-6}$alkoxy group such as methoxy group, ethoxy group, n-propoxy group, isopropoxy group, n-butoxy group, s-butoxy group, isobutoxy group, t-butoxy group, n-pentyloxy group, or n-hexyloxy group. These alkoxy groups may be used alone or in combination. Among them, a $C_{1-3}$alkoxy group such as methoxy group or ethoxy group is preferred, a $C_{1-2}$alkoxy group is more preferred, methoxy group is most preferred.

Specifically, the first siloxane oligomer (A) may be a siloxane oligomer having units (constitutional units) represented by the following formulae (1A) to (1D):

[Chem. 2]

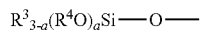 (1A)

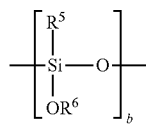 (1B)

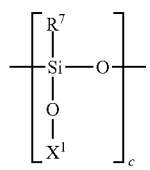 (1C)

 (1D)

wherein
$R^3$ to $R^9$ are the same or different and each represent an alkyl group or an aryl group,
$X^1$ represents a siloxane unit,
a and d are the same or different and each represent 1 or 2,
b denotes an integer of 2 to 20,
c denotes an integer of 2 to 18, and
any one of $R^4$, $R^6$ and $R^8$ contains an alkyl group or $X^1$ contains an alkoxy group.

In the above formulae (1A) to (1D), the alkyl group each represented by $R^3$ to $R^9$ may include an alkyl group exemplified as the alkyl group each represented by $R^1$ and $R^2$ in the above formula (I). The aryl group each represented by $R^3$ to $R^9$ may include, for example, a $C_{6-20}$aryl group such as phenyl group, methylphenyl group (tolyl group), dimethylphenyl group (xylyl group), or naphthyl group. The alkyl group may be used alone or in combination, or the aryl group may be used alone or in combination, or the alkyl group and the aryl group may be used in combination. Among them, methyl group or phenyl group is widely used, a $C_{1-3}$alkyl group such as methyl group or ethyl group is preferred, a $C_{1-2}$alkyl group is more preferred, and methyl group is most preferred.

The unit (1A) represented by the above formula (1A) is a terminal siloxane unit, and the added mole number a of groups $R^4O$ is 1 or 2. From the viewpoint of improving the compatibility in the composition, the added mole number is preferably 2 (that is, the added mole number 3-a of groups $R^3$ is preferably 1). The groups $R^3$ and $R^4$ are selected from the alkyl group and the aryl group, as described above, and methyl group or phenyl group is widely used. Each of the groups $R^3$ and $R^4$ is preferably a $C_{1-2}$alkyl group and more preferably methyl group.

Each unit (1B) constituting the units represented by the above formula (1B) is a unit constituting a main chain of the first siloxane oligomer. The unit number b (or the number b of the units) in the first siloxane oligomer (A) can be selected from integers of 2 to 20. From the viewpoint of improving the durability of the antifouling or protective function (for example, a function of accelerating sliding of snow and ice, a non-tacky (non-sticky or non-adhesive) function, and a water-repellent function), the unit number is, for example, an integer of 3 to 17, preferably an integer of 5 to 15, more preferably an integer of 7 to 13, and most preferably an integer of 9 to 11.

As used in the description and claims, the unit number b in the formula (1B) means a total unit number in the siloxane oligomer (A). That is, the formula (1B) is a formula that simply represents the structure of the unit and the number thereof and that does not mean a block structure (a block part) having b units continuously repeated. Moreover, the unit (1B) means each unit (one constitutional unit out of b pieces of units) of the units represented by the formula (1B). Further, the b units may be the same or different from one another. The same will apply to the after-mentioned the formulae (1C), (1b), (1c), (2B) to (2D), and (2b) to (2d) hereinafter.

Moreover, in the description and claims, each unit and unit number can be identified by $^1$H-NMR and $^{29}$Si-NMR.

In the formula (1B), the groups $R^5$ and $R^6$ are selected from the alkyl group and the aryl group, as described above, and methyl group or phenyl group is widely used. Each of the groups $R^5$ and $R^6$ is preferably a $C_{1-2}$alkyl group and more preferably methyl group.

Each unit (1C) of the units represented by the above formula (1C) is also a unit constituting a main chain of the first siloxane oligomer. The unit number c (or the number c of the units) in the first siloxane oligomer (A) can be selected from integers of 2 to 18. From the viewpoint of improving the durability of the antifouling or protective function (for example, a function of accelerating sliding of snow and ice, a non-tacky (non-sticky or non-adhesive) function, and a water-repellent function), the unit number is, for example, an integer of 3 to 15, preferably an integer of 3 to 10, more preferably an integer of 3 to 7, and most preferably an integer of 3 to 5. The group $R^7$ is selected from the alkyl group and the aryl group, as described above, and methyl group or phenyl group is widely used. The group $R^7$ is preferably a $C_{1-2}$alkyl group and more preferably methyl group.

In the formula (10), examples of the siloxane unit represented by $X^1$ may include a unit (1E) alone represented by the following formula (1E), a combination of the unit (1B) and the unit (1D), and a combination of the unit (1B) and the unit (1E):

[Chem.3]

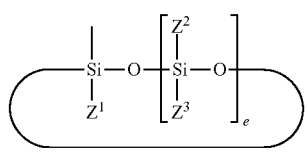 (1E)

wherein $Z^1$ to $Z^3$ each represent an alkyl group, an aryl group, an alkoxy group, or an aryloxy group, e denotes an integer of not less than 1, and a case where $Z^1$ and $Z^2$ are simultaneously an alkyl group is excluded.

In the above formula (1E), the alkyl group each represented by $Z^1$ to $Z^3$ may include an alkyl group exemplified as the alkyl group each represented by $R^1$ and $R^2$ in the above formula (I). The aryl group each represented by $Z^1$ to $Z^3$ may include an aryl group exemplified as the aryl group each represented by $R^3$ to $R^9$ in the above formulae (1A) to (1D). The alkoxy group each represented by $Z^1$ to $Z^3$ may include an alkoxy group exemplified as the alkoxy group of the first oligomer (A). The aryloxy group each represented by $Z^1$ to $Z^3$ may include, for example, a $C_{6-20}$aryloxy group such as phenoxy group, methylphenoxy group, dimethylphenoxy group, or naphthyloxy group. Among them, a $C_{1-3}$alkyl group such as methyl group or ethyl group, a $C_{1-3}$alkoxy group such as methoxy group or ethoxy group, and other groups are preferred, a $C_{1-2}$alkyl group and a $C_{1-2}$alkoxy group are more preferred, and methyl group and methoxy group are most preferred.

The unit number e (the number e) of siloxane units having substituents 2 and $Z^3$ is not less than 1, and is, for example, 1 to 8, preferably 2 to 6, and more preferably 3 to 5.

Among them, the siloxane unit $X^1$ preferably includes a combination of the units (1A) and (1B), and a combination of the units (1B) and (1D).

The unit (1D) represented by the above formula (1D) is a terminal unit, and the added mole number d of groups $R^8O$ is 1 or 2. From the viewpoint of the compatibility in the composition, the added mole number is preferably 2 (that is, the added mole number 3-d of groups $R^9$ is preferably 1). The groups $R^8$ and $R^9$ are selected from the alkyl group and the aryl group, as described above, and methyl group or phenyl group is widely used. Each of the groups $R^8$ and $R^9$ is preferably a $C_{1-2}$alkyl group and more preferably methyl group.

The first oligomer (A) may be a compound represented by the following average composition formula (A):

wherein $R^{10}$ and $R^{11}$ are the same or different and each represent an alkyl group or an aryl group, f is an average value within the range of 0.4 to 1.7, g is a value satisfying that the proportion of the group $OR^{11}$ in the oligomer is not less than 5% by mass and less than 40% by mass, and $R^{11}$ contains at least an alkyl group.

In the above formula (A), g is preferably a value satisfying that the proportion of the group $OR^{11}$ in the oligomer is 10 to 35% by mass, and most preferably a value satisfying that the proportion of the group $OR^1$ in the oligomer is 20 to 35% by mass.

Specifically, examples of the first oligomer (A) may include a methyl-series silicone alkoxy oligomer and a methylphenyl-series silicone alkoxy oligomer. Among them, the methyl-series silicone alkoxy oligomer is preferred.

The methyl-series silicone alkoxy oligomer may include, for example, a methyl-series silicone methoxy oligomer produced from methyltrimethoxysilane.

The methyl-series silicone methoxy oligomer may be, for example, a siloxane oligomer having units represented by the following formulae (1a) to (1d):

[Chem. 4]

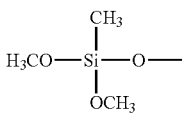 (1a)

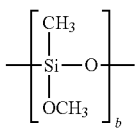 (1b)

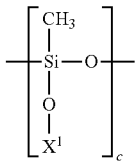 (1c)

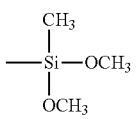 (1d)

wherein b, c, and $X^1$ have the same meanings as b, c and $X^1$ in the formulae (1B) and (1C).

Such a methyl-series silicone alkoxy oligomer may be produced from, for example, methyltrimethoxysilane.

The weight-average molecular weight of the first siloxane oligomer is, for example, 500 to 4000, preferably 1000 to 3000, in a measuring method by GPC (in terms of polystyrene).

The first siloxane oligomer may be a commercially available product. For example, there may be used KC-89 (manufactured by Shin-Etsu Chemical Co., Ltd.), KR-515 (manufactured by Shin-Etsu Chemical Co., Ltd.), KR-500 (a methyl-series silicone alkoxy oligomer that is a siloxane oligomer having units represented by the formulae (1a) to (1d), wherein b is 10 and c is 4, manufactured by Shin-Etsu Chemical Co., Ltd.), X-40-9225 (a methyl-series silicone alkoxy oligomer that is a siloxane oligomer having units represented by the formulae (1a) to (1d), wherein b is 12 and c is 10, manufactured by Shin-Etsu Chemical Co., Ltd.), US-SG2403 (manufactured by Dow Corning Toray Co., Ltd.).

The proportion of the first siloxane oligomer in the composition may be not less than 10% by mass and less than 50% by mass, and is, for example, 15 to 40% by mass, preferably 20 to 35% by mass, and more preferably 25 to 30% by mass. In a case where the proportion of the first siloxane oligomer is excessively low, the cured product may easily decrease in mechanical properties. In a case where the proportion of the first siloxane oligomer is excessively high, the durability of the antifouling or protective function (such as a function of accelerating sliding of snow and ice, a non-tacky function, or a water-repellent function) may easily be decreased.

(B) Second siloxane oligomer (second oligomer)

The second siloxane oligomer (B) forms the siloxane matrix together with the first siloxane oligomer in the cured product.

The second siloxane oligomer (B) is an oligomer containing a siloxane unit represented by the above formula (I) and an alkoxy-group-containing siloxane unit. Embodiments of both siloxane units, including preferred embodiments, may be similar to those of both siloxane units of the first siloxane oligomer.

Specifically, the second siloxane oligomer (B) may be a siloxane oligomer having units (constitutional units) represented by the following formulae (2A) to (2E):

[Chem. 5]

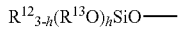
(2A)

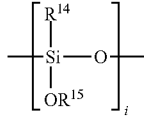
(2B)

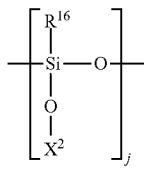
(2C)

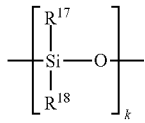
(2D)

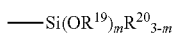
(2E)

wherein
$R^{12}$ to $R^{20}$ are the same or different and each represent an alkyl group or an aryl group,
$X^2$ represents a siloxane unit, and
any one of $R^{13}$, $R^{15}$, and $R^{19}$ contains an alkyl group or $X^2$ contains an alkoxy group,
h and m are the same or different and each represent 1 or 2,
i denotes an integer of 2 to 20,
j denotes an integer of 2 to 10, and
k denotes an integer of 2 to 20.

In the above formulae (2A) to (2E), the alkyl group each represented by $R^{12}$ to $R^{20}$ may include an alkyl group exemplified as the alkyl group each represented by $R^1$ and $R^2$ in the above formula (I). The aryl group each represented by $R^{12}$ to $R^{20}$ may include an aryl group exemplified as the aryl group in the above formulae (1A) to (1D). The alkyl group may be used alone or in combination, or the aryl group may be used alone or in combination, or the alkyl group and the aryl group may be used in combination. Among them, methyl group or phenyl group is widely used, a $C_{1-3}$alkyl group such as methyl group or ethyl group is preferred, a $C_{1-2}$alkyl group is more preferred, and methyl group is most preferred.

The unit (2A) represented by the above formula (2A) is a terminal siloxane unit, and the added mole number h of groups $R^{13}O$ is 1 or 2. From the viewpoint of improving the mechanical properties or others of the cured layer, the added mole number is preferably 2 (that is, the added mole number 3-h of groups $R^{12}$ is preferably 1). The groups $R^{12}$ and $R^{13}$ are selected from the alkyl group and the aryl group, as described above, and methyl group or phenyl group is widely used. Each of the groups $R^{12}$ and $R^{13}$ is preferably a $C_{1-2}$alkyl group and more preferably methyl group.

Each unit (2B) constituting the units represented by the above formula (2B) is a unit constituting a main chain of the second siloxane oligomer. The unit number i (or the number i of the units) in the second siloxane oligomer (B) can be selected from integers of 2 to 20. From the viewpoint of improving the durability of the antifouling or protective function (for example, a function of accelerating sliding of snow and ice, a non-tacky function, and a water-repellent function), a preferred range is an integer of 3 to 15, 3 to 13, 5 to 13, 6 to 10 in a stepwise manner, and a most preferred one is an integer of 7 to 9.

In the formula (2B), the groups $R^{14}$ and $R^{15}$ are selected from the alkyl group and the aryl group, as described above, and methyl group or phenyl group is widely used. Each of the $R^{14}$ and $R^{15}$ is preferably a $C_{1-2}$alkyl group and more preferably methyl group.

Each unit (2C) of the units represented by the above formula (2C) is also a unit constituting a main chain of the second siloxane oligomer. The unit number j (or the number j of the units) in the second siloxane oligomer (B) can be selected from integers of 2 to 10. From the viewpoint of improving the durability of the antifouling or protective function (for example, a function of sliding snow and ice, a non-tacky function, and a water-repellent function), a preferred range of the unit number is an integer of 3 to 9, 3 to 8, 3 to 7, 3 to 6 in a stepwise manner, and a most preferred one is an integer of 3 to 5. The group $R^{16}$ is selected from the alkyl group and the aryl group, as described above, and methyl group or phenyl group is widely used. The group $R^{16}$ is preferably a $C_{1-2}$alkyl group and more preferably methyl group.

In the formula (20), examples of the siloxane unit represented by $X^2$ may include a unit (2F) alone represented by the following formula (2F), a combination of the unit (2B) and the unit (2E), a combination of the unit (2D) and the unit (2E), and a combination the unit (2B) and the unit (2F):

[Chem. 6]

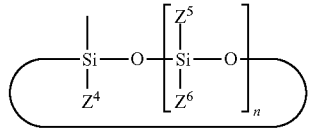
(2F)

wherein
$Z^4$ to $Z^6$ each represent an alkyl group, an aryl group, an alkoxy group, or an aryloxy group, and
n denotes an integer of 1.

In the above formula (2F), the alkyl group each represented by $Z^4$ to $Z^6$ may include an alkyl group exemplified as the alkyl group each represented by $R^1$ and $R^2$ in the above formula (I). The aryl group each represented by $Z^4$ to $Z^6$ may include an aryl group exemplified as the aryl group each represented by $R^3$ to $R^5$ in the above formulae (1A) to (1D). The alkoxy group each represented by $Z^4$ to $Z^6$ may include an alkoxy group exemplified as the alkoxy group of the first oligomer (A). The aryloxy group each represented by $Z^4$ to $Z^6$ may include an aryloxy group exemplified as the aryloxy group each represented by $Z^1$ to $Z^3$ in the above formula (1E). Among them, a $C_{1-3}$alkyl group such as methyl group or ethyl group and a $C_{1-3}$alkoxy group such as methoxy group or ethoxy group are preferred, a $C_{1-2}$alkyl group and a $C_{1-2}$alkoxy group are more preferred, and methyl group and methoxy group are most preferred.

The unit number n (the number n) of siloxane units having substituents $Z^5$ and $Z^6$ is not less than 1, and is, for example, 1 to 8, preferably 2 to 6, and more preferably 3 to 5.

Among them, the siloxane unit $X^2$ preferably includes a combination of the units (2A) and (2B), and a combination of the units (2B) and (2E).

Each unit (2D) constituting the units represented by the above formula (2D) is a unit constituting a main chain of the second siloxane oligomer. The unit number k (or the number k of the units) in the second siloxane oligomer (B) can be selected from integers of 2 to 20. From the viewpoint of improving the durability of the antifouling or protective function (for example, a function of sliding snow and ice, and a water-repellent function), the unit number k is, for example, an integer of 2 to 15, preferably an integer of 2 to 10, more preferably an integer of 3 to 6, and most preferably an integer of 3 to 5.

In the formula (2D), the groups $R^{17}$ and $R^{18}$ are selected from the alkyl group and the aryl group, as described above, and methyl group or phenyl group is widely used. Each of the groups $R^{17}$ and $R^{18}$ is preferably a $C_{1-2}$alkyl group and more preferably methyl group.

The unit (2E) represented by the above formula (2E) is a terminal unit, and the added mole number m of groups $R^{19}O$ is 1 or 2. From the viewpoint of improving the mechanical properties or others of the cured layer, the added mole number is preferably 2 (that is, the added mole number 3-m of groups $R^{20}$ is preferably 1). The groups $R^{19}$ and $R^{20}$ are selected from the alkyl group and the aryl group, as described above, and methyl group or phenyl group is widely used. Each of the groups $R^{19}$ and $R^{20}$ is preferably a $C_{1-2}$alkyl group and more preferably methyl group.

The second oligomer (B) may be a compound represented by the following average composition formula (B):

(B)

wherein $R^{21}$ and $R^{22}$ are the same or different and each represent an alkyl group or an aryl group, p is an average value within the range of 0.4 to 1.7, and q is a value satisfying that the proportion of the group $OR^{22}$ in the oligomer is not less than 5% by mass and less than 40% by mass.

In the above formula (B), q is preferably a value satisfying that the proportion of the group $OR^{22}$ in the oligomer is 10 to 35% by mass, and most preferably a value satisfying that the proportion of the group $OR^{22}$ in the oligomer is 20 to 30% by mass.

Specifically, examples of the second oligomer may include a methyl-series silicone alkoxy oligomer that contains a dimethylsiloxane unit and a methoxy-group-containing siloxane unit, and a methylphenyl-series silicone alkoxy oligomer that contains a methylphenylsiloxane unit and a siloxane unit containing methoxy group and phenoxy group. Among them, the methyl-series silicone alkoxy oligomer is preferred.

The methyl-series silicone alkoxy oligomer may include, for example, a methyl-series silicone methoxy oligomer produced from methyltrimethoxysilane and dimethyldimethoxysilane.

The methyl-series silicone methoxy oligomer may be, for example, a siloxane oligomer having units represented by the following formulae (2a) to (2e):

[Chem. 7]

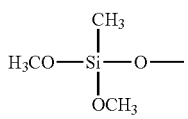
(2a)

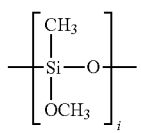
(2b)

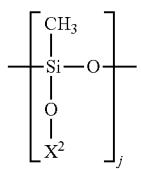
(2c)

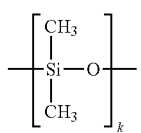
(2d)

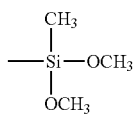
(2e)

wherein i, j, k, and $X^2$ have the same meanings as i, j, k, and $X^2$ in the formulae (2B) to (2D).

Such a methyl-series silicone alkoxy oligomer may be produced from, for example, methyltrimethoxysilane and dimethyldimethoxysilane.

The weight-average molecular weight of the second siloxane oligomer is, for example, 500 to 4000, preferably 1000 to 3000, in a measuring method by GPC (in terms of polystyrene).

The second siloxane oligomer (B) may be a commercially available product. For example, there may be used X-40-9250 (a methyl-series silicone alkoxy oligomer that is a siloxane oligomer having units represented by the formulae (2a) to (2e), wherein i is 8, j is 4, and k is 4, manufactured by Shin-Etsu Chemical Co., Ltd.).

The proportion of the second siloxane oligomer (B) in the composition may be not less than 1% by mass and less than 50% by mass, and is, for example, 2 to 45% by mass, preferably 3 to 40% by mass, more preferably 5 to 30% by mass, more preferably 5 to 20% by mass, and most preferably 6 to 10% by mass. In a case where the proportion of the second siloxane oligomer is excessively low, the durability of the antifouling or protective function (such as a function of accelerating sliding of snow and ice, a non-tacky function, or a water-repellent function) may easily be decreased. In a case where the proportion of the second siloxane oligomer is excessively high, the cured layer may easily decrease in mechanical properties.

From the viewpoint of improving the durability of the antifouling or protective function (for example, a function of accelerating sliding of snow and ice, a non-tacky function, and a water-repellent function), the mass ratio of the second siloxane oligomer (B) relative to the first siloxane oligomer (A) is 0.15 to 10, a preferred range of the mass ratio is 0.16 to 9, 0.18 to 7, 0.2 to 5, 0.22 to 2, and 0.22 to 1 in a stepwise manner, and a most preferred one is 0.22 to 0.5. In a case where the ratio of the second siloxane oligomer (B) relative to the first siloxane oligomer (A) is excessively low, the cured product may decrease in mechanical properties. In a case where the ratio the second siloxane oligomer (B) relative to the first siloxane oligomer (A) is excessively high, the durability of the antifouling or protective function may be decreased.

The total proportion of the first oligomer (A) and the second oligomer (B) in the composition is 20 to 50% by mass, preferably 25 to 45% by mass, more preferably 30 to 40% by mass, and most preferably 35 to 40% by mass. In a case where the total proportion is excessively low, the cured layer may decrease in mechanical properties. In a case where the total proportion is excessively high, the composition may decrease in workability (applicability), lowering the appearance of the cured product.

(C) Silicone Oil

The silicone oil (C) is a component imparting a desired non-tackiness or water repellency to the cured product. The silicone oil has a repeated structure of a polysiloxane. The main chain of the silicone oil may have either a straight-chain structure or a cyclic structure, and preferably has a straight-chain structure. Further, the silicone oil may be a straight silicone oil (an unmodified silicone oil) or may be a modified silicone oil.

The straight silicone oil may include a (halo)alkylpolysiloxane (for example, a (halo)$C_{1-3}$alkylpolysiloxane such as a dimethylpolysiloxane, a diethylpolysiloxane, or a trifluoropropylpolysiloxane); an arylpolysiloxane [for example, a di$C_{6-10}$arylpolysiloxane such as a diphenylpolysiloxane]; and a (halo)alkylarylpolysiloxane [for example, a $C_{1-3}$alkyl$C_{6-10}$arylpolysiloxane such as methylphenylpolysiloxane].

The modified silicone oil may include a silicone oil having a main chain formed of the straight silicone oil and denatured (or modified) with a modification group. Examples of the modification group may include a hydroxyalkyl group (e.g., a hydroxy$C_{2-4}$alkyl group such as hydroxyethyl group), a polyoxyalkylene group, an anionic group (such as carboxyl group or mercapto group), a cationic group (such as an amino group or an N-alkylamino group), a glycidyl group or epoxy group, and a polymerizable group [such as an alkenyl group, vinyl group, (meth) acryloyl group, or an alkynyl group].

The silicone oil (C) can be used in various forms and may be in the form of a silicone emulsion (an emulsion containing a silicone oil emulsified and dispersed therein).

These silicone oils may be used alone or in combination. Among them, the straight silicone oil is preferred, and a $C_{1-2}$alkylpolysiloxane such as a dimethylpolysiloxane is particularly preferred.

The silicone oil (C) has a kinetic viscosity at 25° C. of not less than 100 mm$^2$/s. The silicone oil having the kinetic viscosity of not less than 100 mm$^2$/s prevents or reduces the antifouling and/or protective function of the cured product from lowering even when the cured product is slid, worn, or degraded. The kinetic viscosity is, for example, 100 to 1,000,000 mm$^2$/s, preferably 200 to 500,000 mm$^2$/s, more preferably 500 to 100,000 mm$^2$/s, and most preferably 1000 to 10,000 mm$^2$/s. In a case where the kinetic viscosity of the silicone oil (C) is excessively low, the durability of the antifouling and/or protective function (for example, a function of accelerating sliding of snow and ice, a non-tacky function, and a water-repellent function) may be decreased. In a case where the kinetic viscosity is excessively high, the silicone oil has a decreased handleability, making difficult to prepare the composition.

In the description and claims, the kinetic viscosity can be measured by a falling ball viscometer in accordance with JIS Z8803.

The silicone oil (C) may be a commercially available product, and, for example, there may be used KF-96 series (manufactured by Shin-Etsu Chemical Co., Ltd.), KF-965 series (manufactured by Shin-Etsu Chemical Co., Ltd.), SH200 series (manufactured by Dow Corning Toray Co., Ltd.), TSF451 series (manufactured by Momentive Performance Materials Japan LLC), and YF-33 series (manufactured by Momentive Performance Materials Japan LLC).

The proportion of the silicone oil (C) in the composition may be 0.1 to 10% by mass, and is preferably 0.5 to 5% by mass, more preferably 1 to 3% by mass, and most preferably 1.5 to 2.5% by mass. The ratio of the silicone oil (C) relative to 100 parts by mass of the total of the first oligomer and the second oligomer is, for example, 1 to 20 parts by mass, preferably 3 to 10 parts by mass, and more preferably 5 to 7 parts by mass. In a case where the proportion of the silicone oil (C) is excessively low, the antifouling or protective function (for example, a function of accelerating sliding of snow and ice, a non-tacky function, and a water-repellent function) may easily be decreased. In a case where the proportion of the silicone oil (C) is excessively high, the cured product may easily decrease in mechanical properties or adhesion to an antifouling or protective object.

The total proportion of the first oligomer (A), the second oligomer (B), and the silicone oil (C) in the composition is 21 to 51% by mass, preferably 26 to 46% by mass, more preferably 31 to 43% by mass, and most preferably 36 to 41% by mass. In a case where the total proportion is excessively low, the productivity of the cured product may easily be decreased. In a case where the total proportion is excessively high, the workability (applicability) may easily be decreased, lowering the appearance of the cured product.

(D) Curing Catalyst

The curing catalyst (D) is a curing catalyst that is hydrolyzed by the reaction with water or moisture in the air to produce an active "metal atom-OH" in curing the curable composition at room temperature and condenses the first oligomer and the second oligomer.

The curing catalyst is at least one selected from the group consisting of a metal alkoxide, a metal chelate compound, and a metal carboxylate.

The metal alkoxide may include, for example, a titanium alkoxide [e.g., a titanium tri$C_{1-8}$alkoxide such as titanium tributoxide; and a titanium tetra$C_{1-8}$alkoxide such as titanium tetramethoxide, titanium tetraethoxide, titanium tetra-n-propoxide, titanium tetraisopropoxide, titanium tetra-n-butoxide, titanium tetraisobutoxide, titanium tetrapentoxide, titanium tetrahexoxide, or titanium tetra(2-ethylhexoxide)], an aluminum alkoxide (e.g., an aluminum tri$C_{1-8}$alkoxide such as aluminum triethoxide, aluminum tri-n-propoxide, aluminum triisopropoxide, aluminum tri-s-butoxide, or aluminum tri-n-butoxide), a zirconium alkoxide (e.g., a zirconium tetra$C_{1-8}$alkoxide such as zirconium tetra-n-butoxide or zirconium tetra-n-propoxide), a germanium alkoxide (e.g., a germanium tetra$C_{1-8}$alkoxide such as germanium tetraethoxide), a tin alkoxide (e.g., a tin tetra$C_{1-8}$alkoxide such as tin tetra-n-butoxide or tin tetra-t-butoxide), a hafnium alkoxide (e.g., a hafnium tetra$C_{1-8}$alkoxide such as hafnium tetra-2-propoxide or hafnium tetra-t-butoxide), a niobium alkoxide (e.g., a niobium penta$C_{1-8}$alkoxide such as niobium pentaethoxide), and a tantalum alkoxide (e.g., a tantalum pentaC$_{1-8}$alkoxide such as tantalum penta-n-butoxide or tantalum pentaethoxide). These metal alkoxides may be used alone or in combination.

Among them, the titanium alkoxide and the aluminum alkoxide are preferred, a titanium tetraalkoxide and an aluminum trialkoxide are particularly preferred. A plurality of alkoxy groups in the metal alkoxide differ from one another in reactivity depending the number of carbons or the presence or absence of branched chain(s). Meanwhile, in a case where the hydrolysis excessively fast proceeds, the composition may have a decreased handleability (stability). Accordingly, considering the reactivity and the stability, particularly preferred among the titanium tetraalkoxides is a titanium tetraC$_{2-4}$alkoxide such as titanium tetraethoxide, titanium tetraisopropoxide, titanium tetraisobutoxide, or titanium tetra-n-butoxide, and particularly preferred among the aluminum trialkoxides is an aluminum triC$_{2-4}$alkoxide such as aluminum triethoxide, aluminum triisopropoxide, or aluminum tri-s-butoxide.

The metal alkoxide may be a commercially available product, and there may be used, for example, D-25 (titanium tetra-n-butoxide, manufactured by Shin-Etsu Chemical Co., Ltd.).

The metal chelate compound may include, for example, a metal chelate compound having a metal coordinated with a ligand, examples of the ligand may include a β-diketone, a phosphate ester, and an alkanolamine.

Examples of the β-diketone may include a C$_{3-18}$alkanedione such as 2,4-pentanedione, 2,4-hexanedione, 3,5-heptanedione, 2,4-octanedione, 2,4-decanedione, or 2,4-tridecanedione; a C$_{1-3}$alkylC$_{3-18}$alkanedione such as 5,5-dimethyl-2,4-hexanedione, 2,2-dimethyl-3,5-nonanedione, or 2,2,6,6-tetramethyl-3,5-heptanedione; an arylC$_{3-18}$alkanedione such as 1,3-diphenyl-1,3-propanedione; a cycloalkanedione such as 1,3-cyclopentanedione or 1,3-cyclohexanedione; a C$_{1-3}$alkyl acetoacetate such as methyl acetoacetate or ethyl acetoacetate; and an aryl acetoacetate such as phenyl acetoacetate. The phosphate ester may include, for example, an alkyl phosphate such as 2-ethylhexyl phosphate. Examples of the alkanolamine may include monoethanolamine, diethanolamine, and triethanolamine.

These ligands may be used alone or in combination. Among them, the β-diketone is preferred, and a C$_{3-12}$alkanedione such as 2,4-pentanedione is particularly preferred.

Examples of a central metal (metal atom) forming the metal chelate compound may include, but should not be limited to, aluminum, titanium, zirconium, niobium, magnesium, calcium, chromium, manganese, iron, cobalt, nickel, copper, zinc, gallium, palladium, indium, and tin. These metals may be used alone or in combination. Among them, aluminum, titanium, and zirconium are preferred.

Specific examples of the metal chelate compound may include an aluminum chelate compound [e.g., tris(2,4-pentanedionato)aluminum, tris(ethylacetoacetonato)aluminum, and bis(ethylacetoacetonato)(2,4-pentanedionato)aluminum], a titanium chelate compound [e.g., tetrakis(2,4-pentanedionato)titanium and tetrakis(ethylacetoacetate)titanium], a zirconium chelate compound [e.g., tetrakis(2,4-pentanedionato)zirconium and tetrakis(ethylacetoacetate) zirconium], a niobium chelate compound [e.g., tetrakis(2,2,6,6-tetramethyl-3,5-heptanedionatoniobium (IV)], a magnesium chelate compound [e.g., diaquabis(2,4-pentanedionato)magnesium], a calcium chelate compound [e.g., diaquabis(2,4-pentanedionato)calcium], a chromium chelate compound [e.g., tris(2,4-pentanedionato)chromium), a manganese chelate compound [e.g., diaquabis(2,4-pentanedionato)manganese], an iron chelate compound [e.g., tris(2,4-pentanedionato)iron], a cobalt chelate compound [e.g., tris(2,4-pentanedionato)cobalt], a nickel chelate compound [e.g., bis(2,4-pentanedionato)nickel], a copper chelate compound [e.g., bis(2,4-pentanedionato)copper], a zinc chelate compound [e.g., bis(2,4-pentanedionato)zinc], a gallium chelate compound [e.g., tris(2,4-pentanedionato)gallium), a palladium chelate compound [e.g., bis(2,4-pentanedionato) palladium], an indium chelate compound (e.g., tris(2,4-pentanedionato)indium], and a tin chelate compound [e.g., bis(2,4-pentanedionato)tin]. These metal chelate compounds may be used alone or in combination.

Preferred chelate compounds among them are the aluminum chelate compound [e.g., a trisC$_{3-8}$alkanedionatoaluminum such as tris(2,4-pentanedionato)aluminum], the titanium chelate compound [e.g., a tetrakisC$_{3-8}$alkanedionatotitanium such as tetrakis(2,4-pentanedionato)titanium], and the zirconium chelate compound [e.g., a tetrakisC$_{3-8}$alkanedionatozirconium such as tetrakis(2,4-pentanedionato)zirconium]. From the viewpoint of maintaining an excellent solidity (strength) in the cured layer, particularly preferred are the aluminum chelate compound [in particular, a trisC$_{3-6}$alkanedionatoaluminum] and the titanium chelate compound [in particular, a tetrakisC$_{3-6}$alkanedionatotitanium].

Moreover, the metal chelate compound may be an alkoxy-group-containing metal chelate compound which has an alkoxy group in addition to the ligand. The alkoxy group may include, for example, a C$_{1-12}$alkoxy group such as methoxy group, ethoxy group, n-propoxy group, 2-propoxy group, n-butoxy group, 2-butoxy group, or 2-ethyl-hexoxy group. These alkoxy groups may be used alone or in combination. Among these alkoxy groups, a C$_{1-4}$alkoxy group such as 2-propoxy group is preferred. The alkoxy-group-containing metal chelate compound may include, for example, an alkoxy-group-containing aluminum chelate compound such as aluminum ethyl acetoacetate diisopropylate, and an alkoxy-group-containing titanium chelate compound such as bis(2,4-pentanedionato)bis(2-propanolato)titanium.

In the metal carboxylate (a metal salt of a carboxylic acid), the carboxylic acid may include, for example, a straight-chain C$_{2-18}$aliphatic carboxylic acid such as ethanoic acid (acetic acid), propanoic acid (propionic acid), butanoic acid (butyric acid), pentanoic acid, hexanoic acid, heptanoic acid, octanoic acid, nonanoic acid, decanoic acid, dodecanoic acid, or tetradecanoic acid; a branched-chain C$_{4-18}$aliphatic carboxylic acid such as 2-methylbutanoic acid, 2-methylpentanoic acid, 2-ethylhexanoic acid, 2-methylheptanoic acid, 4-methyloctanoic acid, or 3,5,5-trimethylhexanoic acid; and an alicyclic carboxylic acid such as naphthenic acid. These carboxylic acids may be used alone or in combination. Among them, a branched-chain aliphatic carboxylic acid is preferred, and a branched-chain C$_{6-10}$aliphatic carboxylic acid such as 2-ethylhexanoic acid is particularly preferred.

The metal forming the metal carboxylate is not particularly limited to a specific one, and examples of the metal may include a metal exemplified as the metal forming the metal chelate compound. The metals may be used alone or in combination. Incidentally, a carboxylic acid that does not form the salt is difficult to dehydrate and condense the first and second oligomers and fails to accelerate curing at room temperature, and thus such a carboxylic acid is not preferred as the curing catalyst.

The metal carboxylate may include, for example, an aluminum carboxylate, a titanium carboxylate, a zirconium carboxylate, a niobium carboxylate, a magnesium carboxylate, a calcium carboxylate, a chromium carboxylate, a manganese carboxylate, an iron carboxylate, a cobalt carboxylate, a nickel carboxylate, a copper carboxylate, a zinc carboxylate, a gallium carboxylate, a palladium carboxylate, an indium carboxylate, a tin carboxylate, and a tantalum carboxylate. These metal carboxylates may be used alone or in combination.

Among these metal carboxylates, the zinc carboxylate, the iron carboxylate, the cobalt carboxylate, and the manganese carboxylate are preferred.

Examples of the zinc carboxylate may include a zinc branched-chain $C_{2-12}$aliphatic carboxylate such as zinc acetate or zinc bis(2-ethylhexanoate); and a zinc alicyclic carboxylate such as zinc naphthenate. Among them, a zinc branched-chain $C_{6-10}$aliphatic carboxylate such as zinc bis(2-ethylhexanoate) is preferred.

The iron carboxylate may include, for example, an iron branched-chain $C_{2-12}$aliphatic carboxylate such as iron acetate or iron bis(2-ethylhexanoate); and an iron alicyclic carboxylate such as iron naphthenate. Among them, an iron branched-chain $C_{6-10}$aliphatic carboxylate such as iron bis(2-ethylhexanoate) is preferred.

Examples of the cobalt carboxylate may include a cobalt branched-chain $C_{2-12}$aliphatic carboxylate such as cobalt acetate or cobalt bis(2-ethylhexanoate); and a cobalt alicyclic carboxylate such as cobalt naphthenate. Among them, a cobalt branched-chain $C_{6-10}$aliphatic carboxylate such as cobalt bis(2-ethylhexanoate) is preferred.

The manganese carboxylate may include, for example, a manganese branched-chain $C_{2-12}$aliphatic carboxylate such as manganese acetate or manganese bis(2-ethylhexanoate); and a manganese alicyclic carboxylate such as manganese naphthenate. Among them, a manganese branched-chain $C_{6-10}$aliphatic carboxylate such as manganese bis(2-ethylhexanoate) is preferred.

These curing catalysts may be used alone or in combination. It is preferred that each of the metal alkoxide, the metal chelate compound, and the metal carboxylate be used alone. Moreover, the curing catalyst may be prepared as a catalyst solution containing the curing catalyst dissolved in the after-mentioned solvent.

The proportion of the curing catalyst (D) in the composition is 0.1 to 25% by mass, preferably 3 to 20% by mass, and more preferably 5 to 15% by mass. The ratio of the curing catalyst (D) relative to 100 parts by mass of the total of the first oligomer (A) and the second oligomer (B) may be, for example, about 1 to 55 parts by mass, and a preferred range of the ratio is 2 to 55 parts by mass, 2 to 50 parts by mass, 5 to 40 parts by mass, and 10 to 38 parts by mass in a stepwise manner, and a most preferred one is 20 to 35 parts by mass. An excessively low proportion of the curing catalyst tends to make it difficult to cure the composition rapidly at room temperature. In contrast, an excessively high proportion of the curing catalyst tends to fasten the curing, resulting in lowering of the coatability or lowering of the antifouling or protective function (for example, a non-tacky function, a function of sliding snow and ice, and a water-repellent function).

(E) Solvent

The solvent (E) contains an organic solvent having a vapor pressure at 20° C. of not less than 1 kPa (7.5 mmHg) (an organic solvent having a high vapor pressure). The solvent (E) containing the organic solvent having a high vapor pressure allows the applicability of the composition to be improved.

The vapor pressure at 20° C. of the solvent (E) can be selected from the range of about 1 to 100 kPa (7.5 to 750 mmHg) and is, for example, 2 to 25 kPa, preferably 2.5 to 10 kPa, more preferably 3 to 7 kPa, and most preferably 3.5 to 5 kPa. In a case where the vapor pressure is excessively low, the solvent cannot be removed (distilled off) rapidly in curing the composition at room temperature, thus failing to form a cured layer. In a case where the vapor pressure is excessively high, the solvent tends to be excessively removed (distilled off), forming a cured layer with an uneven thickness and a lowered appearance.

The solvent having a high vapor pressure may include, for example, an alcohol-series solvent such as methyl alcohol, ethyl alcohol, or isopropyl alcohol (2-propanol); an ester-series solvent such as ethyl acetate, butyl acetate, methoxybutyl acetate, ethyl glycol acetate, or amyl acetate; a glycol ether-series solvent having a high vapor pressure, such as ethylene glycol dimethyl ether; a ketone-series solvent such as methyl ethyl ketone, methyl isobutyl ketone, diisobutyl ketone, or acetylacetone; a paraffin-series solvent having a high vapor pressure, such as n-hexane, n-heptane, n-octane, or isooctane; a naphthene-series solvent such as cyclopentane or cyclohexane; and an aromatic hydrocarbon-series solvent such as benzene, toluene, xylene, or trimethylbenzene. These solvents may be used alone or in combination.

Among them, the alcohol-series solvent is preferred. In a case where the solvent is the alcohol-series solvent, the alcohol formation reaction by hydrolysis of the alkoxy groups in the first oligomer and the second oligomer in the curable composition before use (application or coating) [that is, the curable composition in storage (keeping)] is an equilibrium reaction. Thus, the alcohol formation by the oligomers can be prevented or reduced, and the storage stability of the curable composition can be improved. Further, among the alcohol-series solvents, a $C_{1-4}$alkanol is preferred, and a $C_{2-3}$alkanol such as 2-propanol is particularly preferred.

The solvent contains at least the organic solvent having a high vapor pressure and may contain an organic solvent having a vapor pressure at 20° C. of less than 1 kPa (an organic solvent having a low vapor pressure), in addition to the organic solvent having a high vapor pressure. The organic solvent having a low vapor pressure may include, for example, a glycol ether-series solvent having a low vapor pressure, such as diethylene glycol dimethyl ether or diethylene glycol diethyl ether; a paraffin-series solvent having a low vapor pressure, such as mineral turpentine; and a petroleum-series solvent such as mineral spirit.

The ratio of the organic solvent having a low vapor pressure relative to 100 parts by mass of the organic solvent having a high vapor pressure is, for example, not more than 15 parts by mass, preferably not more than 10 parts by mass, more preferably not more than 5 parts by mass, more preferably not more than 3 parts by mass, and most preferably not more than 1 part by mass. Moreover, a preferred range of the proportion of the organic solvent having a low vapor pressure in the composition is less than 10% by mass, not more than 5% by mass, not more than 3% by mass, not more than 1% by mass, and not more than 0.5% by mass in a stepwise manner, and a most preferred range is not more than 0.1% by mass.

Furthermore, from the viewpoint of avoiding excessive acceleration of the curing reaction of the first oligomer and the second oligomer, it is preferred that the solvent (E) contain substantially no water. The proportion of water in the composition may be not more than 1% by mass and is preferably not more than 0.5% by mass, more preferably not more than 0.1% by mass. It is most preferred that the composition contain no water.

The proportion of the solvent (E) (in particular, the organic solvent having a high vapor pressure) in the composition is 10 to 80% by mass, preferably 20 to 75% by mass, more preferably 30 to 70% by mass, more preferably 40 to 65% by mass, and most preferably 50 to 60% by mass. The ratio of the solvent (E) (in particular, the organic solvent having a high vapor pressure) relative to 100 parts by mass of the total of the first oligomer (A), the second oligomer (B), and the silicone oil (C) is, for example, 40 to 300 parts by mass, preferably 80 to 250 parts by mass, more preferably 120 to 200 parts by mass, and most preferably 140 to 160 parts by mass. In a case where the proportion of the solvent (E) is excessively low, the composition may decrease in handleability, easily forming a cured layer having an uneven thickness due to excessively rapid progress of drying after application. In a case where the proportion of the solvent (E) is excessively high, the composition may easily decrease the yield for the resulting cured layer.

(F) Other Components

The curable composition (for example, the antifouling or protective composition) of the present invention may further contain a pigment according to the use and purpose of the composition. The pigment may include an inorganic pigment and an organic pigment. Among them, the inorganic pigment is preferred from the viewpoint of weatherability (weather resistance) or others.

The inorganic pigment may include, for example, a metal simple substance such as aluminum or silver; a metal oxide such as zinc oxide, aluminum oxide, chromium oxide, titanium oxide ($TiO_2$), or an iron oxide [e.g., an iron oxyhydroxide (FeOOH)]; a metal complex oxide such as $CuCr_2O_4$, $Cu(Cr,Mn)_2O_4$, $Cu(Fe,Mn)_2O_4$, $Co(Fe,Cr)_2O_4$, $CoAl_2O_4$, or $Co_2TiO_4$; and a pearl mica (a pigment that is a natural mica or synthetic mica coated with a metal oxide such as titanium oxide or tin oxide). These inorganic pigments may be used alone or in combination. Among them, the metal oxide and the metal complex oxide are preferred.

The pigment may be in granular, plate, scaly or other forms. The pigment has an average particle size of, for example, 0.01 to 500 μm, preferably 0.1 to 200 μm, more preferably 0.5 to 100 μm, and most preferably 1 to 10 μm.

The proportion of the pigment can suitably be selected according to the color development, concealing property, or other properties of the cured product (e.g., a cured layer such as an antifouling or protective layer) and is not more than 30% by mass, for example, 0.1 to 10% by mass, in the composition.

The curable composition of the present invention may further contain a conventional additive. The conventional additive may include, for example, an antifouling agent (e.g., copper suboxide (copper(I) oxide), an organic tin compound, and a thiocarbamate compound), a stabilizer (e.g., an antioxidant, an ultraviolet absorber, and a heat stabilizer), a plasticizer, an antistatic agent, a flame retardant, a dispersing agent, a surfactant, a filler, a viscosity modifier, a preservative, an antifungal agent, an antibacterial agent, and a leveling agent. The proportion of the conventional additive in the composition is not more than 30% by mass, for example, not more than 0.1 to 10% by mass.

[Process for Preparing Curable Composition]

The curable composition of the present invention (for example, the antifouling or protective composition) may be prepared as a one-pot (or one-pack) curable composition or may be prepared as a two-pot (or two-pack) curable composition.

In a case where the composition is prepared as a one-pot curable composition, for example, the first oligomer (A), the second oligomer (B), the silicone oil (C), the curing catalyst (D), and the solvent (E), and, if necessary, other components (F) are added in the state of no water (moisture) in the air. Specifically, each component may be mixed in an atmosphere of an inert gas such as nitrogen gas and the resulting mixture may be sealed in a container. Incidentally, in a case where the pigment is added as other components (F), the pigment may previously be dispersed in an organic solvent and then mixed with other components. In usual cases, the container having the resulting one-pot curable composition therein is opened in the scene of application just before use and then the composition is applied to a substrate (an object for imparting non-tackiness, antifouling, or protection).

In a case where the composition is prepared as a two-pot curable composition, for example, the first oligomer (A), the second oligomer (B), the silicone oil (C), and the organic solvent (D), and, if necessary other components (F) may firstly be mixed to prepare a silicone composition. Incidentally, in a case where the pigment is added as other components (F), the pigment may previously be dispersed in an organic solvent and then mixed as in the same manner as the one-pot curable composition. For the two-pot curable composition, the catalyst (D) is separately prepared. In usual cases, thus prepared two-pot curable composition (the silicone composition and the catalyst) is mixed in the scene of application to prepare a coating composition.

[Use of Curable Composition]

The curable composition of the present invention can be used as various coating compositions (a coating or paint composition or an antifouling and/or protective composition), and, for example, may be applied to a surface of a substrate and cured to form a cured product for use. Specifically, the surface of the substrate is coated with the curable composition of the present invention and the coated composition is cured to form a cured product which can impart non-tackiness and water repellency to the substance. The cured product may be a cured layer that coats the surface of the substrate or may be a cured product penetrated inside the substrate. Moreover, a portion of the cured product may form a cured layer that coats the surface of the substrate and the residual portion thereof may form a cured product penetrated inside the substrate. For example, a surface of an antifouling and/or protective object as the substrate is coated with the curable composition of the present invention and the coated composition is cured to form a protective layer which can prevent adhesion of snow and/or ice to the protective object (in particular, which can accelerate sliding of snow and ice) or which can prevent adhesion of oil and/or water scale to the antifouling object. Moreover, by treating a water-permeable substrate (e.g., a shaped concrete product) with the curable composition and curing the composition, water penetration (water permeation) to the water-permeable substrate can be prevented. Incidentally, examples of a method of treating the water-permeable substrate such as the shaped concrete product may include a method of coating the surface of the water-permeable substrate with the curable composition and curing the composition. The coated composition may form a cured layer on the surface of the water-permeable substrate or may penetrate inside the water-permeable substrate and be cured at the inside of the substrate. For the shaped concrete product, at least a portion of the curable composition often penetrates inside the shaped product, and usually a portion of the curable composition forms a cured layer on the surface of the shaped product and the residual portion thereof is cured in the state penetrated inside the shaped product.

The coating method may include, for example, a spray coating method, a bar coating method, a spin coating method, a dispenser method, a brush coating, a knife coating, a roller coating, and a dipping method. Among these methods, the spray coating method is preferred.

According to the present invention, the coated composition can be cured by allowing the composition to stand at room temperature together with the substrate (an object for imparting non-tackiness, antifouling, or protection). The standing time is not particularly limited to a specific one and is a time enough to distil off (removing) the solvent (E) and to cure the first oligomer (A) and the second oligomer (B) in the presence of the curing catalyst (D). For example, the standing time is not less than 30 minutes, preferably not less than one hour, more preferably not less than 5 hours, and most preferably not less than 10 hours (e.g., about 10 to 50 hours).

According to the present invention, allowing the composition to stand at room temperature forms OH groups from alkoxy groups in the first oligomer (A) and the second oligomer (B), and the OH groups undergo dehydration reaction with the "metal atom-OH" groups of the curing catalyst (D), making the progress of the curing reaction. Subsequently, by-product alcohol in forming OH groups from alkoxy groups of the first oligomer (A) and the second oligomer (B) is removed (distilled off) together with the solvent (E), and a cured product of the curable composition is obtained.

Incidentally, the curable composition of the present invention may be a room-temperature-curable type, and if necessary, may be heated after the curing at room temperature (subjected to further thermal curing) or may be thermally cured instead of the room-temperature curing. The heating temperature is not particularly limited to a specific one and may be not less than 50° C. (for example, about 50 to 120° C.). The heating can further improve the hardness of the cured product.

The cured product (in particular, the cured layer) has a pencil hardness of, for example, not less than 2H, preferably not less than 4H (e.g., 4H to 9H). In the description and claims, the pencil hardness can be measured in accordance with JIS K 5600-5-4(1999). Specifically, the pencil hardness of the cured layer can be measured by a method described in the after-mentioned Examples (in particular, a method of standing at 23° C. for 24 hours).

In a case where the cured product forms a cured layer, the cured layer has an average thickness of, for example, 20 to 80 μm, preferably 30 to 60 μm. In the description and claims, the average thickness can be measured as an average value of three points measured by a thickness meter, specifically can be measured according to a method described in the after-mentioned Examples.

EXAMPLES

The following examples are intended to describe this invention in further detail and should by no means be interpreted as defining the scope of the invention. Materials used in the following Examples and Comparative Examples are shown below.

[Materials]

(A) First Oligomer

KR-500: Methyl-series silicone alkoxy oligomer having units represented by the formulae (1a) to (1d), wherein b is 10 and c is 4, manufactured by Shin-Etsu Chemical Co., Ltd.

(B) Second Oligomer

X-40-9250: Methyl-series silicone alkoxy oligomer having units represented by the formulae (2a) to (2e), wherein i is 8, j is 4, and k is 4, manufactured by Shin-Etsu Chemical Co., Ltd.

(C) Silicone Oil

KF-96-10cs: Polydimethylsiloxane, kinetic viscosity (25° C.): 10 $mm^2/s$, manufactured by Shin-Etsu Chemical Co., Ltd.

KF-96-50cs: Polydimethylsiloxane, kinetic viscosity (25° C.): 50 $mm^2/s$, manufactured by Shin-Etsu Chemical Co., Ltd.

KF-96-100cs: Polydimethylsiloxane, kinetic viscosity (25° C.): 100 $mm^2/s$, manufactured by Shin-Etsu Chemical Co., Ltd.

KF-96-1000cs: Polydimethylsiloxane, kinetic viscosity (25° C.): 1,000 $mm^2/s$, manufactured by Shin-Etsu Chemical Co., Ltd.

KF-96-10000cs: Polydimethylsiloxane, kinetic viscosity (25° C.): 10,000 $mm^2/s$, manufactured by Shin-Etsu Chemical Co., Ltd.

KF-96-100000cs: Polydimethylsiloxane, kinetic viscosity (25° C.): 100,000 $mm^2/s$, manufactured by Shin-Etsu Chemical Co., Ltd.

KF-96-500000cs: Polydimethylsiloxane, kinetic viscosity (25° C.): 500,000 $mm^2/s$, manufactured by Shin-Etsu Chemical Co., Ltd.

KF-96-1000000cs: Polydimethylsiloxane, kinetic viscosity (25° C.): 1,000,000 $mm^2/s$, manufactured by Shin-Etsu Chemical Co., Ltd.

(D) Curing Catalyst

Titanium tetrabutoxide (product name D-25): titanium (IV) tetra-n-butoxide, manufactured by Shin-Etsu Chemical Co., Ltd.

Titanium(IV) tetraisopropoxide: manufactured by Tokyo Chemical Industry Co., Ltd.

Titanium(IV) tetraethoxide: manufactured by Tokyo Chemical Industry Co., Ltd.

Aluminum(III) tri-sec-butoxide: manufactured by Tokyo Chemical Industry Co., Ltd.

Aluminum(III) triisopropoxide: manufactured by Tokyo Chemical Industry Co., Ltd.

Aluminum(III) triethoxide: manufactured by Tokyo Chemical Industry Co., Ltd.

Zirconium(IV) tetra-n-butoxide (about 80% by mass 1-butanol solution), manufactured by Tokyo Chemical Industry Co., Ltd.

Tris(2,4-pentanedionato)aluminum(III): manufactured by Tokyo Chemical Industry Co., Ltd.

Tetrakis(2,4-pentanedionato)titanium(IV) (63% by mass isopropyl alcohol solution): manufactured by Tokyo Chemical Industry Co., Ltd.

Bis(2,4-pentanedionato)bis(2-propanolato) titanium(IV) (75% by mass isopropyl alcohol solution): manufactured by Tokyo Chemical Industry Co., Ltd.

Tetrakis(2,4-pentanedionato)zirconium(IV): manufactured by Tokyo Chemical Industry Co., Ltd.

Zinc(II) bis(2-ethylhexanoate) (80% by mass diethylene glycol monomethyl ether solution): manufactured by Wako Pure Chemical Industries, Ltd.

Iron(III) tris(2-ethylhexanoate) (50% by mass mineral spirit solution): manufactured by Wako Pure Chemical Industries, Ltd.

Cobalt(II) bis(2-ethylhexanoate) (65% by mass mineral spirit solution): manufactured by manufactured by NACALAI TESQUE, INC.

Manganese(II) bis(2-ethylhexanoate) (50% by mass mineral spirit solution): manufactured by Wako Pure Chemical Industries, Ltd.

(E) Solvent

Methanol: vapor pressure at 20° C. of 13.3 kPa

Ethanol: vapor pressure at 20° C. of 6 kPa

2-Propanol: vapor pressure at 20° C. of 4 kPa

Cyclohexane: vapor pressure at 20° C. of 10.6 kPa

Acetone: vapor pressure at 20° C. of 24.7 kPa

Diethylene glycol dimethyl ether: vapor pressure at 20° C. of 0.5 kPa

Tripropylene glycol monomethyl ether: vapor pressure at 20° C. of 0.004 kPa

Propylene glycol: vapor pressure at 20° C. of 0.01 kPa

Water: vapor pressure at 20° C. of 2.3 kPa (F) Pigment 42-303B: complex oxide of copper, chromium, and manganese (black pigment), manufactured by Tokan Material Technology Co., Ltd.

Examples 1 to 47 and Comparative Examples 1 to 17

[Preparation of Curable Composition]

To a 200-ml glass container were added (A) a first oligomer, (B) a second oligomer, (C) a silicone oil, (D) a curing catalyst, and (E) a solvent at a proportion shown in Tables 1 to 6, and the mixture was stirred using a magnetic stirrer for 20 minutes to prepare a curable composition (one-pot curable composition).

[Production of Test Sample]

A plate test piece (60 mm in width, 90 mm in length and 1 mm in thickness, material: A5052 aluminum alloy) as an object was solvent-degreased with toluene and was then shot-blasted with 480 alumina particles. The curable composition was applied to one surface of the plate test piece by an air spray ("W-101-101G" manufactured by ANEST IWATA Corporation) so that the resulting cured layer had a thickness of 30 to 50 µm, and the applied test piece was allowed to stand for 18 hours under an atmosphere of a temperature of 23° C. and a humidity of 40% to give a test sample having a protective layer (cured layer) on one surface thereof. The average thickness of the protective layer of the test sample was measured using a thickness meter ("SWT-9200" manufactured by SANKO ELECTRONIC LABORATORY CO., LTD.) and a probe for thickness meter ("FN-325" manufactured by SANKO ELECTRONIC LABORATORY CO., LTD.).

[Appearance]

The protective layer was visually observed and was evaluated for the appearance (smoothness) in accordance with the following criteria. When the visual observation found minute hole(s) on the protective layer, the size of the hole(s) was measured by a digital microscope.

A: The surface of the protective layer was smooth, and the visual observation did not find hole(s).

B: The surface of the protective layer had no unevenness but had hole(s) (having a diameter of not less than 100 µm) found by visual observation.

C: The surfaced of the protective layer had unevenness.

D: The protective layer has peeling or cracks.

[Non-tackiness (releasability)]

(i) Peel Strength of Protective Layer Before Sliding Test

The protective layer was evaluated for the non-tackiness (releasability) in accordance with a 180-degree peeling method (JIS Z 0237:2009, Method 4). Specifically, first, an adhesive of an adhesive tape ("CELLOTAPE (registered trademark) product number CT405AP-18" manufactured by NICHIBAN Co., Ltd., width: 18 mm) was allowed to adhere (pressure-adhere) to the protective layer. Secondly, the adhesive tape (length: 80 mm) was peeled from the protective layer at a speed of 300 mm/min. and a peeling distance of 80 mm. Then, the non-tackiness (releasability or easy releasability)) of the protective layer was evaluated as a peel strength (g/6 mm).

(ii) Peel Strength of Protective Layer after Sliding Test

A sliding test was carried out by pressing a wool felt against the protective layer at a load of 1 kg/cm$^2$ using a sliding tester ("RUBBING TESTER" manufactured by Taiheirikakogyo Kabushiki Kaisha. Specifically, the peel strength (g/6 mm) of the protective layer after 5,000 sliding operations was measured in accordance with the above-mentioned 180-degree peeling method.

[Pencil Hardness]

The protective layer was evaluated for the hardness in accordance with a pencil hardness method (JIS K-5600-5-4(1999)). First, a vertical load of 750 g was applied to a pencil lead using a friction and wear tester ("TriboGear TYPE 38" manufactured by Shinto Scientific Co., Ltd.), and the pencil lead was set so as to contact with the protective layer at an angle of 45 degrees. Then, the pencil was moved on the protective layer at a sweep speed of 1 mm/sec. and a sweep distance of 20 mm. As the pencil, Uni 6B to 9H manufactured by Mitsubishi Pencil Co., Ltd. were used, and the hardness of the pencil of which moving on the protective layer did not scratch the protective layer was determined.

[Storage Stability]

Under room temperature (20° C.), 60 g of the curable composition (one-pot curable composition) was filled into a 100-ml vial with a stopper, and then the vial was tightly stoppered. After the curable composition in the tightly stoppered vial was allowed to stand for 4 weeks under an atmosphere of 40° C., and the state of the curable composition was evaluated on the basis of the following criteria.

A: The curable composition did not solidify, condense, or thicken.

B: The curable composition thickened compared with that at the start of storage.

C: The curable composition partly condensed and solidified.

D: Not less than half of the volume of the curable composition condensed and solidified.

Tables 1 to 6 show the evaluation results of Examples 1 to 47 and Comparative Examples 1 to 17.

TABLE 1

Table 1

| Formulation of curable composition | | Ex. 1 | Ex. 2 | Ex. 3 | Ex. 4 | Ex. 5 | Ex. 6 | Ex. 7 | Com. Ex. 1 | Com. Ex. 2 | Com. Ex. 3 | Com. Ex. 4 | Com. Ex. 5 |
|---|---|---|---|---|---|---|---|---|---|---|---|---|---|
| First oligomer (g) | KR-500 | 17.1 | 20.5 | 27.3 | 34.2 | 34.2 | 34.2 | 34.2 | 6.8 | 13.7 | 41.0 | 47.8 | 28.8 |
| Second oligomer (g) | X-40-9250 | 4.3 | 5.1 | 6.8 | 8.5 | 8.5 | 8.5 | 8.5 | 1.7 | 3.4 | 10.2 | 12.0 | 7.2 |
| Mass ratio (Second oligomer/First oligomer) | | 0.25 | 0.25 | 0.25 | 0.25 | 0.25 | 0.25 | 0.25 | 0.25 | 0.25 | 0.25 | 0.25 | 0.25 |
| Silicone oil (g) | KF-96-1000cs | 1.1 | 1.4 | 1.9 | 2.3 | 2.3 | 2.3 | 2.3 | 0.5 | 0.9 | 2.8 | 3.2 | — |
| First oligomer + Second oligomer (g) | | 21.4 | 25.6 | 34.1 | 42.7 | 42.7 | 42.7 | 42.7 | 8.5 | 17.1 | 51.2 | 59.8 | 36.0 |
| Subtotal (1) (First oligomer + Second oligomer + Silicone oil) (g) | | 22.5 | 27.0 | 30.0 | 45.0 | 45.0 | 45.0 | 45.0 | 9.0 | 18.0 | 54.0 | 63.0 | 36.0 |
| Pigment (g) | 42-303B | — | — | — | — | 5.0 | 15.0 | 25.0 | — | — | — | — | — |
| Solvent (g) | 2-Propanol Vapor pressure (4.3 kPa) | 67.5 | 63.0 | 54.0 | 45.0 | 40.0 | 30.0 | 20.0 | 81.0 | 72.0 | 35.2 | 24.4 | 54.0 |
| Mass ratio (Solvent/Subtotal (1)) | | 3.0 | 2.3 | 1.5 | 1.0 | 0.9 | 0.7 | 0.4 | 9.0 | 4.0 | 0.7 | 0.4 | 1.5 |
| Catalyst (g) | Titanium tetrabutoxide | 10.0 | 10.0 | 10.0 | 10.0 | 10.0 | 10.0 | 10.0 | 10.0 | 10.0 | 10.8 | 12.6 | 10.0 |
| Mass ratio (Catalyst/Subtotal (1)) | | 0.44 | 0.37 | 0.28 | 0.22 | 0.22 | 0.22 | 0.22 | 1.11 | 0.56 | 0.20 | 0.20 | 0.28 |
| Total (g) | | 100.0 | 100.0 | 100.0 | 100.0 | 100.0 | 100.0 | 100.0 | 100.0 | 100.0 | 100.0 | 100.0 | 100.0 |
| Evaluation | Thickness of cured layer [μm] | 34.2 | 36.1 | 33.8 | 35 | 34.5 | 35.1 | 34.6 | 33.9 | 34.9 | 34.5 | 35.1 | 34.6 |
| | Appearance After drying 23° C. × 18 hours | A | A | A | A | A | A | A | C | C | B | B | A |
| | Non-tackiness Before sliding test [N/6 mm] | 2 | 2 | 2 | 2 | 2 | 2 | 2 | 2 | 2 | 2 | 2 | 89 |
| | After sliding test [N/6 mm] | 3 | 3 | 3 | 3 | 3 | 3 | 3 | 68 | 56 | 3 | 3 | 92 |
| | Pencil hardness After drying 23° C. × 18 hours | 5H | 5H | 5H | 5H | 5H | 6H | 7H | No formation of cured layer | No formation of cured layer | 5H | 5H | 5H |
| | After drying 23° C. × 24 hours | 5H | 5H | 5H | 5H | 5H | 6H | 7H | No formation of cured layer | No formation of cured layer | 5H | 5H | 5H |
| | After heat treatment 80° C. × 30 min. | 9H | 9H | 9H | 9H | 9H | 9H | 9H | No formation of cured layer | No formation of cured layer | 9H | 9H | 9H |
| | Storage stability of curable composition After 40° C. × 4 weeks | A | A | A | A | A | A | A | A | A | A | A | A |

TABLE 2

| Formulation of curable composition | | Ex. 8 | Ex. 9 | Ex. 10 | Ex. 11 | Ex. 12 | Ex. 13 | Ex. 14 | Com. Ex. 6 | Com. Ex. 7 | Com. Ex. 8 |
|---|---|---|---|---|---|---|---|---|---|---|---|
| First oligomer (g) | KR-500 | 29.5 | 29.0 | 28.0 | 24.0 | 14.0 | 4.0 | 3.2 | 31.0 | 2.8 | 0.0 |
| Second oligomer (g) | X-40-9250 | 4.5 | 5.0 | 6.0 | 10.0 | 20.0 | 30.0 | 30.8 | 3.0 | 31.2 | 34.0 |
| Mass ratio (Second oligomer/First oligomer) | | 0.15 | 0.17 | 0.21 | 0.42 | 1.43 | 7.50 | 9.63 | 0.10 | 11.14 | ∞ |
| Silicone oil (g) | KF-96-1000cs | 2.0 | 2.0 | 2.0 | 2.0 | 2.0 | 2.0 | 2.0 | 2.0 | 2.0 | 2.0 |
| First oligomer + Second oligomer (g) | | 34.0 | 34.0 | 34.0 | 34.0 | 34.0 | 34.0 | 34.0 | 34.0 | 34.0 | 34.0 |
| Subtotal (1) (First oligomer + Second oligomer + Silicone oil) (g) | | 36.0 | 36.0 | 36.0 | 36.0 | 36.0 | 36.0 | 36.0 | 36.0 | 36.0 | 36.0 |
| Solvent (g) | 2-Propanol | 54.0 | 54.0 | 54.0 | 54.0 | 54.0 | 54.0 | 54.0 | 54.0 | 54.0 | 54.0 |
| Mass ratio (Solvent/Subtotal (1)) | | 1.5 | 1.5 | 1.5 | 1.5 | 1.5 | 1.5 | 1.5 | 1.5 | 1.5 | 1.5 |
| Catalyst (g) | Titanium tetrabutoxide | 10.0 | 10.0 | 10.0 | 10.0 | 10.0 | 10.0 | 10.0 | 10.0 | 10.0 | 10.0 |
| Mass ratio (Catalyst/Subtotal (1)) | | 0.28 | 0.28 | 0.28 | 0.28 | 0.28 | 0.28 | 0.28 | 0.28 | 0.28 | 0.28 |
| Total (g) | | 100.0 | 100.0 | 1000 | 100.0 | 100.0 | 100.0 | 100.0 | 100.0 | 100.0 | 100.0 |
| Thickness of cured layer [μm] | | 36.5 | 35.5 | 34.9 | 36.1 | 34.4 | 35.2 | 35.6 | 34.6 | 34.3 | 34.2 |
| Evaluation | Appearance | After drying 23° C. × 18 hours | A | A | A | A | A | A | A | A | A | A |
| | Non-tackiness | Before sliding test [N/6 mm] | 0 | 1 | 2 | 2 | 2 | 2 | 2 | 0 | 2 | 0 |
| | | After sliding test [N/6 mm] | 11 | 8 | 4 | 3 | 4 | 4 | 3 | 41 | 51 | 41 |
| | Pencil hardness | After drying 23° C. × 18 hours | 5H | 5H | 5H | 5H | 5H | 5H | 5H | 5H | 4H | 2H |
| | | After drying 23° C. × 24 hours | 5H | 5H | 5H | 5H | 5H | 5H | 5H | 5H | 4H | 2H |
| | | After heat treatment 80° C. × 30 min. | 9H | 9H | 9H | 9H | 9H | 9H | 9H | 9H | 7H | 3H |
| | Storage stability of curable composition | After 40° C. × 4 weeks | A | A | A | A | A | A | A | A | A | A |

TABLE 3

| Formulation of curable composition | | Ex. 15 | Ex. 16 | Ex. 17 | Ex. 18 | Ex. 19 | Ex. 20 | Com. Ex. 9 | Com. Ex. 10 |
|---|---|---|---|---|---|---|---|---|---|
| First oligomer (g) | KR-500 | 27.2 | 27.2 | 27.2 | 27.2 | 27.2 | 27.2 | 27.2 | 27.2 |
| Second oligomer (g) | X-40-9250 | 6.8 | 6.8 | 6.8 | 6.8 | 6.8 | 6.8 | 6.8 | 6.8 |
| Mass ratio (First oligomer/Second oligomer) | | 0.25 | 0.25 | 0.25 | 0.25 | 0.25 | 0.25 | 0.25 | 0.25 |
| Silicone oil (g) | KF-96-10cs | — | — | — | — | — | — | 2.0 | — |
| | KF-96-50cs | — | — | — | — | — | — | — | 2.0 |
| | KF-96-100cs | 2.0 | — | — | — | — | — | — | — |
| | KF-96-1000cs | — | 2.0 | — | — | — | — | — | — |
| | KF-96-10000cs | — | — | 2.0 | — | — | — | — | — |
| | KF-96-100000cs | — | — | — | 2.0 | — | — | — | — |
| | KF-96-500000cs | — | — | — | — | 2.0 | — | — | — |
| | KF-96-1000000cs | — | — | — | — | — | 2.0 | — | — |
| First oligomer + Second oligomer (g) | | 34.0 | 34.0 | 34.0 | 34.0 | 34.0 | 34.0 | 34.0 | 34.0 |
| Subtotal (1) (First oligomer + Second oligomer + Silicone oil) (g) | | 36.0 | 36.0 | 36.0 | 36.0 | 36.0 | 36.0 | 36.0 | 36.0 |
| Solvent (g) | 2-Propanol | 54.0 | 54.0 | 54.0 | 54.0 | 54.0 | 54.0 | 54.0 | 54.0 |
| Mass ratio (Solvent/Subtotal (1)) | | 1.5 | 1.5 | 1.5 | 1.5 | 1.5 | 1.5 | 1.5 | 1.5 |
| Catalyst (g) | Titanium tetrabutoxide | 10.0 | 10.0 | 10.0 | 10.0 | 10.0 | 10.0 | 10.0 | 10.0 |

TABLE 3-continued

| Formulation of curable composition | | | Ex. 15 | Ex. 16 | Ex. 17 | Ex. 18 | Ex. 19 | Ex. 20 | Com. Ex. 9 | Com. Ex. 10 |
|---|---|---|---|---|---|---|---|---|---|---|
| Mass ratio (Catalyst/Subtotal (1)) | | | 0.28 | 0.28 | 0.28 | 0.28 | 0.28 | 0.28 | 0.28 | 0.28 |
| Total (g) | | | 100.0 | 100.0 | 100.0 | 100.0 | 100.0 | 100.0 | 100.0 | 100.0 |
| Thickness of cured layer [μm] | | | 34.2 | 34.1 | 33.2 | 33.6 | 35.1 | 32.8 | 33.7 | 34.4 |
| Evaluation | Appearance | After drying 23° C. × 18 hours | A | A | A | A | A | A | A | A |
| | Non-tackiness | Before sliding test [N/6 mm] | 2 | 2 | 2 | 1 | 0 | 0 | 37 | 33 |
| | | After sliding test [N/6 mm] | 9 | 3 | 2 | 2 | 2 | 2 | 53 | 46 |
| | Pencil hardness | After drying 23° C. × 18 hours | 5H | 5H | 5H | 5H | 5H | 5H | 5H | 5H |
| | | After drying 23° C. × 24 hours | 5H | 5H | 5H | 5H | 5H | 5H | 5H | 5H |
| | | After heat treatment 80° C. × 30 min. | 9H | 9H | 9H | 9H | 9H | 9H | 9H | 9H |
| | Storage stability of curable composition | After 40° C. × 4 weeks | A | A | A | A | A | A | A | A |

TABLE 4

| Formulation of curable composition | | Ex. 21 | Ex. 22 | Ex. 23 | Ex. 24 | Ex. 25 | Ex. 26 | Ex. 27 | Ex. 28 | Ex. 29 | Com. Ex. 11 |
|---|---|---|---|---|---|---|---|---|---|---|---|
| First oligomer (g) | KR-500 | 27.2 | 27.2 | 27.2 | 27.2 | 27.2 | 27.2 | 27.2 | 27.2 | 27.2 | 27.2 |
| Second oligomer (g) | X-40-9250 | 6.8 | 6.8 | 6.8 | 6.8 | 6.8 | 6.8 | 6.8 | 6.8 | 6.8 | 6.8 |
| Mass ratio (Second oligomer/First oligomer) | | 0.25 | 0.25 | 0.25 | 0.25 | 0.25 | 0.25 | 0.25 | 0.25 | 0.25 | 0.25 |
| Silicone oil (g) | KF-96-1000cs | 2.0 | 2.0 | 2.0 | 2.0 | 2.0 | 2.0 | 2.0 | 2.0 | 2.0 | 2.0 |
| First oligomer + Second oligomer (g) | | 34.0 | 34.0 | 34.0 | 34.0 | 34.0 | 34.0 | 34.0 | 34.0 | 34.0 | 34.0 |
| Subtotal (1) (First oligomer + Second oligomer + Silicone oil) (g) | | 36.0 | 36.0 | 36.0 | 36.0 | 36.0 | 36.0 | 36.0 | 36.0 | 36.0 | 36.0 |
| Solvent (g) | 2-Propanol | 63.3 | 56.8 | 46.0 | 54.0 | 54.0 | 54.0 | 54.0 | 54.0 | 54.0 | 64.0 |
| Mass ratio (Solvent/Subtotal (1)) | | 0.8 | 1.6 | 1.3 | 1.5 | 1.5 | 1.6 | 1.5 | 1.5 | 1.5 | 1.8 |
| Catalyst (g) | Titanium tetrabutoxide | 0.7 | 7.2 | 18.0 | — | — | — | — | — | — | — |
| | Titanium(IV) tetraisopropoxide | — | — | — | 10.0 | — | — | — | — | — | — |
| | Titanium(IV) tetraethoxide | — | — | — | — | 10.0 | — | — | — | — | — |
| | Aluminum(III) tri-sec-butoxide | — | — | — | — | — | 10.0 | — | — | — | — |
| | Aluminum(III) triisopropoxide | — | — | — | — | — | — | 10.0 | — | — | — |
| | Aluminum(III) triethoxide | — | — | — | — | — | — | — | 10.0 | — | — |
| | Zirconium(IV) tetra-n-butoxide (about 80% 1-butanol) | — | — | — | — | — | — | — | — | 10.0 | — |
| Mass ratio (Catalyst/Subtotal (1)) | | 0.02 | 0.20 | 0.50 | 0.28 | 0.28 | 0.28 | 0.28 | 0.28 | 0.28 | 0.00 |
| Total (g) | | 100.0 | 100.0 | 100.0 | 100.0 | 100.0 | 100.0 | 100.0 | 100.0 | 100.0 | 100:0 |
| Thickness of cured layer [μm] | | 33.2 | 32.1 | 32.4 | 32.6 | 31.9 | 33.4 | 32.7 | 32.8 | 32.8 | — |
| Evaluation | Appearance | After drying 23° C. × 18 hours | A | A | A | A | A | A | A | A | A | Not cured |
| | Non-tackiness | Before sliding | 2 | 2 | 2 | 2 | 2 | 2 | 2 | 2 | 2 | Not cured |

TABLE 4-continued

Table 4

| Formulation of curable composition | | | Ex. 21 | Ex. 22 | Ex. 23 | Ex. 24 | Ex. 25 | Ex. 26 | Ex. 27 | Ex. 28 | Ex. 29 | Com. Ex. 11 |
|---|---|---|---|---|---|---|---|---|---|---|---|---|
| | | test [N/6 mm] | | | | | | | | | | |
| | | After sliding test [N/6 mm] | 4 | 5 | 4 | 4 | 5 | 4 | 5 | 5 | 9 | Not cured |
| Pencil hardness | | After drying 23° C. × 18 hours | 5H | 5H | 5H | 5H | 5H | 5H | 5H | 5H | 5H | Not cured |
| | | After drying 23° C. × 24 hours | 5H | 5H | 5H | 5H | 5H | 5H | 5H | 5H | 5H | Not cured |
| | | After heat treatment 80° C. × 30 min. | 9H | 9H | 9H | 9H | 9H | 9H | 9H | 9H | 9H | Not cured |
| Storage stability of curable composition | | After 40° C. × 4 weeks | A | A | A | A | A | A | A | A | A | A |

TABLE 5

Table 5

| Formulation of curable composition | | | Ex. 30 | Ex. 31 | Ex. 32 | Ex. 33 | Ex. 34 | Ex. 35 | Ex. 36 | Ex. 37 | Com. Ex. 12 | Com. Ex. 13 |
|---|---|---|---|---|---|---|---|---|---|---|---|---|
| First oligomer (g) | | KR-500 | 27.2 | 27.2 | 27.2 | 27.2 | 27.2 | 27.2 | 27.2 | 27.2 | 27.2 | 27.2 |
| Second oligomer (g) | | X-40-9250 | 6.8 | 6.8 | 6.8 | 6.8 | 6.8 | 6.8 | 6.8 | 6.8 | 6.8 | 6.8 |
| Mass ratio (Second oligomer/First oligomer) | | | 0.25 | 0.25 | 0.25 | 0.25 | 0.25 | 0.25 | 0.25 | 0.25 | 0.25 | 0.25 |
| Silicone oil (g) | | KF-96-1000cs | 2.0 | 2.0 | 2.0 | 2.0 | 2.0 | 2.0 | 2.0 | 2.0 | 2.0 | 2.0 |
| First oligomer + Second oligomer (g) | | | 34.0 | 34.0 | 34.0 | 34.0 | 34.0 | 34.0 | 34.0 | 34.0 | 34.0 | 34.0 |
| Subtotal (1) (First oligomer + Second oligomer + Silicone oil) (g) | | | 36.0 | 36.0 | 36.0 | 36.0 | 36.0 | 36.0 | 36.0 | 36.0 | 36.0 | 36.0 |
| Organic Solvent (g) | | 2-Propanol | 54.0 | 54.0 | 54.0 | 54.0 | 54.0 | 54.0 | 54.0 | 54.0 | 54.0 | 54.0 |
| Mass ratio (Solvent/Subtotal (1)) | | | 1.5 | 1.5 | 1.5 | 1.5 | 1.5 | 1.5 | 1.5 | 1.5 | 1.5 | 1.5 |
| Catalyst (g) | Metal chelate compound | Tris(2,4-pentanedionato) aluminum(III) | 10.0 | — | — | — | — | — | — | — | — | — |
| | | Tetrakis(2,4-pentanedionato) titanium(IV) | — | 10.0 | — | — | — | — | — | — | — | — |
| | | Bis(2,4-pentanedionato) bis(2-propanolato) titanium(IV) | — | — | 10.0 | — | — | — | — | — | — | — |
| | | Tetrakis(2,4-pentanedionato) zirconium(IV) | — | — | — | 10.0 | — | — | — | — | — | — |
| | Metal carboxylate | Zinc(II) bis(2-ethylhexanoate) | — | — | — | — | 10.0 | — | — | — | — | — |
| | | Iron(III) tris(2-ethylhexanoate) | — | — | — | — | — | 10.0 | — | — | — | — |
| | | Cobalt(II) bis(2-ethylhexanoate) | — | — | — | — | — | — | 10.0 | — | — | — |
| | | Manganese(II) bis (5-ethylhexanoate) | — | — | — | — | — | — | — | 10.0 | — | — |
| | Acid | Acetic acid | — | — | — | — | — | — | — | — | 10.0 | — |
| | | Phosphoric acid | — | — | — | — | — | — | — | — | — | 10.0 |
| Mass ratio (Catalyst/Subtotal (1)) | | | 0.28 | 0.28 | 0.28 | 0.28 | 0.28 | 0.28 | 0.28 | 0.28 | 0.28 | 0.28 |
| Total (g) | | | 100.0 | 100.0 | 100.0 | 100.0 | 100.0 | 100.0 | 100.0 | 100.0 | 100.0 | 100:0 |
| Thickness of cured layer [μm] | | | 33.9 | 33.7 | 33.8 | 33.2 | 33.5 | 34.7 | 32.0 | 33.1 | — | — |
| Evaluation | Appearance | After drying 23° C. × 18 hours | A | A | A | A | A | A | A | A | Not cured | Not cured |
| | Non-tackiness | Before sliding test [N/6 mm] | 2 | 2 | 2 | 2 | 2 | 2 | 2 | 2 | Not cured | Not cured |
| | | After sliding test [N/6 mm] | 7 | 7 | 8 | 7 | 9 | 8 | 8 | 8 | Not cured | Not cured |

TABLE 5-continued

Table 5

| Formulation of curable composition | | Ex. 30 | Ex. 31 | Ex. 32 | Ex. 33 | Ex. 34 | Ex. 35 | Ex. 36 | Ex. 37 | Com. Ex. 12 | Com. Ex. 13 |
|---|---|---|---|---|---|---|---|---|---|---|---|
| Pencil hardness | After drying 23° C. × 18 hours | 5H | 5H | 5H | 5H | 5H | 5H | 5H | 5H | Not cured | Not cured |
| | After drying 23° C. × 24 hours | 5H | 5H | 5H | 5H | 5H | 5H | 5H | 5H | Not cured | Not cured |
| | After heat treatment 80° C. × 30 min. | 9H | 9H | 9H | 9H | 9H | 9H | 9H | 9H | Not cured | Not cured |
| Storage stability of curable composition | After 40° C. × 4 weeks | A | A | A | A | A | A | A | A | A | A |

TABLE 6

Table 6

| Formulation of curable composition | | Ex. 38 | Ex. 39 | Ex. 40 | Ex. 41 | Ex. 42 | Ex. 43 | Ex. 44 | Ex. 45 | Ex. 46 | Ex. 47 | Com. Ex. 14 | Com. Ex. 15 | Com. Ex. 16 | Com. Ex. 17 |
|---|---|---|---|---|---|---|---|---|---|---|---|---|---|---|---|
| First oligomer (g) | KR-500 | 27.2 | 27.2 | 27.2 | 27.2 | 27.2 | 27.2 | 27.2 | 27.2 | 27.2 | 27.2 | 27.2 | 27.2 | 27.2 | 27.2 |
| Second oligomer (g) | X-40-9250 | 6.8 | 6.8 | 6.8 | 6.8 | 6.8 | 6.8 | 6.8 | 6.8 | 6.8 | 6.8 | 6.8 | 6.8 | 6.8 | 6.8 |
| Silicone oil (g) | KF-96-1000cs | 0.25 2.0 | 0.25 2.0 | 0.25 2.0 | 0.25 2.0 | 0.25 2.0 | 0.25 2.0 | 0.25 2.0 | 0.25 2.0 | 0.25 2.0 | 0.25 2.0 | 0.25 2.0 | 0.25 2.0 | 0.25 2.0 | 0.25 2.0 |
| Mass ratio (Second oligomer/First oligomer) | | | | | | | | | | | | | | | |
| Subtotal (1) (First oligomer + Second oligomer) (g) | | 34.0 | 34.0 | 34.0 | 34.0 | 34.0 | 34.0 | 34.0 | 34.0 | 34.0 | 34.0 | 34.0 | 34.0 | 34.0 | 34.0 |
| Mass ratio (First oligomer + Second oligomer + Silicone oil) (g) | | 36.0 | 36.0 | 36.0 | 36.0 | 36.0 | 36.0 | 36.0 | 36.0 | 36.0 | 36.0 | 36.0 | 36.0 | 36.0 | 36.0 |
| Pigment (g) | 42-303B | — | 5.0 | 15.0 | 25.0 | — | 5.0 | 15.0 | 25.0 | — | — | — | — | — | — |
| Solvent (g) | Methanol (Vapor pressure (13.3 kPa)) | 62.0 | 57.0 | 47.0 | 37.0 | — | — | — | — | — | — | — | — | — | — |
| | Ethanol (Vapor pressure (5.9 kPa)) | — | — | — | — | 62.0 | 57.0 | 47.0 | 37.0 | — | — | — | — | — | — |
| | Cyclohexane (Vapor pressure (10.6 kPa)) | — | — | — | — | — | — | — | — | 62.0 | — | — | — | — | — |
| | Acetone (Vapor pressure (24.7 kPa)) | — | — | — | — | — | — | — | — | — | 54.0 | — | — | — | — |
| | Diethylene glycol dimethyl ether (Vapor pressure (0.5 kPa)) | — | — | — | — | — | — | — | — | — | — | 54.0 | — | — | — |
| | Tripropylene glycol monomethyl ether (Vapor pressure (0.004 kPa)) | — | — | — | — | — | — | — | — | — | — | — | 54.0 | — | — |
| | Propylene glycol (Vapor pressure (0.1 kPa)) | — | — | — | — | — | — | — | — | — | — | — | — | 54.0 | — |
| | Water (Vapor pressure (2.3 kPa)) | — | — | — | — | — | — | — | — | — | — | — | — | — | 54.0 |
| Mass ratio (Solvent/Subtotal (1)) | | 1.7 | 1.6 | 1.3 | 1.0 | 1.7 | 1.6 | 1.3 | 1.0 | 1.7 | 1.5 | 1.5 | 1.5 | 1.5 | 1.5 |
| Catalyst (g) | Titanium tetrabutoxide (product name: D-25) | 2.0 | 2.0 | 2.0 | 2.0 | 2.0 | 2.0 | 2.0 | 2.0 | 2.0 | 10.0 | 10.0 | 10.0 | 10.0 | 10.0 |
| Mass ratio (Catalyst/Subtotal (1)) | | 0.06 | 0.06 | 0.06 | 0.06 | 0.06 | 0.06 | 0.06 | 0.06 | 0.06 | 0.28 | 0.28 | 0.28 | 0.28 | 0.28 |
| Total (g) | | 100.0 | 100.0 | 100.0 | 100.0 | 100.0 | 100.0 | 100.0 | 100.0 | 100.0 | 100.0 | 100.0 | 100.0 | 100.0 | 100.0 |
| Thickness of cured layer [μm] | | 38.0 | 37.2 | 35.2 | 37.1 | 36.6 | 36.4 | 37.3 | 36.7 | 37.8 | 36.1 | — | — | — | — |
| Evaluation | Appearance | A | A | A | A | A | A | A | A | C | A | Not cured | Not cured | Not cured | Condensation in preparation |
| | Non-tackiness After drying 23° C. × 18 hours | 2 | 2 | 2 | 2 | 2 | 2 | 2 | 2 | 2 | 2 | Not cured | Not cured | Not cured | Condensation in preparation |
| | Before sliding test [N/6 mm] | 4 | 5 | 4 | 4 | 5 | 4 | 5 | 5 | 5 | 7 | Not cured | Not cured | Not cured | Condensation in preparation |
| | After sliding test [N/6 mm] | | | | | | | | | | | | | | |
| | Pencil hardness After drying 23° C. × 18 hours | 5H | 5H | 6H | 7H | 5H | 5H | 6H | 7H | 5H | 5H | Not cured | Not cured | Not cured | Not cured |
| | After drying 23° C. × 24 hours | 5H | 5H | 6H | 7H | 5H | 5H | 6H | 7H | 5H | 5H | Not cured | Not cured | Not cured | Not cured |
| | After heat treatment 80° C. × 30 min. | 9H | 9H | 9H | 9H | 9H | 9H | 9H | 9H | 9H | 9H | Not cured | Not cured | Not cured | Not cured |

TABLE 6-continued

Table 6

| Formulation of curable composition | | Ex. 38 | Ex. 39 | Ex. 40 | Ex. 41 | Ex. 42 | Ex. 43 | Ex. 44 | Ex. 45 | Ex. 46 | Ex. 47 | Com. Ex. 14 | Com. Ex. 15 | Com. Ex. 16 | Com. Ex. 17 |
|---|---|---|---|---|---|---|---|---|---|---|---|---|---|---|---|
| Storage stability of curable composition | After 40° C. × 4 weeks | A | A | A | A | A | A | A | A | A | D | A | A | A | Condensation in preparation |

From the results shown in Tables 1 to 6, the protective layers of Examples are sufficient in various characteristics including appearance, non-tackiness, hardness, and storage stability. In contrast, the protective layers of Comparative Examples are insufficient in various characteristics. For Comparative Examples 1 and 2, a cured layer having a smooth surface failed to be formed, and a granular aggregate was formed. Thus, the granular aggregate was measured for the thickness and was evaluated for the appearance and the non-tackiness.

Examples 48 to 93 and Comparative Examples 18 to 34

[Production of Test Sample]

A test sample having a cured layer (protective layer) on one surface thereof was produced in the same manner as Example 1 except that each curable composition shown in Tables 7 to 12 was used and that the standing time for forming a cured layer was changed to 24 hours. For the average thickness of the protective layer of the test sample, the average thickness of the protective layer after drying at 23° C. for 18 hours was measured using a thickness meter and a probe for thickness meter.

[Snow and Ice Sliding Test]

A test sample was placed inclined by an angle of 30°. 60°, 90° with respect to a spraying direction of wet snow (water content: 5%) (The angle is an angle when the vertical is 90°). Wet snow (water content: 5% by mass) was sprayed on the surface of the protective layer of the test sample. The spraying of the wet snow was performed in a low-temperature room kept at 1 to 2° C. The wind speed of the wet snow (water content: 5%) was 5 m/s, and the spraying time was 20 minutes. After completion of the spraying, the test sample was allowed to stand for 30 minutes while keeping at 1 to 2° C., and the time until the wet snow on the protective layer fallen was measured. Incidentally, wet snow comprises ice and water, and the water content of 5% means that snow is composed of 95% by mass ice and 5% by mass water. Moreover, in the snow and ice sliding evaluation shown in Tables 7 to 12, the time below zero was calculated by setting the end of the wet snow spraying to 0 minutes. The time below zero indicates that the snow started to slide down during spraying. That is, for example, when the snow starts to slide down 15 minutes after the start of the wet snow spraying, the snow and ice sliding is determined as −5 minutes (=15-20).

[Sliding Test]

A sliding test was carried out at a reciprocation time of 5000 by pressing a wool felt against the protective layer at a load of 1 kg/cm$^2$ using a sliding tester ("RUBBING TESTER" manufactured by Taiheirikakogyo Kabushiki Kaisha). The snow and ice sliding test was also performed for the test sample after the sliding test.

Tables 7 to 12 show the evaluation results of Examples 48 to 93 and Comparative Examples 18 to 34.

TABLE 7

Table 7

| Formulation of curable composition | Ex. 48 | Ex. 49 | Ex. 50 | Ex. 51 | Ex. 52 | Ex. 53 | Ex. 54 | Com. Ex. 18 | Com. Ex. 19 | Com. Ex. 20 | Com. Ex. 21 | Com. Ex. 22 |
|---|---|---|---|---|---|---|---|---|---|---|---|---|
| First oligomer (g) KR-500 | 17.1 | 20.2 | 27.3 | 34.2 | 34.2 | 34.2 | 34.2 | 6.8 | 13.7 | 41.0 | 47.8 | 28.8 |
| Second oligomer (g) X-40-9250 | 4.3 | 5.1 | 6.8 | 8.5 | 8.5 | 8.5 | 8.5 | 1.7 | 3.4 | 10.2 | 12.0 | 7.2 |
| Mass ratio (Second oligomer/First oligomer) | 0.25 | 0.25 | 0.25 | 0.25 | 0.25 | 0.25 | 0.25 | 0.25 | 0.25 | 0.25 | 0.25 | 0.25 |
| Silicone oil (g) KF-96-10cs | — | — | — | — | — | — | — | — | — | — | — | — |
| KF-96-50cs | — | — | — | — | — | — | — | — | — | — | — | — |
| KF-96-100cs | — | — | — | — | — | — | — | — | — | — | — | — |
| KF-96-1000cs | 1.1 | 1.4 | 1.9 | 2.3 | 2.3 | 2.3 | 2.3 | 0.5 | 0.9 | 2.8 | 3.2 | — |
| KF-96-10000cs | — | — | — | — | — | — | — | — | — | — | — | — |
| KF-96-100000cs | — | — | — | — | — | — | — | — | — | — | — | — |
| KF-96-500000cs | — | — | — | — | — | — | — | — | — | — | — | — |
| KF-96-1000000cs | — | — | — | — | — | — | — | — | — | — | — | — |
| Subtotal (1) (First oligomer + Second oligomer + Silicone oil) | 22.5 | 27.0 | 36.0 | 45.0 | 45.0 | 45.0 | 45.0 | 9.0 | 18.0 | 54.0 | 63.0 | 36.0 |
| Pigment (g) 42-303B | — | — | — | — | 5.0 | 15.0 | 25.0 | — | — | — | — | — |
| Solvent (g) Methanol | — | — | — | — | — | — | — | — | — | — | — | — |
| Ethanol | — | — | — | — | — | — | — | — | — | — | — | — |
| 2-Propanol | 67.5 | 63.0 | 54.0 | 45.0 | 40.0 | 30.0 | 20.0 | 81.0 | 72.0 | 35.2 | 24.4 | 54.0 |
| Mass ratio (Solvent/Subtotal (1)) | 3.0 | 2.3 | 1.5 | 1.0 | 0.9 | 0.7 | 0.4 | 9.0 | 4.0 | 0.7 | 0.4 | 1.5 |
| Catalyst (g) Titanium tetrabutoxide | 10.0 | 10.0 | 10.0 | 10.0 | 10.0 | 10.0 | 10.0 | 10.0 | 10.0 | 10.8 | 12.6 | 10.0 |
| Mass ratio (Catalyst/Subtotal (1)) | 0.44 | 0.37 | 0.28 | 0.22 | 0.22 | 0.22 | 0.22 | 1.11 | 0.56 | 0.20 | 0.20 | 0.28 |
| Total (g) | 100.0 | 100.0 | 100.0 | 100.0 | 100.0 | 100.0 | 100.0 | 100.0 | 100.0 | 100.0 | 100.0 | 100.0 |
| Thickness of cured layer [μm] | 34.2 | 36.1 | 33.8 | 35.0 | 34.5 | 35.1 | 34.6 | 33.9 | 34.9 | 34.1 | 35.1 | 34.6 |
| Evaluation Snow and ice sliding (Time at which snow starts to slide down) Before sliding test set to 30° | 8 | 9 | 8 | 9 | 17 | 25 | 26 | No formation of cured layer | No formation of cured layer | No sliding down | No sliding down | No sliding down |
| set to 60° | −4 | −4 | −6 | −5 | 2 | 4 | 4 | No formation of cured layer | No formation of cured layer | No sliding down | No sliding down | No sliding down |
| set to 90° | 7 | 6 | 4 | 4 | 8 | 12 | 19 | No formation of cured layer | No formation of cured layer | No sliding down | No sliding down | No sliding down |
| After sliding test set to 30° | 12 | 12 | 11 | 14 | 19 | 28 | 29 | No formation of cured layer | No formation of cured layer | No sliding down | No sliding down | No sliding down |
| set to 60° | 10 | 10 | 8 | 11 | 13 | 10 | 17 | No formation of cured layer | No formation of cured layer | No sliding down | No sliding down | No sliding down |

TABLE 7-continued

Table 7

| Formulation of curable composition | | Ex. 48 | Ex. 49 | Ex. 50 | Ex. 51 | Ex. 52 | Ex. 53 | Ex. 54 | Com. Ex. 18 | Com. Ex. 19 | Com. Ex. 20 | Com. Ex. 21 | Com. Ex. 22 |
|---|---|---|---|---|---|---|---|---|---|---|---|---|---|
| | set to 90° | 13 | 10 | 11 | 15 | 20 | 21 | 24 | formation of cured layer | formation of cured layer | No sliding down | No sliding down | No sliding down |

TABLE 8

| Formulation of curable composition | | Ex. 55 | Ex. 56 | Ex. 57 | Ex. 58 | Ex. 59 | Ex. 60 | Ex. 61 | Com. Ex. 23 | Com. Ex. 24 | Com. Ex. 25 |
|---|---|---|---|---|---|---|---|---|---|---|---|
| First oligomer (g) | KR-500 | 29.5 | 29.0 | 28.0 | 24.0 | 14.0 | 4.0 | 3.2 | 31.0 | 2.8 | 0.0 |
| Second oligomer (g) | X-40-9250 | 4.5 | 5.0 | 6.0 | 10.0 | 20.0 | 30.0 | 30.8 | 3.0 | 31.2 | 34.0 |
| Mass ratio (Second oligomer/First oligomer) | | 0.15 | 0.17 | 0.21 | 0.42 | 1.43 | 7.5 | 9.63 | 0.10 | 11.14 | ∞ |
| Silicone oil (g) | KF-96-10cs | — | — | — | — | — | — | — | — | — | — |
| | KF-96-50cs | — | — | — | — | — | — | — | — | — | — |
| | KF-96-100cs | — | — | — | — | — | — | — | — | — | — |
| | KF-96-1000cs | 2.0 | 2.0 | 2.0 | 2.0 | 2.0 | 2.0 | 2.0 | 2.0 | 2.0 | 2.0 |
| | KF-96-10000cs | — | — | — | — | — | — | — | — | — | — |
| | KF-96-100000cs | — | — | — | — | — | — | — | — | — | — |
| | KF-96-500000cs | — | — | — | — | — | — | — | — | — | — |
| | KF-96-1000000cs | — | — | — | — | — | — | — | — | — | — |
| Subtotal (1) (First oligomer + Second oligomer + Silicone oil) | | 36.0 | 36.0 | 36.0 | 36.0 | 36.0 | 36.0 | 36.0 | 36.0 | 36.0 | 36.0 |
| Pigment (g) | 42-303B | — | — | — | — | — | — | — | — | — | — |
| Solvent (g) | Methanol | — | — | — | — | — | — | — | — | — | — |
| | Ethanol | — | — | — | — | — | — | — | — | — | — |
| | 2-Propanol | 54.0 | 54.0 | 54.0 | 54.0 | 54.0 | 54.0 | 54.0 | 54.0 | 54.0 | 54.0 |
| Mass ratio (Solvent/Subtotal (1)) | | 1.5 | 1.5 | 1.5 | 1.5 | 1.5 | 1.5 | 1.5 | 1.5 | 1.5 | 1.5 |
| Catalyst (g) | Titanium tetrabutoxide | 10.0 | 10.0 | 10.0 | 10.0 | 10.0 | 10.0 | 10.0 | 10.0 | 10.0 | 10.0 |
| Mass ratio (Catalyst/Subtotal (1)) | | 0.28 | 0.28 | 0.28 | 0.28 | 0.28 | 0.28 | 0.28 | 0.28 | 0.28 | 0.28 |
| Total (g) | | 100.0 | 100.0 | 100.0 | 100.0 | 100.0 | 100.0 | 100.0 | 100.0 | 100.0 | 100.0 |
| Thickness of cured layer [μm] | | 36.5 | 35.5 | 34.9 | 36.1 | 34.4 | 35.2 | 35.6 | 34.6 | 34.3 | 34.2 |
| Evaluation Snow and ice sliding (Time at which snow starts to slide down) | Before sliding test set to 30° | 10 | 9 | 9 | 11 | 10 | 12 | 11 | 11 | 12 | 13 |
| | set to 60° | -2 | -3 | -3 | -2 | -2 | -2 | -1 | 4 | 2 | 4 |
| | set to 90° | 7 | 8 | 9 | 8 | 8 | 9 | 9 | 8 | 9 | 6 |
| | After sliding test set to 30° | 18 | 17 | 17 | 16 | 15 | 13 | 12 | No sliding down | No sliding down | No sliding down |
| | set to 60° | 11 | 11 | 10 | 10 | 10 | 8 | 8 | No sliding down | No sliding down | No sliding down |
| | set to 90° | 19 | 16 | 16 | 17 | 13 | 14 | 13 | No sliding down | No sliding down | No sliding down |

TABLE 9

| Formulation of curable composition | | Ex. 62 | Ex. 63 | Ex. 64 | Ex. 65 | Ex. 66 | Ex. 67 | Com. Ex. 26 | Com. Ex. 27 |
|---|---|---|---|---|---|---|---|---|---|
| First oligomer (g) | KR-500 | 27.2 | 27.2 | 27.2 | 27.2 | 27.2 | 271 | 27.2 | 27.2 |
| Second oligomer (g) | X-40-9250 | 6.8 | 6.8 | 6.8 | 6.8 | 6.8 | 6.8 | 6.8 | 6.8 |
| Mass ratio (Second oligomer/First oligomer) | | 0.25 | 0.25 | 0.25 | 0.25 | 0.25 | 0.25 | 0.25 | 0.25 |
| Silicone oil (g) | KF-96-10cs | — | — | — | — | — | — | 2.0 | — |
| | KF-96-50cs | — | — | — | — | — | — | — | 2.0 |
| | KF-96-100cs | 2.0 | — | — | — | — | — | — | — |
| | KF-96-1000cs | — | 2.0 | — | — | — | — | — | — |
| | KF-96-10000cs | — | — | 2.0 | — | — | — | — | — |
| | KF-96-100000cs | — | — | — | 2.0 | — | — | — | — |
| | KF-96-500000cs | — | — | — | — | 2.0 | — | — | — |
| | KF-96-1000000cs | — | — | — | — | — | 2.0 | — | — |
| Subtotal (1) (First oligomer + Second oligomer + Silicone oil) | | 36.0 | 36.0 | 36.0 | 36.0 | 36.0 | 36.0 | 36.0 | 36.0 |
| Pigment (g) | 42-303B | — | — | — | — | — | — | — | — |
| Solvent (g) | Methanol | — | — | — | — | — | — | — | — |
| | Ethanol | — | — | — | — | — | — | — | — |
| | 2-Propanol | 54.0 | 54.0 | 54.0 | 54.0 | 54.0 | 54.0 | 54.0 | 54.0 |
| Mass ratio (Solvent/Subtotal (1)) | | 1.5 | 1.5 | 1.5 | 1.5 | 1.5 | 1.5 | 1.5 | 1.5 |
| Catalyst (g) | Titanium tetrabutoxide | 10.0 | 10.0 | 10.0 | 10.0 | 10.0 | 10.0 | 10.0 | 10.0 |
| Mass ratio (Catalyst/Subtotal (1)) | | 0.28 | 0.28 | 0.28 | 0.28 | 0.28 | 0.28 | 0.28 | 0.28 |
| Total (g) | | 100.0 | 100.0 | 100.0 | 100.0 | 100.0 | 100.0 | 100.0 | 100.0 |
| Thickness of cured layer [μm] | | 34.2 | 34.1 | 33.2 | 33.6 | 35.1 | 32.8 | 33.7 | 34.4 |
| Evaluation Snow and ice sliding (Time at which | Before sliding test set to 30° | 10 | 9 | 10 | 9 | 9 | 11 | No sliding down | No sliding down |
| | set to 60° | -2 | -4 | -5 | -5 | -6 | -5 | No sliding | No sliding |

TABLE 9-continued

Table 9

| Formulation of curable composition | | | Ex. 62 | Ex. 63 | Ex. 64 | Ex. 65 | Ex. 66 | Ex. 67 | Com. Ex. 26 | Com. Ex. 27 |
|---|---|---|---|---|---|---|---|---|---|---|
| snow starts to slide down) | | set to 90° | 11 | 4 | 5 | 5 | 4 | 4 | No sliding down | No sliding down |
| | After sliding test | set to 30° | 21 | 11 | 10 | 9 | 10 | 10 | No sliding down | No sliding down |
| | | set to 60° | 13 | 8 | 8 | 7 | 7 | 7 | No sliding down | No sliding down |
| | | set to 90° | 17 | 12 | 11 | 11 | 13 | 11 | No sliding down | No sliding down |

TABLE 10

Table 10

| Formulation of curable composition | | Ex. 68 | Ex. 69 | Ex. 70 | Ex. 71 | Ex. 72 | Ex. 73 | Ex. 74 | Ex. 75 | Ex. 76 | Com. Ex. 28 |
|---|---|---|---|---|---|---|---|---|---|---|---|
| First oligomer (g) | KR-500 | 27.2 | 27.2 | 27.2 | 27.2 | 27.2 | 27.2 | 27.2 | 27.2 | 27.2 | 27.2 |
| Second oligomer (g) | X-40-9250 | 6.8 | 6.8 | 6.8 | 6.8 | 6.8 | 6.8 | 6.8 | 6.8 | 6.8 | 6.8 |
| Mass ratio (Second oligomer/First oligomer) | | 0.25 | 0.25 | 0.25 | 0.25 | 0.25 | 0.25 | 0.25 | 0.25 | 0.25 | 0.25 |
| Silicone oil (g) | KF-96-1000cs | 2.0 | 2.0 | 2.0 | 2.0 | 2.0 | 2.0 | 2.0 | 2.0 | 2.0 | 2.0 |
| Subtotal (1) (First oligomer + Second oligomer + Silicone oil) | | 36.0 | 36.0 | 36.0 | 36.0 | 36.0 | 36.0 | 36.0 | 36.0 | 36.0 | 36.0 |
| Pigment (g) | 42-303B | — | — | — | — | — | — | — | — | — | — |
| Solvent (g) | Methanol | — | — | — | — | — | — | — | — | — | — |
| | Ethanol | — | — | — | — | — | — | — | — | — | — |
| | 2-Propanol | 63.3 | 56.8 | 46.0 | 54.0 | 54.0 | 54.0 | 54.0 | 54.0 | 54.0 | 64.0 |
| Mass ratio (Solvent/Subtotal (1)) | | 1.8 | 1.6 | 1.3 | 1.5 | 1.5 | 1.5 | 1.5 | 1.5 | 1.5 | 1.8 |
| Catalyst (g) | Titanium tetrabutoxide | 0.7 | 7.2 | 18.0 | — | — | — | — | — | — | — |
| | Titanium(IV) tetra-isopropoxide | — | — | — | 10.0 | — | — | — | — | — | — |
| | Titanium(IV) tetraethoxide | — | — | — | — | 10.0 | — | — | — | — | — |
| | Aluminum(III) tri-sec-butoxide | — | — | — | — | — | 10.0 | — | — | — | — |
| | Aluminum(III) triisopropoxide | — | — | — | — | — | — | 10.0 | — | — | — |
| | Aluminum(III) triethoxide | — | — | — | — | — | — | — | 10.0 | — | — |
| | Zirconium(IV) tetra-n-butoxide (about 80% 1-butanol) | — | — | — | — | — | — | — | — | 10.0 | — |
| Mass ratio (Catalyst/Subtotal (1)) | | 0.02 | 0.20 | 0.50 | 0.28 | 0.28 | 0.28 | 0.28 | 0.28 | 0.28 | 0.00 |
| Total (g) | | 100.0 | 100.0 | 100.0 | 100.0 | 100.0 | 100.0 | 100.0 | 100.0 | 100.0 | 100.0 |
| Thickness of cured layer [μm] | | 33.2 | 32.1 | 32.4 | 32.6 | 31.9 | 33.4 | 32.7 | 32.8 | 32.8 | — |
| Evaluation Snow and ice accretion prevention | Before sliding test  set to 30° | 9 | 9 | 7 | 8 | 8 | 7 | 8 | 9 | 9 | Not cured |
| | set to 60° | −4 | −4 | −2 | −3 | −4 | −4 | −3 | −4 | −4 | Not cured |
| | After sliding test  set to 90° | 6 | 5 | 7 | 7 | 8 | 6 | 7 | 6 | 6 | Not cured |
| | set to 30° | 12 | 10 | 16 | 12 | 14 | 17 | 11 | 14 | 13 | Not cured |
| | set to 60° | 8 | 9 | 12 | 14 | 11 | 9 | 10 | 10 | 8 | Not cured |
| | set to 90° | 12 | 11 | 11 | 12 | 12 | 12 | 11 | 12 | 11 | Not cured |

TABLE 11

| Formulation of curable composition | | | Ex. 77 | Ex. 78 | Ex. 79 | Ex. 80 | Ex. 81 | Ex. 82 | Ex. 83 | Ex. 84 | Com. Ex. 29 | Com. Ex. 30 |
|---|---|---|---|---|---|---|---|---|---|---|---|---|
| First oligomer (g) | | KR-500 | 27.2 | 27.2 | 27.2 | 27.2 | 27.2 | 27.2 | 27.2 | 27.2 | 27.2 | 27.2 |
| Second oligomer (g) | | X-40-9250 | 6.8 | 6.8 | 6.8 | 6.8 | 6.8 | 6.8 | 6.8 | 6.8 | 6.8 | 6.8 |
| Mass ratio (Second oligomer/First oligomer) | | | 0.25 | 0.25 | 0.25 | 0.25 | 0.25 | 0.25 | 0.25 | 0.25 | 0.25 | 0.25 |
| Silicone oil (g) | | KF-96-1000cs | 2.0 | 2.0 | 2.0 | 2.0 | 2.0 | 2.0 | 2.0 | 2.0 | 2.0 | 2.0 |
| Subtotal (1) (First oligomer + Second oligomer + Silicone oil) | | | 36.0 | 36.0 | 36.0 | 36.0 | 36.0 | 36.0 | 36.0 | 36.0 | 36.0 | 36.0 |
| Pigment (g) | | 42-303B | — | — | — | — | — | — | — | — | — | — |
| Solvent (g) | | Methanol | — | — | — | — | — | — | — | — | — | — |
| | | Ethanol | — | — | — | — | — | — | — | — | — | — |
| | | 2-Propanol | 54.0 | 54.0 | 54.0 | 54.0 | 54.0 | 54.0 | 54.0 | 54.0 | 54.0 | 54.0 |
| Mass ratio (Solvent/Subtotal (1)) | | | 1.5 | 1.5 | 1.5 | 1.5 | 1.5 | 1.5 | 1.5 | 1.5 | 1.5 | 1.5 |
| Catalyst (g) | Metal chelate compound | Tris(2,4-pentanedionato) aluminum(III) | 10.0 | — | — | — | — | — | — | — | — | — |
| | | Tetrakis(2,4-pentanedionato) titanium(IV) | — | 10.0 | — | — | — | — | — | — | — | — |
| | | Bis(2,4-pentanedionato) bis(2-propanolato) titanium(IV) | — | — | 10.0 | — | — | — | — | — | — | — |
| | | Tetrakis(2,4-pentanedionato) zirconium(IV) | — | — | — | 10.0 | — | — | — | — | — | — |
| | Metal carboxylate | Zinc(II) bis(2-ethylhexanoate) | — | — | — | — | 10.0 | — | — | — | — | — |
| | | Iron(III) tris(2-ethylhexanoate) | — | — | — | — | — | 10.0 | — | — | — | — |
| | | Cobolt(II) bis(2-ethylhexanoate) | — | — | — | — | — | — | 10.0 | — | — | — |
| | | Manganese(II) bis(5-ethylhexanoate) | — | — | — | — | — | — | — | 10.0 | — | — |
| | Acid | Acetic acid | — | — | — | — | — | — | — | — | 10.0 | — |
| | | Phosphoric acid | — | — | — | — | — | — | — | — | — | 10.0 |
| Mass ratio (Catalyst/Subtotal (1)) | | | 0.28 | 0.28 | 0.28 | 0.28 | 0.28 | 0.28 | 0.28 | 0.28 | 0.28 | 0.28 |
| Total (g) | | | 100.0 | 100.0 | 100.0 | 100.0 | 100.0 | 100.0 | 100.0 | 100.0 | 100.0 | 100.0 |
| Thickness of cured layer [μm] | | | 33.9 | 33.7 | 33.8 | 33.2 | 33.5 | 34.7 | 32.0 | 33.1 | — | — |
| Evaluation | Snow and ice accretion prevention | Before sliding test set to 30° | 7 | 8 | 8 | 10 | 11 | 19 | 10 | 7 | Not cured | Not cured |
| | | set to 60° | −2 | 2 | −3 | −2 | −4 | −4 | −6 | −3 | Not cured | Not cured |
| | | set to 90° | 4 | 9 | 6 | 6 | 13 | 12 | 9 | 6 | Not cured | Not cured |
| | | After sliding test set to 30° | 18 | 15 | 11 | 21 | 23 | 25 | 18 | 19 | Not cured | Not cured |
| | | set to 60° | 15 | 10 | 10 | 12 | 12 | 15 | 13 | 12 | Not cured | Not cured |
| | | set to 90° | 17 | 11 | 11 | 16 | 15 | 16 | 16 | 15 | Not cured | Not cured |

TABLE 12

Table 12

| Formulation of curable composition | | Ex. 85 | Ex. 86 | Ex. 87 | Ex. 88 | Ex. 89 | Ex. 90 | Ex. 91 | Ex. 92 | Ex. 93 | Com. Ex. 30 | Com. Ex. 30 | Com. Ex. 29 | Com. Ex. 30 | Com. Ex. 30 | Com.Ex. 30 |
|---|---|---|---|---|---|---|---|---|---|---|---|---|---|---|---|---|
| First oligomer (g) | KR-500 | 27.2 | 27.2 | 27.2 | 27.2 | 27.2 | 27.2 | 27.2 | 27.2 | 27.2 | 27.2 | 27.2 | 27.2 | 27.2 | 27.2 | 27.2 |
| Second oligomer (g) | X-40-9250 | 6.8 | 6.8 | 6.8 | 6.8 | 6.8 | 6.8 | 6.8 | 6.8 | 6.8 | 6.8 | 6.8 | 6.8 | 6.8 | 6.8 | 6.8 |
| Mass ratio (Second oligomer/First oligomer) | | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |
| Silicone oil (g) | KF-96-1000cs | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Subtotal (1) (First oligomer + Second oligomer + Silicone oil) | | 36.0 | 36.0 | 36.0 | 36.0 | 36.0 | 36.0 | 36.0 | 36.0 | 36.0 | 36.0 | 36.0 | 36.0 | 36.0 | 36.0 | 36.0 |
| Pigment (g) | 42-303B | — | 5.0 | 15.0 | 25.0 | — | 5.0 | 15.0 | 25.0 | — | — | — | — | — | — | — |
| Solvent (g) | Methanol Vapor pressure (13.3 kPa) | 62.0 | 57.0 | 47.0 | 37.0 | — | — | — | — | — | — | — | — | — | — | — |
| | Ethanol Vapor pressure (5.9 kPa) | — | — | — | — | 62.0 | 57.0 | 47.0 | 37.0 | — | — | — | — | — | — | — |
| | Cyclohexane Vapor pressure (10.6 kPa) | — | — | — | — | — | — | — | — | 62.0 | — | — | — | — | — | — |
| | Acetone Vapor pressure (25.0 kPa) | — | — | — | — | — | — | — | — | — | — | — | — | — | — | — |
| | Diethylene glycol dimethyl ether Vapor pressure (0.5 kPa) | — | — | — | — | — | — | — | — | — | 54.0 | — | — | — | — | — |
| | Tripropylene glycol monomethyl ether Vapor pressure (0.004 kPa) | — | — | — | — | — | — | — | — | — | — | — | 54.0 | — | — | — |
| | Propylene glycol Vapor pressure (0.1 kPa) | — | — | — | — | — | — | — | — | — | — | 54.0 | — | — | — | — |
| | Water Vapor pressure (2.3 kPa) | — | — | — | — | — | — | — | — | — | — | — | — | — | 54.0 | — |
| Catalyst (g) | Titanium tetrabutoxide | 1.7 | 1.6 | 1.3 | 1.0 | 1.7 | 1.6 | 1.3 | 1.0 | 1.7 | 1.5 | 1.5 | 1.5 | 1.5 | 1.5 | 1.5 |
| Mass ratio (Catalyst/Subtotal (1)) | | 2.0 | 2.0 | 2.0 | 2.0 | 2.0 | 2.0 | 2.0 | 2.0 | 2.0 | 10.0 | 10.0 | 10.0 | 10.0 | 10.0 | 10.0 |
| Total (g) | | 0.6 | 0.6 | 0.6 | 0.6 | 0.6 | 0.6 | 0.6 | 0.6 | 0.6 | 0.28 | 0.28 | 0.28 | 0.28 | 0.28 | 0.28 |
| | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Thickness of cured layer [μm] | | 8 | 8 | 7 | 8 | 7 | 8 | 7 | 8 | 25 | Not cured | Not cured | Not cured | Not cured | Not cured | Condensation in preparation |
| Evaluation | Snow and ice | Before set to 30° | −1 | −4 | −5 | −4 | −4 | −4 | −2 | −3 | 15 | Not cured | Not cured | Not cured | Not cured | Not cured | Condensation in preparation |
| | | set to 60° | 10 | 10 | 11 | 10 | 9 | 11 | 6 | 8 | 22 | Not cured | Not cured | Not cured | Not cured | Not cured | Condensation in preparation |
| | | set to 90° | 18 | 19 | 14 | 16 | 17 | 16 | 18 | 16 | 29 | Not cured | Not cured | Not cured | Not cured | Not cured | Condensation in preparation |
| | After set to 30° | 10 | 11 | 12 | 10 | 10 | 12 | 15 | 14 | 20 | Not cured | Not cured | Not cured | Not cured | Not cured | Condensation in preparation |
| | set to 60° | 19 | 17 | 15 | 15 | 13 | 17 | 17 | 19 | 28 | Not cured | Not cured | Not cured | Not cured | Not cured | Condensation in preparation |

From the results shown in Tables 7 to 12, the protective layers of Examples have a high snow and ice sliding, while the protective layers of Comparative Examples have a low snow and ice sliding. For Comparative Examples 18 and 19, a cured layer having a smooth surface failed to be formed, and a granular aggregate was formed. Thus, the granular aggregate was measured for the thickness and was evaluated for the appearance and the non-tackiness.

Examples 94 to 100 and Comparative Example 35

[Production of Test Sample]

A test sample having a cured layer (protective layer) on one surface thereof was produced in the same manner as Example 48 except that each curable composition shown in Table 13 was used and that a plate test piece having a size of 70 mm in width and 150 mm in length (105 cm$^2$) was used as the plate test piece, and the average thickness of the protective layer was measured.

[Accelerated Weathering Test]

An accelerated weathering test was performed for 1000 hours under the condition in accordance with JIS K 5400-7-7, and the ice adhesion strength and snow sliding angle before and after the test were evaluated.

(Ice Adhesion Strength)

Ice was made on each test piece under an atmosphere of −15° C. The ice adhesion strength was evaluated by measuring a load (N/cm$^2$) necessary to peeling the ice made on the test piece to a shear direction. The ice was made as follows: water was poured into a cylindrical metal container having a diameter of 4 cm and a height of 1 cm, and the test sample was placed on the upper surface of the container and was allowed to stand under an environment of −15° C. for 3 to 4 hours. As the load (N/cm$^2$) necessary to peeling to the shear direction, a push gauge ("Digital force gauge RZ-20" manufactured by Aikoh Engineering Co., Ltd.) was used.

(Snow Sliding Angle)

Dendritic snow was allowed to fall on each test piece set to an angle of 0° through a sieve at a snowfall amount of 0.3 to 0.4 g/cm$^2$ under an atmosphere of −10° C., and then the angle at which the dendritic snow started to slide on the test piece when the test piece was gradually tilted was measured. The angle at which the dendric snow started to slide was defined as a snow sliding angle.

Table 13 shows the evaluation results of Examples 94 to 100 and Comparative Example 35.

TABLE 13

| Formulation of curable composition | | Ex. 94 | Ex. 95 | Ex. 96 | Ec 97 | Ex. 98 | Ex. 99 | Ex. 100 | Com. Ex. 35 |
|---|---|---|---|---|---|---|---|---|---|
| First oligomer (g) | KR-500 | 17.1 | 20.5 | 27.3 | 34.2 | 34.2 | 34.2 | 34.2 | — |
| Second oligomer (g) | X-40-9250 | 4.3 | 5.1 | 6.8 | 8.5 | 8.5 | 8.5 | 8.5 | — |
| Mass ratio (Second oligomer/First oligomer) | | 0.25 | 0.25 | 0.25 | 0.25 | 0.25 | 0.25 | 0.25 | — |
| Silicone oil (g) | KF-96-10cs | — | — | — | — | — | — | — | — |
| | KF-96-50cs | — | — | — | — | — | — | — | — |
| | KF-96-100cs | — | — | — | — | — | — | — | — |
| | KF-961000cs | 1.1 | 1.4 | 1.9 | 2.3 | 2.3 | 2.3 | 2.3 | — |
| | KF-96-10000cs | — | — | — | — | — | — | — | — |
| | KF-96-100000os | — | — | — | — | — | — | — | — |
| | KF-96-500000os | — | — | — | — | — | — | — | — |
| | KF-96-1000000cs | — | — | — | — | — | — | — | — |
| Subtotal (1) (First oligomer + Second oligomer + Silicone oil) | | 22.5 | 27.0 | 36.0 | 45.0 | 45.0 | 45.0 | 45.0 | — |
| Pigment (g) | 42-303B | — | — | — | — | 5.0 | 15.0 | 25.0 | — |
| Solvent (g) | Methanol | — | — | — | — | — | — | — | — |
| | Ethanol | — | — | — | — | — | — | — | — |
| | 2-Propanol | 67.5 | 63.0 | 54.0 | 45.0 | 40.0 | 30.0 | 20.0 | — |
| Mass ratio (Solvent/Subtotal (1)) | | 3.0 | 2.3 | 1.5 | 1.0 | 0.9 | 0.7 | 0.4 | — |
| Catalyst (g) | Titanium tetrabutoxide | 10.0 | 10.0 | 10.0 | 10.0 | 10.0 | 10.0 | 10.0 | — |
| Mass ratio (Catalyst/Subtotal (1)) | | 0.44 | 0.37 | 0.28 | 0.22 | 0.22 | 0.22 | 0.22 | — |
| Total | | 100.0 | 100.0 | 100.0 | 100.0 | 100.0 | 100.0 | 100.0 | — |
| Thickness of cured layer [μm] | | 34.2 | 36.1 | 32.8 | 35.0 | 34.5 | 35.1 | 34.6 | — |
| Evaluation | Snow sliding and ice sliding before and after accelerated weathering test | Before accelerated weathering test Snow sliding angle [°] | 37 | 37 | 38 | 37 | 37 | 37 | 36 | 76 |
| | | Ice adhesion strength [N/cm$^2$] | 0.8 | 0.8 | 0.8 | 0.8 | 0.8 | 0.8 | 0.8 | 9.3 |
| | | 1000 Hours after accelerated weathering test (In accordance with JIS K 5400-7-7) Snow sliding angle [°] | 52 | 52 | 52 | 52 | 52 | 53 | 52 | >90 |
| | | Ice adhesion strength [N/cm$^2$] | 0.8 | 0.8 | 0.8 | 0.7 | 0.8 | 0.7 | 0.8 | 9.5 |
| Remark | | | | | | | | | | Aluminum plate alone (no protective material) |

From the results shown in Table 13, the protective layers of Examples had high snow sliding and ice sliding before and after the accelerated weathering test.

Examples 101 to 143 and Comparative Example 36

(Production of Test Sample)

A test sample having an antifouling layer on one surface thereof was produced in the same manner as Example 48 except that each curable composition shown in Tables 14 to 19 was used. Three test samples for each Example were produced and were subjected to an antifouling test. Incidentally, for Comparative Example 36, a test sample without lamination of an antifouling layer was subjected to an antifouling test.

(Preparation of Suspension)

To 95 parts by mass of ion-exchange water were added 5 parts by mass of carbon black ("Mitsubishi carbon black MA-100" manufactured by Mitsubishi Chemical Corporation, particle size: 24 nm), and the mixture was mixed while stirring using a stirrer (disperser) to prepare a suspension.

(Antifouling Test)

The color ($L_0^*$, $a_0^*$, $b_0^*$) of the test sample before test was measured using a spectral colorimeter ("Spectrophotometer CM-3500d" manufactured by KONICA MINOLTA JAPAN, INC.). The measurement was performed at different three points, one at an upper part, another at a middle part, and the other at a lower part, of the test sample. Each of $L_0^*$, $a_0^*$, and $b_0^*$ was the average of the three points and was rounded off to two decimal places.

The suspension was uniformly applied to the surface of the antifouling layer of the test sample with an air spray. The test sample to which the suspension was applied was dried at 60° C. for one hour and was then allowed to cool to room temperature. The test sample allowed to cool to room temperature was washed with a gauze ("BEMCOT M-3" manufactured by Asahi Kasei Corp.) under running water until the stain substance was not removed any more (until no stain substance was washed off). Water was wiped off from the surface of the test sample after washing, and the test sample was dried at room temperature. The color ($L_1^*$, $a_1^*$, $b_1^*$) of the test sample after drying was measured. The measurement was performed at different three points, one at an upper part, another at a middle part, and the other at a lower part, of the test sample. The color ($L_1^*$, $a_1^*$, $b_1^*$) was the average of the three points and was rounded off to two decimal places. The judgement of the test results are as follows.

The brightness difference $\Delta L^*$, the color difference $\Delta a^*$, the color difference $\Delta b^*$, and the color difference $\Delta E^*ab$ are calculated according to the following formulae (1) to (4).

Brightness difference $\Delta L^*$=Average brightness $L_1^*$ after test−Average brightness $L_0^*$ before test (1)

Color difference $\Delta a^*$=Average $a_1^*$ after test−Average $a_0^*$ before test (2)

Color difference $\Delta b^*$ Average $b_1^*$ after test−Average $b_0^*$ before test (3)

Color difference $\Delta E^*ab=((\Delta L^*)^2+(\Delta a^*)^2+(\Delta b^*)^2)^{0.5}$ (4)

For the test results, when all of three test samples have a brightness difference $\Delta L^*$ of not less than −7.00 and a color difference $\Delta E^*ab=((\Delta L^*)^2+(\Delta a^*)^2+(\Delta b^*)^2)^{0.5}$ of not more than 7.00, the test samples were judged to have an antifouling property. Moreover, the colorfulness difference ($\Delta L^*$, $\Delta a^*$, $\Delta b^*$) was the average of the three test samples and was rounded off to two decimal places.

Further, the sliding test was carried out in the same manner as Example 48, and the antifouling test was also performed for test samples after the sliding test.

Tables 14 to 19 show the evaluation results of Examples 101 to 143 and Comparative Example 36.

TABLE 14

| Formulation of curable composition | | Ex. 101 | Ex. 102 | Ex. 103 | Ex. 104 | Com. Ex. 36 |
|---|---|---|---|---|---|---|
| First oligomer (g) | KR-500 | 17.1 | 20.5 | 27.3 | 34.2 | — |
| Second oligomer (g) | X-40-9250 | 4.3 | 5.1 | 6.8 | 8.5 | — |
| Mass ratio (Second oligomer/First oligomer) | | 0.25 | 0.25 | 0.25 | 0.25 | — |
| Silicone oil (g) | KF-96-10cs | — | — | — | — | — |
| | KF-96-50cs | — | — | — | — | — |
| | KF-96-100cs | — | — | — | — | — |
| | KF-96-1000cs | 1.1 | 1.4 | 1.9 | 2.3 | — |
| | KF-96-10000cs | — | — | — | — | — |
| | KF-96-100000cs | — | — | — | — | — |
| | KF-96-500000cs | — | — | — | — | — |
| | KF-96-1000000cs | — | — | — | — | — |
| Subtotal (1) (First oligomer + Second oligomer + Silicone oil) | | 22.5 | 27.0 | 38.0 | 45.0 | — |
| Pigment (g) | 42-303B | — | — | — | — | — |
| Solvent (g) | Methanol | — | — | — | — | — |
| | Ethanol | — | — | — | — | — |
| | 2-Proponol | 67.5 | 63.0 | 54.0 | 45.0 | — |
| Mass ratio (Solvent/Subtotal (1)) | | 3.0 | 2.3 | 1.5 | 1.0 | — |
| Catalyst | Titanium tetrabutoxide | 10.0 | 10.0 | 10.0 | 10.0 | — |
| Mass ratio (Catalyst/Subtotal (1)) | | 0.44 | 0.37 | 0.28 | 0.22 | — |
| Total | | 100.0 | 100.0 | 100.0 | 100.0 | — |
| Thickness of cured layer [μm] | | 34.2 | 36.1 | 33.8 | 35.0 | — |
| Evaluation | Antifouling property (antifouling test) Before sliding test Brightness difference $\Delta L^*$ | −0.5 | −0.5 | −0.5 | −0.5 | −12.4 |
| | Color difference $\Delta E_{ab}^*$ | 0.6 | 0.6 | 0.6 | 0.6 | 12.5 |
| | After sliding test Brightness difference $\Delta L^*$ | −0.9 | −0.9 | −0.9 | −0.8 | −12.7 |
| | Color difference $\Delta E_{ab}^*$ | 1.0 | 1.0 | 1.0 | 1.0 | 12.8 |
| Remark | | | | | | Aluminum plate alone (no antifouling layer) |

TABLE 15

| Formulation of curable composition | | Ex. 105 | Ex. 106 | Ex. 107 | Ex. 106 | Ex. 109 | Ex. 110 | Ex. 111 |
|---|---|---|---|---|---|---|---|---|
| First oligomer (g) | KR-500 | 29.5 | 29.0 | 28.0 | 24.0 | 14.0 | 4.0 | 3.2 |
| Second oligomer (g) | X-40-9250 | 4.5 | 5.0 | 6.0 | 10.0 | 20.0 | 30.0 | 30.8 |
| Mass ratio (Second oligomer/First oligomer) | | 0.15 | 0.17 | 0.21 | 0.42 | 1.43 | 7.50 | 9.63 |
| Silicone oil (g) | KF-96-10cs | — | — | — | — | — | — | — |
| | KF-96-50cs | — | — | — | — | — | — | — |

TABLE 15-continued

| Formulation of curable composition | | | Ex. 105 | Ex. 106 | Ex. 107 | Ex. 106 | Ex. 109 | Ex. 110 | Ex. 111 |
|---|---|---|---|---|---|---|---|---|---|
| | KF-96-100cs | | — | — | — | — | — | — | — |
| | KF-96-1000cs | | 2.0 | 2.0 | 2.0 | 2.0 | 2.0 | 2.0 | 2.0 |
| | KF-96-10000cs | | — | — | — | — | — | — | — |
| | KF-96-100000cs | | — | — | — | — | — | — | — |
| | KF-96-500000cs | | — | — | — | — | — | — | — |
| | KF-96-1000000cs | | — | — | — | — | — | — | — |
| | Subtotal (1) (First oligomer + Second oligomer + Silicone oil) | | 36.0 | 36.0 | 36.0 | 36.0 | 36.0 | 36.0 | 36.0 |
| Pigment (g) | 42-303B | | — | — | — | — | — | — | — |
| Solvent (g) | Methanol | | — | — | — | — | — | — | — |
| | Ethanol | | — | — | — | — | — | — | — |
| | 2-Propanol | | 54.0 | 64.0 | 64.0 | 54.0 | 64.0 | 64.0 | 54.0 |
| | Mass ratio (Solvent/Subtotal (1)) | | 1.5 | 1.5 | 1.5 | 1.5 | 1.5 | 1.5 | 1.5 |
| Catalyst (g) | Titanium tetrabutoxide | | 10.0 | 10.0 | 10.0 | 10.0 | 10.0 | 10.0 | 10.0 |
| | Mass ratio (Catalyst/Subtotal (1)) | | 0.28 | 0.25 | 0.28 | 0.28 | 0.28 | 0.28 | 0.28 |
| | Total | | 100.0 | 100.0 | 100.0 | 100.0 | 100.0 | 100.0 | 100.0 |
| | Thickness of cured layer [μm] | | 36.5 | 35.5 | 34.9 | 36.1 | 34.4 | 36.2 | 35.6 |
| Evaluation | Antifouling property (antifouling test) | Before sliding test Brightness difference ΔL* | −0.6 | −0.5 | −0.5 | −0.5 | −0.5 | −0.6 | −0.4 |
| | | Color difference ΔE$_{ab}$* | 0.7 | 0.6 | 0.6 | 0.6 | 0.6 | 0.7 | 0.15 |
| | | After sliding test Brightness difference ΔL* | −1.1 | −1.1 | −1.0 | −0.9 | −0.9 | −0.9 | −0.8 |
| | | Color difference ΔE$_{ab}$* | 1.2 | 1.2 | 1.1 | 1.0 | 1.0 | 1.0 | 0.9 |

TABLE 16

| Formulation of curable composition | | Ex. 112 | Ex. 113 | Ex. 114 | Ex, 115 | Ex. 116 | Ex. 117 |
|---|---|---|---|---|---|---|---|
| First oligomer (g) | KR-500 | 27.2 | 27.2 | 27.2 | 27.2 | 27.2 | 27.2 |
| Second oligomer (g) | X-40-0250 | 6.8 | 6.8 | 6.8 | 6.8 | 6.8 | 6.8 |
| | Mass ratio (Second oligomer/First oligomer) | 0.25 | 0.25 | 0.25 | 0.25 | 0.25 | 0.25 |
| Silicone oil (g) | KF-96-10cs | — | — | — | — | — | — |
| | KF-96-50cs | — | — | — | — | — | — |
| | KF-96-100cs | 2.0 | — | — | — | — | — |
| | KF-96-1000cs | — | 2.0 | — | — | — | — |
| | KF-96-10000cs | — | — | 2.0 | — | — | — |
| | KF-96-100000cs | — | — | — | 2.0 | — | — |
| | KF-96-500000cs | — | — | — | — | 2.0 | — |
| | KF-96-1000000cs | — | — | — | — | — | 2.0 |
| | Subtotal (1) (First oligomer + Second oligomer + Silicone oil) | 36.0 | 36.0 | 36.0 | 35.0 | 36.0 | 36.0 |
| Pigment (g) | 42-303B | — | — | — | — | — | — |
| Solvent (g) | Ethanol | — | — | — | — | — | — |
| | 2-Propanol | 54.0 | 54.0 | 54.0 | 54.0 | 54.0 | 54.0 |
| | Mass ratio (Solvent/Subtotal (1)) | 1.6 | 1.5 | 1.5 | 1.5 | 1.5 | 1.5 |
| Catalyst (g) | Titanium tetrabutoxide | 10.0 | 10.0 | 10.0 | 10.0 | 10.0 | 10.0 |
| | Mass ratio (Solvent/Subtotal (1)) | 0.28 | 0.48 | 0.28 | 0.28 | 0.28 | 0.28 |
| | Total | 100.0 | 100.0 | 100.0 | 100.0 | 100.0 | 100.0 |
| | Thickness of cured layer [μm] | 34.2 | 34.1 | 33.2 | 33.6 | 35.1 | 32.8 |
| Evaluation | Antifouling property (antifouling test) Before sliding test | — | — | — | — | — | — |
| | Brightness difference ΔL* | 0.5 | −0.5 | −0.6 | −0.5 | −0.5 | −0.5 |
| | Color difference ΔE$_{ab}$* | 0.7 | 0.7 | 0.7 | 0.6 | 0.6 | 0.6 |
| | After sliding test Brightness difference ΔL* | −1.3 | −1.0 | −0.9 | −0.9 | −0.6 | −0.5 |
| | Color difference ΔE$_{ab}$* | 1.4 | 1.1 | 1.0 | 1.0 | 0.7 | 0.8 |

TABLE 17

| Formulation of curable composition | | Ex. 118 | Ex. 119 | Ex. 120 | Ex. 121 | Ex. 122 | Ex. 123 | Ex. 124 | Ex. 125 | Ex. 126 |
|---|---|---|---|---|---|---|---|---|---|---|
| First oligomer (g) | KR-500 | 27.2 | 27.2 | 27.2 | 27.2 | 27.2 | 27.2 | 27.2 | 27.2 | 27.2 |
| Second oligomer (g) | X-40-9250 | 6.8 | 8.8 | 6.8 | 6.8 | 6.6 | 6.8 | 6.8 | 6.8 | 6.8 |
| | Mass ratio (Second oligomer/First oligomer) | 0.26 | 0.25 | 0.25 | 0.25 | 0.25 | 0.26 | 0.25 | 0.25 | 0.26 |
| Silicone oil (g) | KF-96-1000cs | 2.0 | 2.0 | 2.0 | 2.0 | 2.0 | 2.0 | 2.0 | 2.0 | 2.0 |
| | Subtotal (1) (First oligomer + Second oligomer + Silicone oil) | 36.0 | 36.0 | 86.0 | 36.0 | 36.0 | 36.0 | 36.0 | 36.0 | 36.0 |
| Pigment (g) | 42-303B | — | — | — | — | — | — | — | — | — |
| Solvent (g) | Methanol | — | — | — | — | — | — | — | — | — |
| | Ethanol | — | — | — | — | — | — | — | — | — |
| | 2-Propanol | 63.3 | 56.8 | 46.0 | 54.0 | 54.0 | 54.0 | 54.0 | 54.0 | 54.0 |
| | Mass ratio (Solvent/Subtotal (1)) | 1.5 | 1.6 | 1.3 | 1.6 | 1.5 | 1.5 | 1.5 | 1.5 | 1.6 |

TABLE 17-continued

| | Formulation of curable composition | | Ex. 118 | Ex. 119 | Ex. 120 | Ex. 121 | Ex. 122 | Ex. 123 | Ex. 124 | Ex. 125 | Ex. 126 |
|---|---|---|---|---|---|---|---|---|---|---|---|
| Catalyst (g) | Titanium tetrabutoxide | | 0.7 | 7.2 | 18.0 | — | — | — | — | — | — |
| | Titanium(IV) tetraisopropoxide | | — | — | — | 10.0 | — | — | — | — | — |
| | Titanium(IV) tetraethoxide | | — | — | — | — | 10.0 | — | — | — | — |
| | Aluminum(III)tri-sec-butoxide | | — | — | — | — | — | 10.0 | — | — | — |
| | Aluminum(III) triisopropoxide | | — | — | — | — | — | — | 10.0 | — | — |
| | Aluminum(III) triethoxide | | — | — | — | — | — | — | — | 10.0 | — |
| | Zirconium(IV) tetra-n-butoxide (about 80% 1-butanol) | | — | — | — | — | — | — | — | — | 10.0 |
| | Mass ratio (Catalyst/Subtotal (1)) | | 0.02 | 0.20 | 0.50 | 0.28 | 0 28 | 0.28 | 0.28 | 0.28 | 0.28 |
| | Total | | 100.0 | 100.0 | 100.0 | 100.0 | 100.0 | 100.0 | 100.0 | 100.0 | 100.0 |
| | Thickness of cured layer [µm] | | 33.2 | 32.1 | 32.4 | 32.6 | 31.9 | 33.4 | 32.7 | 32.8 | 32.8 |
| Evaluation | Antifouling property (antifouling test) | Before sliding test Brightness difference ΔL* | −0.6 | −0.6 | −0.9 | −0.6 | −0.7 | −0.0 | −0.7 | −0.6 | −0.6 |
| | | Color difference ΔE$_{ab}$* | 0.7 | 0.7 | 0.7 | 0.7 | 0.8 | 0.8 | 0.8 | 0.7 | 0.7 |
| | | After sliding test Brightness difference ΔL* | −1.3 | −1.0 | −1.0 | −1.0 | −1.1 | −1.0 | −1.3 | −1.0 | −1 3 |
| | | Color difference ΔE$_{ab}$* | 1.4 | 1.1 | 1.1 | 1.1 | 1.2 | 1.1 | 1.4 | 1.1 | 1.4 |

TABLE 18

| | Formulation of curable composition | | Ex. 127 | Ex. 126 | Ex. 129 | Ex. 130 | Ex. 131 | Ex. 132 | Ex. 133 | Ex. 134 |
|---|---|---|---|---|---|---|---|---|---|---|
| First oligomer (g) | KR-500 | | 27.2 | 27.2 | 27.2 | 27.2 | 27.2 | 27.2 | 27.2 | 27.2 |
| Second oligomer (g) | X-40-9250 | | 6 8 | 8.8 | 6.8 | 6.8 | 6.8 | 6.8 | 6.6 | 6.8 |
| | Mass ratio (Second oligomer/First oligomer) | | 0.25 | 0.25 | 0.25 | 0.25 | 0.25 | 0.25 | 0.25 | 0.25 |
| Silicone oil (g) | KF-96-1000cs | | 2.0 | 2.0 | 2.0 | 2.0 | 2.0 | 2.0 | 2.0 | 2.0 |
| | Subtotal (1) (First oligomer + Second oligomer + Silicone oil) | | 36.0 | 36.0 | 36.0 | 36.0 | 36.0 | 36.0 | 36.0 | 36.0 |
| Pigment (g) | 42-303B | | — | — | — | — | — | — | — | — |
| Solvent (g) | Methanol | | — | — | — | — | — | — | — | — |
| | Ethanol | | — | — | — | — | — | — | — | — |
| | 2-Propanol | | 54.0 | 54.0 | 54.0 | 54.0 | 54.0 | 54.0 | 54.0 | 54.0 |
| | Mass ratio (Solvent/Subtotal (1)) | | 1.5 | 1.5 | 1.5 | 1.5 | 1.5 | 1.5 | 1.5 | 1.5 |
| Catalyst (g) | metal chelate compound | Tris(2,4-pentonedionato)aluminum(III) | 10.0 | — | — | — | — | — | — | — |
| | | Tetrakis(2,4-pentanedionato)titanium(IV) | — | 10.0 | — | — | — | — | — | — |
| | | Bis(2,4-pentanedionato)bis(2-propanolato)titanium(IV) | — | — | 10.0 | — | — | — | — | — |
| | | Tetrakis(2,4-pentanedionato)zirconium(IV) | — | — | — | 10.0 | — | — | — | — |
| | Metal carboxylate | Zinc(II) bis(2-ethylhexanoate) | — | — | — | — | 10.0 | — | — | — |
| | | Iron(III)tris(2-ethylhexanoate) | — | — | — | — | — | 10.0 | — | — |
| | | Cobalt(II) bis(2-ethylhexanoate) | — | — | — | — | — | — | 10.0 | — |
| | | Manganese(II) bis(2-ethylhexanoate) | — | — | — | — | — | — | — | 10.0 |
| | Acid | Acetic acid | — | — | — | — | — | — | — | — |
| | | Phosphoric acid | — | — | — | — | — | — | — | — |
| | Mass ratio (Catalyst/Subtotal (1)) | | 0.26 | 0.26 | 0.28 | 0.28 | 0.28 | 0.28 | 0.28 | 0.28 |
| | Total | | 100.0 | 100.0 | 100.0 | 100.0 | 100.0 | 100.0 | 100.0 | 100.0 |
| | Thickness of cured layer [µm] | | 33.9 | 33.7 | 33.8 | 33.2 | 33.5 | 34.7 | 32.0 | 33.1 |
| Evaluation | Antifouling property (antifouling test) | Before sliding test Brightness difference ΔL* | −0.7 | −0 7 | −0.7 | −0.7 | −0.7 | −0.7 | −0.7 | −0.7 |
| | | Color difference ΔE$_{ab}$* | 0.8 | 0.8 | 0.9 | 0.9 | 0.8 | 0.8 | 0.8 | 0.9 |
| | | After sliding test Brightness difference ΔL* | −1.4 | −1.3 | −1.4 | −1.4 | −1.5 | −1.4 | −1.5 | −1.4 |
| | | Color difference ΔE$_{ab}$* | 1.5 | 1.4 | 1.5 | 1.5 | 1.6 | 1.5 | 1.6 | 1.5 |

TABLE 19

| | Formulation of curable composition | Ex. 135 | Ex. 136 | Ex. 137 | Ex. 138 | Ex. 139 | Ex. 140 | Ex. 141 | Ex. 142 | Ex. 143 |
|---|---|---|---|---|---|---|---|---|---|---|
| First oligomer (g) | KR-500 | 27.2 | 27.2 | 27.2 | 27.2 | 27.2 | 27.2 | 27.2 | 27.2 | 27.2 |
| Second oligomer (g) | X-40-9250 | 6.5 | 5.8 | 6.8 | 6.8 | 6.5 | 6,6 | 6.8 | 8.8 | 6.8 |
| | Mass ratio (Second oligomer/First oligomer) | 0.25 | 0.25 | 0.25 | 0.25 | 0.25 | 0.25 | 0.25 | 0.25 | 0.25 |
| Silicone oil (g) | KF-96-1000cs | 2.0 | 2.0 | 2.0 | 2.0 | 2.0 | 2.0 | 2.0 | 2.0 | 2.0 |

TABLE 19-continued

| Formulation of curable composition | | | Ex. 135 | Ex. 136 | Ex. 137 | Ex. 138 | Ex. 139 | Ex. 140 | Ex. 141 | Ex. 142 | Ex. 143 |
|---|---|---|---|---|---|---|---|---|---|---|---|
| | Subtotal (1) (First oligomer + Second oligomer + Silicone oil) | | 36.0 | 36.0 | 36.0 | 36.0 | 36.0 | 36.0 | 36.0 | 38.0 | 36.0 |
| Pigment (g) | 42-303B | | — | 5.0 | 15.0 | 25.0 | — | 5.0 | 15.0 | 25.0 | — |
| Solvent (g) | Methanol | Vapor pressure (13.3 kPa) | 62.0 | 57.0 | 47.0 | 37.0 | — | — | — | — | — |
| | Ethanol | Vapor pressure (5.9 kPa) | — | — | — | — | 62.0 | 57.0 | 47.0 | 37.0 | — |
| | Cyclohexane | Vapor pressure (10.6 kPa) | — | — | — | — | — | — | — | — | 62.0 |
| | Acetone | Vapor pressure (25.0 kPa) | — | — | — | — | — | — | — | — | — |
| | Diethytene glycol dimethyl ether | Vapor pressure (0.5 kPa) | — | — | — | — | — | — | — | — | — |
| | Tripropylene glycol monomethyl ether | Vapor pressure (0.004 kPa) | — | — | — | — | — | — | — | — | — |
| | Proropylene glycol | Vapor pressure (0.1 kPa) | — | — | — | — | — | — | — | — | — |
| | Water | Vapor pressure (2.3 kPa) | — | — | — | — | — | — | — | — | — |
| | Mass ratio (Solvent/Subtotal (1)) | | 1.7 | 1.6 | 1.3 | 1.0 | 1.1 | 1.6 | 1.3 | 1.0 | 1.7 |
| Catalyst (g) | Titanium tetrabutoxide | | 2.0 | 2.0 | 2.0 | 2.0 | 2.0 | 2.0 | 2.0 | 2.0 | 2.0 |
| | Mass ratio (Catalyst/Subtotal (1)) | | 0.06 | 0.06 | 0.06 | 0.06 | 0.06 | 0.06 | 0.06 | 0.06 | 0.06 |
| | Total | | 100.0 | 100.0 | 100.0 | 100.0 | 100.0 | 100.0 | 100.0 | 100.0 | 100.0 |
| | Thickness of cured layer [μm] | | 38.0 | 37.2 | 35.2 | 37.1 | 36.6 | 36.4 | 37.3 | 36.7 | 37.8 |
| Evaluation | Antifouling property (Antifouling test) | Before sliding test Brightness difference $\Delta L^*$ | −0.8 | −0.8 | −0.7 | −0.7 | −0.7 | −0.7 | −0.7 | −0.7 | −0.7 |
| | | Color difference $\Delta E_{ab}^*$ | 0.9 | 0.9 | 0.8 | 0.8 | 08 | 0.8 | 0.8 | 0.8 | 0.9 |
| | | After sliding test Brightness difference $\Delta L^*$ | −1.3 | −1.2 | −1.2 | −1.2 | −1.3 | −1.2 | −1.3 | −1.3 | −1.2 |
| | | Color difference $\Delta E_{ab}^*$ | 1.4 | 1.3 | 1.3 | 1.3 | 1.4 | 1.3 | 1.4 | 1.4 | 1.3 |

From the results shown in Tables 14 to 19, the antifouling layers of Examples have a high antifouling property, while Comparative Example, which has no antifouling layer, has a low antifouling property. Incidentally, Examples 116 to 117 have an excellent antifouling property but a high viscosity, and thus have a low operationality (handleability) compared with Example 103 or others.

Examples 144 to 163 and Comparative Examples 37 to 39

(Production of Test Sample)

A test sample having a protective layer on one surface thereof was produced in the same manner as Example 48 except that each curable composition shown in Tables 20 to 22 was used. Three test samples for each Example and Comparative Example were produced and were subjected to a water repellency test and a water slidability test. Incidentally, for Comparative Example 37, a test sample without lamination of a protective layer was subjected to a water repellency test and a water slidability test. For Comparative Examples 38 and 39, a protective layer was formed of a commercially available water-repellent coating composition as a curable composition.

(Water Repellency Test)

A contact angle of purified water (deionized water) was measured using a contact angle meter ("OCA 15EC" manufactured by Dataphysics Instruments GmbH). The test sample was horizontally placed on a member, and 10 drops of 2 μL water droplets were added dropwise on one place of the surface of the protective layer. The water contact angle of the resulting water drop was measured using the contact angle meter. The average value of five measurements was determined as a contact angle value. A test sample having a water contact angle of not less than 100° was judged to have an excellent water repellency.

(Water Slidability Test) A sliding angle of purified water (deionized water) was measured using the contact angle meter. The test sample was horizontally placed on a member, and 10 drops of 2 μL water droplets were dropped on one place of the surface of the protective layer. The member was gradually tilted, and the angle (sliding angle) at which the resulting water drop started to slide was measured. The average value of five measurements was determined as a sliding angle value. A test sample having a water sliding angle of less than 50° was judged to have an excellent water slidability.

(Sliding Test)

A sliding test was carried out at a reciprocation time of 50000 by pressing a wool felt against the protective layer at a load of 1 kg/cm$^2$ using RUBBING TESTER (manufactured by Taiheirikakogyo Kabushiki Kaisha). The contact angle and sliding angle were also measured for the test sample after the sliding test.

Tables 20 to 22 show the evaluation results of Examples 144 to 163 and Comparative Examples 37 to 39.

TABLE 20

| Formulation of curable composition | | Ex. 144 | Ex. 145 | Ex. 146 | Ex. 147 | Ex. 148 | Ex. 149 | Ex. 150 | Com. Ex. 37 | Com. Ex. 38 | Com. Ex. 39 |
|---|---|---|---|---|---|---|---|---|---|---|---|
| First oligomer (g) | KR-500 | 17.1 | 20.5 | 27.3 | 34.2 | 34.2 | 34.2 | 34.2 | — | — | — |
| Second oligomer (g) | X-40-9250 | 4.3 | 5.1 | 6.8 | 8.5 | 8.5 | 8.5 | 8.5 | — | — | — |
| Mass ratio (Second oligomer/First oligomer) | | 0.25 | 0.25 | 0.25 | 0.25 | 0.26 | 0.25 | 0.25 | — | — | — |
| Silicone oil (g) | KF-96-10cs | — | — | — | — | — | — | — | — | — | — |
| | KF-96-50cs | — | — | — | — | — | — | — | — | — | — |
| | KF-96-100cs | — | — | — | — | — | — | — | — | — | — |
| | KF-96-1000cs | 1.1 | 1.4 | 1.9 | 2.3 | 2.3 | 2.3 | 2.3 | — | — | — |
| | KF-96-10000cs | — | — | — | — | — | — | — | — | — | — |
| | KF-96-100000cs | — | — | — | — | — | — | — | — | — | — |
| | KF-96-500000cs | — | — | — | — | — | — | — | — | — | — |
| | KF-96-1000000cs | — | — | — | — | — | — | — | — | — | — |
| Subtotal (1) (First oligomer + Second oligomer + Silicone oil) | | 22.5 | 27.0 | 36.0 | 45.0 | 46.0 | 46.0 | 45.0 | — | — | — |
| Pigment (g) | 42-303B | — | — | — | — | 5.0 | 15.0 | 25.0 | — | — | — |
| Solvent (g) | Methanol | — | — | — | — | — | — | — | — | — | — |
| | Ethanol | — | — | — | — | — | — | — | — | — | — |
| | 2-Propanol | 57.5 | 63.0 | 54.0 | 45.0 | 40.0 | 30.0 | 20.0 | — | — | — |
| Mass ratio (Solvent/Subtotal (1)) | | 3.0 | 2.3 | 1.5 | 1.0 | 0.9 | 0.7 | 0.4 | — | — | — |
| Catalyst (g) | Titanium tetrabutoxide | 10.0 | 10.0 | 10.0 | 10.0 | 10.0 | 10.0 | 10.0 | — | — | — |
| Mass ratio (Catalyst/Subtotal (1)) | | 0.44 | 0.37 | 0.28 | 0.22 | 0.22 | 0.22 | 0.22 | — | — | — |
| Total | | 100.0 | 100.0 | 100.0 | 100.0 | 100.0 | 100.0 | 100.0 | — | — | — |
| Thickness of cured layer [μm] | | 34.2 | 36.1 | 33.8 | 35.0 | 34.5 | 35.1 | 34.6 | — | — | — |
| Evaluation | Before sliding test Water contact angle [°] | 107 | 106 | 106 | 107 | 106 | 106 | 106 | 93 | 104 | 99 |
| | (water contact angle test) Water sliding angle [°] | 24 | 24 | 24 | 25 | 24 | 24 | 24 | >90 | 26 | 30 |
| | After sliding test Water contact angle [°] | 102 | 102 | 101 | 103 | 103 | 104 | 104 | 89 | 77 | 66 |
| | (water sliding angle test) Water sliding angle [°] | 39 | 38 | 37 | 35 | 45 | 46 | 44 | >90 | 55 | 51 |
| Remark | | | | | | | | | Aluminum plate alone (no protective layer) | SL-100/SL-610 manufactured by ThreeBond Co., Ltd | TB2907 manufactured by ThreeBond Co., Ltd |

TABLE 21

| Formulation of curable composition | | | Ex. 151 | Ex. 152 | Ex. 153 | Ex. 154 | Ex. 155 | Ex. 156 | Ex. 157 |
|---|---|---|---|---|---|---|---|---|---|
| First oligomer (g) | KR-500 | | 29.5 | 29.0 | 28.0 | 24.0 | 14.0 | 4.0 | 3.2 |
| Second oligomer (g) | X-40-9250 | | 4.5 | 5.0 | 6.0 | 10.0 | 20.0 | 30.0 | 30.6 |
| | Mass ratio (Second oligomer/First oligomer) | | 0.15 | 0.17 | 0.21 | 0.42 | 1.43 | 7.50 | 9.63 |
| Silicone oil (g) | KF-96-10cs | | — | — | — | — | — | — | — |
| | KF-96-50cs | | — | — | — | — | — | — | — |
| | KF-96-100cs | | — | — | — | — | — | — | — |
| | KF-96-1000cs | | 2.0 | 2.0 | 2.0 | 2.0 | 2.0 | 2.0 | 2.0 |
| | KF-96-10000cs | | — | — | — | — | — | — | — |
| | KF-96-100000cs | | — | — | — | — | — | — | — |
| | KF-96-500000cs | | — | — | — | — | — | — | — |
| | KF-96-1000000cs | | — | — | — | — | — | — | — |
| | Subtotal (1) (First oligomer + Second oligomer + Silicone oil) | | 36.0 | 36.0 | 36.0 | 36.0 | 36.0 | 36.0 | 36.0 |
| Pigment (g) | 42-303B | | — | — | — | — | — | — | — |
| Solvent (g) | Methanol | | — | — | — | — | — | — | — |
| | Ethanol | | — | — | — | — | — | — | — |
| | 2-Propanol | | 54.0 | 54.0 | 54.0 | 54.0 | 54.0 | 54.0 | 54.0 |
| | Mass ratio (Solvent/Subtotal (1)) | | 1.5 | 1.5 | 1.5 | 1.5 | 1.5 | 1.5 | 1.5 |
| Catalyst (g) | Titanium tetrabutoxide | | 10.0 | 10.0 | 10.0 | 10.0 | 10.0 | 10.0 | 10.0 |
| | Mass ratio (Catalyst/Subtotal (1)) | | 0.28 | 0.28 | 0.28 | 0.28 | 0.8 | 0.28 | 0.28 |
| | Total | | 100.0 | 100.0 | 100.0 | 100.0 | 100.0 | 100.0 | 100.0 |
| | Thickness of cured layer [μm] | | 36.5 | 36.5 | 34.9 | 36.1 | 34.4 | 35.2 | 35.6 |
| Evaluation | Water repellency | Before sliding test | 107 | 107 | 107 | 108 | 109 | 109 | 109 |
| | (Water contact angle test) | Water contact angle [°] | | | | | | | |
| | (water siding angle test) | Water sliding angle [°] | 25 | 24 | 24 | 25 | 24 | 25 | 25 |
| | | After sliding test | 101 | 103 | 104 | 105 | 105 | 105 | 106 |
| | | Water contact angle [°] | | | | | | | |
| | | Water sliding angle [°] | 45 | 42 | 39 | 38 | 37 | 35 | 33 |

TABLE 22

| Formulation of curable composition | | | Ex. 158 | Ex. 159 | Ex. 160 | Ex. 191 | Ex. 162 | Ex. 163 |
|---|---|---|---|---|---|---|---|---|
| First oligomer (g) | KR-500 | | 27.2 | 27.2 | 27.2 | 27.2 | 271 | 27.2 |
| Second oligomer (g) | X-40-9250 | | 6.5 | 6.8 | 8.8 | 6.6 | 6.8 | 6.5 |
| | Mass ratio (Second oligomer/First oligomer) | | 0.25 | 0.25 | 0.25 | 0.25 | 0.25 | 0.28 |
| Silicone oil (g) | KF-96-10cs | | — | — | — | — | — | — |
| | KF-96-50cs | | — | — | — | — | — | — |
| | KF-96-100cs | | 2.0 | — | — | — | — | — |
| | KF-96-1000cs | | — | 2.0 | — | — | — | — |
| | KF-96-10000cs | | — | — | 2.0 | — | — | — |
| | KF-96-100000cs | | — | — | — | 2.0 | — | — |
| | KF-96-500000cs | | — | — | — | — | 2.0 | — |
| | KF-96-1000000cs | | — | — | — | — | — | 2.0 |
| | Subtotal (1) (First oligomer + Second oligomer + Silicone oil) | | 36.0 | 36.0 | 36.0 | 36.0 | 36.0 | 36.0 |
| Pigment (g) | 42-303B | | — | — | — | — | — | — |
| Solvent (g) | Ethanol | | — | — | — | — | — | — |
| | 2-Propanol | | 54.0 | 54.0 | 54.0 | 54.0 | 54.0 | 54.0 |
| | Mass ratio (Solvent/Subtotal (1)) | | 1.5 | 1.5 | 1.5 | 1.5 | 1.8 | 1.5 |
| Catalyst (g) | Titanium tetrabutoxide | | 10.0 | 10.0 | 10.0 | 10.0 | 10.0 | 10.0 |
| | Mass ratio (Catalyst/Subtotal (1)) | | 0.28 | 0.28 | 0.28 | 0.28 | 0.28 | 0.28 |
| | Total | | 100.0 | 100.0 | 100.0 | 100,0 | 100.0 | 100.0 |
| | Thickness of cured layer [μm] | | 34.2 | 34.1 | 33.2 | 33.8 | 351 | 32.8 |
| Evaluation | Water repellency | Before sliding test | 105 | 107 | 105 | 106 | 108 | 106 |
| | (Water contact angle test) | Water contact angle [°] | | | | | | |
| | | Water sliding angle [°] | 24 | 24 | 25 | 26 | 25 | 26 |
| | | After sliding test | 101 | 101 | 103 | 103 | 104 | 104 |
| | | Water contact angle [°] | | | | | | |
| | | Water sliding angle [°] | 44 | 43 | 40 | 38 | 38 | 37 |

From the results shown in Tables 20 to 22, the protective layers of Examples have a high water repellency and a high water slidability, while the protective layers of Comparative Examples have a low water repellency and a low water slidability.

Examples 164 to 183 and Comparative Example 40

(Production of Test Sample)

A test sample having an antifouling layer on one surface thereof was produced in the same manner as Example 48 except that each curable composition shown in Tables 23 to 25 was used. Three test samples for each Example and Comparative Example were produced and were subjected to a removability test of oil (n-hexadecane). Incidentally, for Comparative Example 40, a test sample without lamination of an antifouling layer was subjected to a removability test of oil.

(Removability Test of Oil)

Using a dropper, 1 g of n-hexadecane was added dropwise on the cured layer, and was allowed to stand at room temperature for 10 minutes. After standing, the cured layer was washed with a gauze ("BEMCOT M-3" manufactured by Asahi Kasei Corp.) under running water until n-hexadecane was not removed any more (until no n-hexadecane was washed off). After washing, the slipperiness on the cured layer was confirmed with fingers and was evaluated on the basis of the following criteria.

A: n-Hexadecane do not remain, and the surface of the cured layer has no slipperiness.

B: n-Hexadecane slightly remains, and the surface of the cured layer has a slight slipperiness.

C: n-Hexadecane remains, and the surface of the cured layer has a slipperiness.

Moreover, the sliding test was carried out in the same manner as Example 48, and the removability test of oil was also performed for test samples after the sliding test.

Tables 23 to 25 show the evaluation results of Examples 164 to 183 and Comparative Example 40.

TABLE 23

| Formulation or curable composition | | Ex. 164 | Ex. 165 | Ex. 166 | Ex. 167 | Ex. 168 | Ex. 169 | Ex. 170 | Com. Ex. 40 |
|---|---|---|---|---|---|---|---|---|---|
| First oligomer (g) | KR-500 | 17.1 | 20.5 | 27.3 | 34.2 | 34.2 | 34.2 | 34.2 | — |
| Second oligomer (g) | X-40-9250 | 4.3 | 5.1 | 6.8 | 8.5 | 8.5 | 8.5 | 8.5 | — |
| Mass ratio (Second oligomer/First oligomer) | | 0.25 | 0.25 | 0.25 | 0.25 | 0.25 | 0.25 | 0.25 | — |
| Silicone oil (g) | KF-96-10cs | — | — | — | — | — | — | — | — |
| | KF-96-50cs | — | — | — | — | — | — | — | — |
| | KF-96-100cs | — | — | — | — | — | — | — | — |
| | KF-96-1000cs | 1.1 | 1.4 | 1.9 | 2.3 | 2.3 | 2.3 | 2.3 | — |
| | KF-96-10000cs | — | — | — | — | — | — | — | — |
| | KF-96-100000cs | — | — | — | — | — | — | — | — |
| | KF-96-500000cs | — | — | — | — | — | — | — | — |
| | KF-96-1000000cs | — | — | — | — | — | — | — | — |
| Subtotal (1) (First oligomer + Second oligomer + Silicone oil) | | 22.5 | 27.0 | 36.0 | 45.0 | 45.0 | 45.0 | 45.0 | — |
| Pigment (g) | 42-303B | — | — | — | — | 5.0 | 15.0 | 25.0 | — |
| Solvent (g) | Methanol | — | — | — | — | — | — | — | — |
| | Ethanol | — | — | — | — | — | — | — | — |
| | 2-Propanol | 67.5 | 63.0 | 54.0 | 45.0 | 40.0 | 30.0 | 20.0 | — |
| Mass ratio (Solvent/Subtotal (1)) | | 3.0 | 2.3 | 1.5 | 1.0 | 0.9 | 0.7 | 0.4 | — |
| Catalyst (g) | Titanium tetrabutoxide | 10.0 | 10.0 | 10.0 | 10.0 | 10.0 | 10.0 | 10.0 | — |
| Mass ratio (Catalyst/Subtotal (1)) | | 0.44 | 0.37 | 0.28 | 0.22 | 0.22 | 0.22 | 0.22 | — |
| Total | | 100.0 | 100.0 | 100.0 | 100.0 | 100.0 | 100.0 | 100.0 | — |
| Thickness of cured layer [μm] | | 34.2 | 36.1 | 33.8 | 35.0 | 34.5 | 35.1 | 34.6 | — |
| Evaluation | Removability test of oil Before sliding test | A | A | A | A | A | A | A | C |
| | After sliding test | A | A | A | A | A | A | A | C |
| Remark | | | | | | | | | Aluminum plate alone (no protective material) |

TABLE 24

| Formulation of curable composition | | Ex. 171 | Ex. 172 | Ex. 173 | Ex. 174 | Ex. 175 | Ex. 176 | Ex. 177 |
|---|---|---|---|---|---|---|---|---|
| First oligomer (g) | KR-500 | 29.5 | 29.0 | 28.0 | 24.0 | 14.0 | 4.0 | 3.2 |
| Second oligomer (g) | X-40-9250 | 4.5 | 5.0 | 6.0 | 10.0 | 20.0 | 30.0 | 30.8 |
| Mass ratio (Second oligomer/First oligomer) | | 0.15 | 0.17 | 0.21 | 0.42 | 1.43 | 7.50 | 9.63 |
| Silicone oil (g) | KF-96-10cs | — | — | — | — | — | — | — |
| | KF-96-50cs | — | — | — | — | — | — | — |
| | KF-96-100cs | — | — | — | — | — | — | — |
| | KF-98-1000cs | 2.0 | 2.0 | 2.0 | 2.0 | 2.0 | 2.0 | 2.0 |
| | KF-96-10000cs | — | — | — | — | — | — | — |
| | KF-96-100000cs | — | — | — | — | — | — | — |
| | KF-96-500000cs | — | — | — | — | — | — | — |
| | KF-96-1000000cs | — | — | — | — | — | — | — |
| Subtotal (1) First oligomer + Secoond oligomer + Silicone oil | | 36.0 | 36.0 | 36.0 | 36.0 | 36.0 | 36.0 | 36.0 |
| Pigment(g) | 42-303B | — | — | — | — | — | — | — |
| Solvent (g) | Methanol | — | — | — | — | — | — | — |
| | Ethanol | — | — | — | — | — | — | — |
| | 2-Propanol | 54.0 | 54.0 | 54.0 | 54.0 | 54.0 | 54.0 | 54.0 |
| Mass ratio (Solvent/Subtotal (1)) | | 1.5 | 1.5 | 1.5 | 1.5 | 1.5 | 1.5 | 1.5 |
| Catalyst (g) | Titanium tetrabutoxide | 10.0 | 10.0 | 10.0 | 10.0 | 10.0 | 10.0 | 10.0 |
| Mass ratio (Catalyst/Subtotal (1)) | | 0.28 | 0.28 | 0.28 | 0.28 | 0.28 | 0.28 | 0.28 |
| Total | | 100.0 | 100.0 | 100.0 | 100.0 | 100.0 | 100.0 | 100.0 |
| Thickness of cured layer [μm] | | 36.5 | 35.5 | 34.9 | 36.1 | 34.4 | 35.2 | 35.6 |
| Evaluation | Removability test of oil Before sliding test | A | A | A | A | A | A | A |
| | After sliding test | A | A | A | A | A | A | A |

TABLE 25

| Formulation of curable composition | | Ex. 178 | Ex. 179 | Ex. 180 | Ex. 181 | Ex.182 | Ex. 183 |
|---|---|---|---|---|---|---|---|
| First oligomer (g) | KR-500 | 27.2 | 27.2 | 27.2 | 27.2 | 27.2 | 27.2 |
| Second oligomer (g) | X-40-9250 | 6.8 | 6.8 | 6.8 | 6.8 | 6.8 | 6.8 |
| Mass ratio (Second oligomer/First oligomer) | | 0.25 | 0.25 | 0.25 | 0.25 | 0.25 | 0.25 |

TABLE 25-continued

| Formulation of curable composition | | Ex. 178 | Ex. 179 | Ex. 180 | Ex. 181 | Ex.182 | Ex. 183 |
|---|---|---|---|---|---|---|---|
| Silicone oil (g) | KF-96-10cs | — | — | — | — | — | — |
| | KF-96-50cs | — | — | — | — | — | — |
| | KF-96-100cs | 2.0 | — | — | — | — | — |
| | KF-96-1000cs | — | 2.0 | — | — | — | — |
| | KF-96-10000cs | — | — | 2.0 | — | — | — |
| | KF-96-100000cs | — | — | — | 2.0 | — | — |
| | KF-96-500000os | — | — | — | — | 2.0 | — |
| | KF-96-1000000cs | — | — | — | — | — | 2.0 |
| Subtotal(1) (First oligomer + Second oligomer + Silicone oil) | | 36.0 | 36.0 | 38.0 | 36.0 | 38.0 | 36.0 |
| Pigment (g) | 42-303B | — | — | — | — | — | — |
| Solvent (g) | Methanol | — | — | — | — | — | — |
| | Ethanol | — | — | — | — | — | — |
| | 2-Propanol | 54.0 | 54.0 | 54.0 | 54.0 | 54.0 | 54.0 |
| Mass ratio (Solvent/Subtotal (1)) | | 1.5 | 1.5 | 1.5 | 1.5 | 1.5 | 1.5 |
| Catalyst (g) | Titanium tetrabutoxide | 10.0 | 10.0 | 10.0 | 10.0 | 10.0 | 10.0 |
| Mass ratio (Catalyst/Subtotal (1)) | | 0.28 | 0.28 | 0.28 | 0.28 | 0.28 | 0.28 |
| Total | | 100.0 | 100.0 | 100.0 | 100.0 | 100.0 | 100.0 |
| Thickness of cured layer [μm] | | 34.2 | 34.1 | 33.2 | 33.6 | 35.1 | 32.8 |
| Evaluation | Removability test of oil Before sliding test | A | A | A | A | A | A |
| | After sliding test | A | A | A | A | A | A |

From the results shown in Tables 23 to $2^5$, the antifouling layer of Examples have a high removability of oil, while the antifouling layer of Comparative Example has a low removability of oil.

Examples 184 to 187 and Comparative Example 41

[Preparation of Curable Composition]

To a 200-ml glass container were added (A) a first oligomer, (B) a second oligomer, (C) a silicone oil, (D) a curing catalyst, (E) and a solvent at a proportion shown in Table 31, and the mixture was stirred using a magnetic stirrer for 20 minutes to prepare a curable composition.

[Brief Description, Size, and Number of Concrete Specimens]

A specimen of each sample (protective material) for various evaluation tests was provided as follows. The resulting curable composition, as a protective material for a permeable concrete, was applied to opposite test faces (two cut surfaces opposite to each other) of a concrete prism (100 mm-100 mm×100 mm) as a substrate to give the specimen. The number of specimens for various evaluation tests was 6 for each protective material.

[Formulation and Production of Concrete Specimen]

A concrete as substrate was produced as follows.

(1) Materials, Formulation of Concrete

Table 26 shows used materials and Table 27 shows the formulation of the concrete.

TABLE 26

(Materials)

| Material | Symbol | Kind, Name | Producer or production district | Density (g/cm$^3$) |
|---|---|---|---|---|
| Water | W | Tap water | — | 1.00 |
| Cement | C | Ordinary Portland cement | Manufactured by TAIHEIYO CEMENT CORPORATION | 3.16 |
| Fine aggregate | S | Pit sand | Produced in Kakegawa City, Shizuoka Prefecture | 2.56 (Density in saturated surface-dry condition) |
| Coarse aggregate | G | Crushed stone 2005 | Produced in Sakuragawa City, Ibaraki Prefecture | 2.63 (Density in saturated surface-dry condition) |
| Admixture | AD1 | Air-entraining and water-reducing admixture standard (type I) MasterPozzolith 78S | Manufactured by BASF Japan Ltd. | — |
| | AD2 | Air-entraining and water-reducing admixture standard (type I) MasterAir 303A | Manufactured by BASF Japan Ltd. | — |

TABLE 27

(Formulation of concrete)

| Formulation name | Water-cement ratio (%) | Sand-total aggregate ratio (%) | Target slump (cm) | Target air content (%) | Unit quantity (kg/m$^3$) | | | | AD1 (C × %) | AD1 (C × %) |
|---|---|---|---|---|---|---|---|---|---|---|
| | | | | | W | C | S | W | | |
| Substrate | 55 | 46 | 12 ± 2.5 | 4.5 ± 1.5 | 156 | 302 | 817 | 985 | 1.00 | 0.003 |

(2) Mixing of Concrete and Production of Substrate Concrete Specimen

Mixing of the concrete was carried out using a revolving-paddle pan mixer having a nominal capacity of 50 L in a temperature-controlled room at a temperature of 20° C. and a humidity of not less than 60%. The mixing amount was 35 liters, and a substrate concrete specimen was produced by mixing one batch. The mixing procedure is shown in FIG. 1. The coarse aggregate, the cement, and the fine aggregate were mixed for 30 seconds, the water and the admixture were then added thereto and mixed for 60 seconds, and the mixture sticking inside the container was scraped off and mixed for another 60 seconds to produce a fresh concrete. The slump, air content, and temperature of the fresh concrete were measured. Table 28 shows the test items and test methods of the fresh concrete. Table 29 shows the test results of the fresh concrete.

TABLE 28

(Test items and methods of fresh concrete)

| Test item | Test method |
|---|---|
| Slump | In accordance with JIS A1101 "Method of test for slump of concrete" |
| Air content | In accordance with JIS A1128 "Method of test for air content of fresh concrete by pressure method" |
| Temperature | In accordance with JIS A1156 "Method of measurement for temperature of fresh concrete" |

TABLE 29

(Test results of fresh concrete)

| Formulation name | Slump (cm) | Air content (%) | Temperature (° C.) |
|---|---|---|---|
| Substrate | 12.0 | 4.8 | 23 |

For the concrete having the formulation shown in Table 27, four concrete specimens, each having a size of 100 mm×100 mm×400 mm, were produced. Each one of the concrete specimens was produced, in accordance with JIS A1132 "Method of making and curing concrete specimens", by placing the concrete in a steel form having a size of 100 mm×100 mm×400 mm in a temperature-controlled room at a temperature of 20° C. and a humidity of not less than 60%, trowel-finishing the concrete, and then coating the surface of the concrete with a wrap.

(3) Curing and Processing of Substrate Concrete Specimen

The concrete specimen having a size of 100 mm×100 mm×400 mm produced as the above was removed from the form at the age of one day, was water-cured at a temperature of 20° C. until the age of 7 days. Then, a placed surface 1 and cut surfaces (test faces) 2 were set as shown in FIG. 2, and the concrete specimen was cut with a concrete cutter to give prisms having a size of 100 mm×100 mm×100 mm. Thereafter, the cut specimens were air-cured at a temperature of 23° C. and a humidity of 50% until the age of 35 days to give specimens (substrates) for various evaluation tests. Incidentally, the test faces (surfaces having an applied protective material) in various evaluation tests are two cut surfaces.

[Coating with Sealant]

In the concrete specimen for various evaluation tests, four faces (four surfaces) other than the test faces were sealed with epoxy resin-series coating materials on or after the age of 35 days. Table 30 shows the information of a sealant. Moreover, FIG. 3 shows a procedure for coating (applying) with the sealant. The surfaces to be applied to the sealant were filed to remove efflorescence and were then primer-treated with an epoxy resin-series primer. On the surfaces, an epoxy putty was applied and then an epoxy resin intermediate coating composition was applied, and further an epoxy resin intermediate coating composition was applied. Incidentally, after the sealant was applied, a protective material for a permeable concrete was applied to the test faces.

TABLE 30

(Information of sealant)

| Used material | Bland | Applying amount (kg/m$^2$) |
|---|---|---|
| Epoxy resin-series primer | Toughguard E primer, manufactured by NIPPONPAINT Co., Ltd. | About 0.10 |
| Epoxy resin putty | Toughguard E putty N-2 summer, manufactured by NIPPONPAINT Co., Ltd. | About 0.3 to 0.8 |
| Epoxy resin intermediate coating composition | HI-PON 30 mastic intermediate coating, manufactured by NIPPONPAINT Co., Ltd. | About 0.14 |

[Application of Protective Material for Permeable Concrete]

A protective material for a permeable concrete was applied to the test faces of the substrate for various evaluation tests after the sealant was applied. The sample (protective material) was applied with a brush to the test faces of the substrate placed as shown in FIG. 4. That is, a protective material 15 was applied in a state where a substrate 12 sealed with a sealant 13 was placed on a pedestal 11 and was surrounded by a masking tape 14 in order not to drip or protrude the protective material 15 to the surfaces sealed with the sealant 13 of the substrate 12. The number of specimens were 5 for each sample (protective material). The applying amount was managed every test face by measuring the mass decrease of the sample (protective material) and the brush in 0.01 g unit and controlling the mass decrease to an acceptable applying amount of about ±5%. The sample (protective material) was applied to one of the test faces and dried and then was applied on the other of the face faces. The specimen was stored in a constant temperature and humidity room at a temperature of 20° C. and a humidity of 60% for 14 days after the application, and various evaluation tests were carried out.

[Weight Change after Water Immersion (Water Absorption Test)]

For a water absorption test, in a temperature-controlled room at 20° C., tap water was put in a plastic container, and the specimen to which the protective material was applied was immersed in the water having a temperature of 20° C. for 28 days. Incidentally, the depth of the water in the immersion was adjusted so that the distance from the upper surface of the specimen to the surface of the water was 20 mm. Moreover, the water was changed every 14 days. The mass of the specimen was measured to the order of 0.01 g immediately before water immersion. After the specimen was removed from the water immediately after water immersion of 28 days and water was sufficiently wiped with a paper towel from the surface of the specimen, the mass of the specimen was measured to the order of 0.01 g. Incidentally, as the water absorption of the specimen to which the protective material was applied, the maximum and the minimum values out of 5 specimens were rejected and the results of the remaining 3 specimens were adopted. The water absorption was calculated by the following formula and was rounded off to two decimal places in a uniform manner:

$$W=((w_{28}-w_0)/w_0)\times 100$$

wherein W: water absorption (%) after immersion of 28 days, $w_{28}$: mass (g) of specimen after immersion of 28 days, $w_0$: mass (g) of specimen before immersion.

Table 31 shows the evaluation results of Examples 184 to 187 and Comparative Example 41.

patterning a siding material (an exterior wall material), a paper-making roller, and a printing roller. Examples of the metal mold or resin mold may include a metal mold or resin mold for producing a sanitary or hygienic material, a mold for producing a rubber product (such as a tire or a glove), a mold for forming shoes, a metal mold or resin mold for producing an automobile part, a metal mold or resin mold for urethane molding, a molding metal mold or resin mold for a hot-melt adhesive, and an extrusion metal mold or resin mold for a solid hot-melt adhesive. The plate may include, for example, a plate which is used in a step of laminating a nonwoven fabric and a water-absorbing polymer material and to which a hot-melt adhesive can adhere, and a plate for

TABLE 31

| | | Ex. 184 | Ex. 185 | Ex. 186 | Ex. 187 | Com. Ex. 41 |
|---|---|---|---|---|---|---|
| First oligomer (g) | KR-500 | 17.1 | 20.5 | 27.3 | 34.2 | — |
| Second oligomer (q) | X-40-9250 | 4.3 | 5.1 | 6.8 | 8.5 | — |
| | Mass ratio (Second oligomer/First oligomer) | 0.25 | 0.25 | 0.25 | 0.25 | — |
| Silicone oil (g) | KF-96-10cs | — | — | — | — | — |
| | KF-96-50cs | — | — | — | — | — |
| | KF-96-100cs | — | — | — | — | — |
| | KF-96-1000cs | 1.1 | 1.4 | 1.9 | 2.3 | — |
| | KF-96-10000cs | — | — | — | — | — |
| | KF-96-100000cs | — | — | — | — | — |
| | KF-96-500000cs | — | — | — | — | — |
| | KF-96-1000000cs | — | — | — | — | — |
| | Subtotal (1) (First oligomer + Second oligomer + Silicone oil) | 22.5 | 27.0 | 36.0 | 45.0 | — |
| Pigment (g) | 42-303B | — | — | — | — | — |
| Solvent (g) | Methanol | — | — | — | — | — |
| | Ethanol | — | — | — | — | — |
| | 2-Propanol | 67.5 | 63.0 | 54.0 | 45.0 | — |
| | Mass ratio (Solvent/Subtotal (1)) | 3.0 | 2.3 | 1.5 | 1.0 | — |
| Catalyst (g) | Titanium tetrabutoxide | 10.0 | 10.0 | 10.0 | 10.0 | — |
| | Mass ratio (Catalyst/Subtotal (1)) | 0.44 | 0.37 | 0.28 | 0.22 | — |
| | Total | 100.0 | 100.0 | 100.0 | 100.0 | — |
| | Thickness of cured layer [mm] | 34.2 | 36.1 | 33.8 | 35.0 | — |
| Evaluation | Mass change after water Coated amount of protective material [g/m²] | 200 | 200 | 200 | 200 | — |
| | immersion of 28 days Volume change after water immersion of 28 days [%] | 0.48 | 0.45 | 0.43 | 0.43 | (2.62) |
| | (water absorption test) Coated amount of protective material [g/m²] | 300 | 300 | 300 | 300 | — |
| | Volume change after water immersion of 28 days [%] | 0.4 | 0.38 | 0.37 | 0.37 | — |
| | Remark | | | | | Not applied (concrete alone) |

From the results shown in Table 31, the protective materials of Examples effectively prevent the water penetration to the concrete.

INDUSTRIAL APPLICABILITY

The curable composition of the present invention can form the cured product having a non-tackiness and a water repellency and thus can be utilized as various antifouling and/or protective compositions that require an antifouling or protective function. In particular, since the curable composition of the present invention is moisture-curable at room temperature, the curable composition is suitable for a use that does not require any heat treatment and is also suitable for a use in a place where use of fire is restricted.

For example, the curable composition of the present invention can also be utilized as a composition for forming a protective layer of a shaped product in a factory or other places where use of fire is restricted. Examples of such a shaped product may include a roller, a metal mold (or die), a resin mold (or die), a plate (a plate member), a chute, a hopper, and a cooker. The roller may include, for example, a drying roller, an application roller, a transfer roller, a laminating roller, a pressure roller, a guide roller, a roller for sliding a resin pellet. Examples of the hopper may include a food scale hopper and a powder-supplying hopper. The cooker may include, for example, a grill, a pan, a frying pan, and a grill plate.

Moreover, since the curable composition of the present invention has an excellent durability of an antifouling or protective function, the curable composition is also suitable for a use in the open air or a use at home. Thus, the curable composition can be utilized as a composition for preventing adhesion of snow, ice, stain, algae, marine life, or others to or preventing water penetration to a surface of a building or structure or that of a transport equipment; the building or structure may include, for example, a building, a storage tank, a bridge, a telegraph pole, a traffic light, a cable, an antenna, or a sign, and the transport equipment may include, for example, an automobile, a vehicle, a ship or a vessel, or an aircraft.

Specifically, the curable composition can be utilized as a composition for preventing adhesion of snow and/or ice, particularly, a composition for accelerating sliding of snow and ice (a coating composition for preventing snow and ice accretion), for example, can be utilized as a surface protective layer (a layer for accelerating sliding of snow and ice) of a traffic sign, an ETC sensor, a sound-proof wall of highway, an automobile (a window, a wheel), an LED traffic signal, a roof, a propeller of a snow remover, a drone, a wing of an airplane, a wing for wind power generation, a railway (a railroad switch, a pantograph), a bridge, a parabolic antenna, a weather measuring device (an air flow meter), an electric wire, or others.

Moreover, the curable composition can also be utilized as a composition (an antifouling coating composition) for preventing adhesion of a stain component such as an oil, water scale, a microorganism including mold or algae, or a marine life, for example, can be utilized as a surface antifouling layer (an antifouling layer for preventing adhesion of a marine life) of a ship, an offshore structure, or others, a surface antifouling layer (an antifouling layer for preventing adhesion of an oil stain or others) and hard-coat layer (for scratch prevention) of an inner and/or outer surface of a cooking device such as a refrigerator, an oven or a toaster and a range hood or a kitchen area structure, a surface antifouling layer (an antifouling layer for preventing adhesion of water scale or others) and hard-coat layer (for scratch prevention) of a sanitary ware such as a toilet bowl, a bathtub or a bath structure, a sink, a tank, a glass, or a mirror in a washroom, further a surface antifouling layer of a playground apparatus such as a slid, a floor, a window frame, a roof, a gutter, a satellite antenna, an eyeglass lens, or a nozzle of a vacuum cleaner, and a surface antifouling layer and hard-coat layer (for scratch prevention) of an earthwork or farming tool such as a shovel or a spade, or a scoop or a trowel.

Further, the curable composition can also be utilized as a composition for preventing water penetration to a water-permeable substrate such as a shaped concrete product, for example, can be utilized as a surface protective layer (a protective layer of a shaped concrete product) of a shaped concrete product such as a building, a storage tank, or a bridge.

The invention claimed is:

1. A curable composition comprising:
   (A) a first siloxane oligomer being free from a siloxane unit represented by the following formula (I) and containing an alkoxy-group-containing siloxane unit,
   (B) a second siloxane oligomer containing a siloxane unit represented by the above formula (I) and an alkoxy-group-containing siloxane unit,
   (C) a silicone oil having a kinetic viscosity at 25° C. of not less than 100 mm²/s,
   (D) at least one curing catalyst selected from the group consisting of a metal alkoxide, a metal chelate compound, and a metal carboxylate, and
   (E) a solvent containing an organic solvent having a vapor pressure at 20° C. of not less than 1 kPa,
   wherein a total proportion of the first siloxane oligomer (A) and the second siloxane oligomer (B) in the composition is 20 to 50% by mass,
   a mass ratio of the second siloxane oligomer (B) relative to the first siloxane oligomer (A) is 0.15 to 10,
   a mass ratio of the solvent (E) is 40 to 300 parts by mass relative to 100 parts by mass of a total of the first siloxane oligomer (A), the second siloxane oligomer (B), and the silicone oil (C), and
   when the composition is applied and is allowed to stand at 23° C. for 24 hours to give a cured layer, the composition has a pencil hardness measured in accordance with JIS K5600-5-4(1999) of not less than 2H as the cured layer:

[Chem. 1]

(I)

wherein $R^1$ and $R^2$ are the same or different and each represent an alkyl group.

2. The curable composition according to claim 1, wherein the organic solvent having a vapor pressure at 20° C. of not less than 1 kPa is a $C_{1-4}$alkanol.

3. The curable composition according to claim 1, wherein a ratio of the curing catalyst (D) is 1 to 55 parts by mass relative to 100 parts by mass of the total of the first siloxane oligomer (A), the second siloxane oligomer (B), and the silicone oil (C).

4. The curable composition according to claim 1, which is a room-temperature-curable composition.

5. The curable composition according to claim 1, which is a coating composition.

6. The curable composition according to claim 1, which is a composition for preventing adhesion of snow and/or ice to a substrate, a composition for preventing adhesion of oil and/or water scale to a substrate, or a composition for preventing water penetration to a substrate.

7. A process for producing a cured product, comprising: applying a curable composition recited in claim 1 to a surface of a substrate and curing the composition to form a cured product.

8. The process according to claim 7, wherein the cured product is in the form of a cured layer.

9. A method for imparting non-tackiness and water repellency to a substrate, comprising: treating the substrate with a curable composition recited in claim 1 and curing the curable composition.

10. A method for preventing adhesion of snow and/or ice to a substrate, comprising: applying a curable composition recited in claim 1 to a surface of the substrate and curing the composition to form a cured layer.

11. The method according to claim 10, wherein the cured layer accelerates sliding of snow and ice.

12. A method for preventing adhesion of oil and/or water scale to a substrate, comprising: applying a curable composition recited in claim 1 to a surface of the substrate and curing the composition to form a cured layer.

13. A method for preventing water penetration to a substrate, comprising: applying a curable composition recited in claim 1 to a surface of the substrate and curing the composition to form a cured product.

14. The method according to claim 13, wherein the substrate is a shaped concrete product.

15. A composite comprising a substrate and a cured layer coated on a surface of the substrate, the cured layer being formed of a cured product of a curable composition recited in claim 1.

* * * * *